US010340837B2

(12) United States Patent
Wildes et al.

(10) Patent No.: US 10,340,837 B2
(45) Date of Patent: Jul. 2, 2019

(54) SLOPED ROOF SOLAR PANEL MOUNTING SYSTEM

(71) Applicant: Ecolibrium Solar, Inc., Athens, OH (US)

(72) Inventors: Brian James Wildes, Boulder, CO (US); Devin Glen MacRostie, Boulder, CO (US)

(73) Assignee: Ecolibrium Solar, Inc, Athens, OH (US)

(*) Notice: Subject to any disclaimer, the term of this patent is extended or adjusted under 35 U.S.C. 154(b) by 0 days.

(21) Appl. No.: 15/068,370

(22) Filed: Mar. 11, 2016

(65) Prior Publication Data
US 2016/0268958 A1 Sep. 15, 2016

Related U.S. Application Data

(60) Provisional application No. 62/131,743, filed on Mar. 11, 2015, provisional application No. 62/192,529, filed on Jul. 14, 2015.

(51) Int. Cl.
H02S 20/23 (2014.01)
H02S 40/34 (2014.01)
(Continued)

(52) U.S. Cl.
CPC ............ H02S 20/23 (2014.12); F24S 25/61 (2018.05); F24S 25/636 (2018.05); F24S 25/70 (2018.05);
(Continued)

(58) Field of Classification Search
CPC ......... H02S 20/23; H02S 40/34; F24J 2/5268; F24J 2/5245; F24J 2/5264;
(Continued)

(56) References Cited

U.S. PATENT DOCUMENTS 1,281,531 A    10/1918  Dietrich
2,486,670 A *  11/1949  Nigg .................. F16B 5/10
                                                411/533
(Continued)

FOREIGN PATENT DOCUMENTS

DE    202014009489 U1 * 12/2014    ............ F16B 7/187
EP    2584282 A1    4/2013
(Continued)

OTHER PUBLICATIONS

PCT Form 210, International Search Report for PCT/US2012/060032, dated Mar. 18, 2013.
(Continued)

Primary Examiner — Jeanette E Chapman
(74) Attorney, Agent, or Firm — The Law Office of Patrick F. O'Reilly III, LLC

(57) ABSTRACT

A mounting system for supporting a plurality of photovoltaic modules on a sloped support surface, such as a sloped roof, is disclosed herein. The mounting system may include one or more support surface attachment devices, each support surface attachment device configured to attach one or more photovoltaic modules to a support surface; and one or more module coupling devices, each module coupling device configured to couple a plurality of photovoltaic modules to one another.

31 Claims, 46 Drawing Sheets

(51) Int. Cl.
*F24S 25/61* (2018.01)
*F24S 25/70* (2018.01)
*F24S 25/63* (2018.01)
*H02S 30/10* (2014.01)
*F24S 25/636* (2018.01)
*F24S 25/00* (2018.01)
*F24S 40/44* (2018.01)

(52) U.S. Cl.
CPC .............. *H02S 30/10* (2014.12); *F24S 40/44* (2018.05); *F24S 2025/021* (2018.05); *Y02B 10/12* (2013.01); *Y02B 10/20* (2013.01); *Y02E 10/47* (2013.01)

(58) Field of Classification Search
CPC .. F24J 2002/5294; F24J 2/4614; Y02E 10/47; Y02B 10/20; Y02B 4/12
See application file for complete search history.

(56) References Cited

U.S. PATENT DOCUMENTS

| | | | |
|---|---|---|---|
| 2,607,816 A * | 8/1952 | Ryder | .................. H02K 1/148 29/416 |
| 3,844,087 A | 10/1974 | Schultz et al. | |
| 4,114,330 A | 9/1978 | Sukolics | |
| 4,677,248 A | 6/1987 | Lacey | |
| 4,680,905 A | 7/1987 | Rockar | |
| 5,092,939 A | 3/1992 | Nath et al. | |
| 5,497,587 A | 3/1996 | Hirai et al. | |
| 5,746,839 A | 5/1998 | Dinwoodie | |
| 6,105,316 A | 8/2000 | Bottger et al. | |
| 6,105,317 A | 8/2000 | Tomiuchi et al. | |
| 6,331,671 B1 | 12/2001 | Makita et al. | |
| 6,360,491 B1 | 3/2002 | Ullman | |
| 6,672,018 B2 | 1/2004 | Shingleton | |
| D510,315 S | 10/2005 | Shugar et al. | |
| 6,959,517 B2 | 11/2005 | Poddany et al. | |
| D519,444 S | 4/2006 | Mascolo | |
| D547,262 S | 7/2007 | Ullman | |
| D560,605 S | 1/2008 | McClintock et al. | |
| D564,958 S | 3/2008 | Almy et al. | |
| D565,505 S | 4/2008 | Shugar et al. | |
| 7,406,800 B2 | 8/2008 | Cinnamon et al. | |
| 7,435,134 B2 | 10/2008 | Lenox | |
| 7,476,832 B2 | 1/2009 | Vendig et al. | |
| D586,737 S | 2/2009 | Shugar et al. | |
| 7,492,120 B2 | 2/2009 | Benn et al. | |
| D598,372 S | 8/2009 | Sasada | |
| 7,592,537 B1 | 9/2009 | West | |
| 7,634,875 B2 | 12/2009 | Genschorek | |
| 7,758,011 B2 | 7/2010 | Haddock | |
| 7,780,472 B2 | 8/2010 | Lenox | |
| 7,832,157 B2 | 11/2010 | Cinnamon | |
| 7,866,098 B2 | 1/2011 | Cinnamon | |
| 7,921,843 B1 | 4/2011 | Rawlings | |
| 7,987,641 B2 | 8/2011 | Cinnamon | |
| 8,109,048 B2 | 2/2012 | West et al. | |
| 8,136,311 B2 | 3/2012 | Liu | |
| 8,146,299 B2 | 4/2012 | Stearns et al. | |
| 8,191,320 B2 | 6/2012 | Mittan et al. | |
| 8,266,848 B2 | 9/2012 | Miros et al. | |
| 8,272,174 B2 | 9/2012 | Stearns et al. | |
| 8,276,330 B2 | 10/2012 | Harberts et al. | |
| 8,375,654 B1 | 2/2013 | West et al. | |
| 8,382,513 B2 | 2/2013 | Kobayashi | |
| 8,397,448 B2 | 3/2013 | Brown et al. | |
| 8,424,255 B2 | 4/2013 | Lenox et al. | |
| 8,505,248 B1 | 8/2013 | Leong et al. | |
| 8,505,864 B1 | 8/2013 | Taylor et al. | |
| 8,511,008 B2 | 8/2013 | Sagayama | |
| 8,539,719 B2 | 9/2013 | McPheeters et al. | |
| D692,372 S | 10/2013 | Rothschild et al. | |
| 8,555,569 B2 | 10/2013 | Crasnianski | |
| 8,627,617 B2 | 1/2014 | Haddock et al. | |
| 8,635,818 B2 | 1/2014 | Wildes | |
| 8,806,813 B2 | 8/2014 | Plaisted et al. | |
| 8,813,441 B2 | 8/2014 | Rizzo | |
| D713,784 S | 9/2014 | Wildes | |
| 8,844,215 B2 | 9/2014 | Wildes et al. | |
| 8,869,471 B2 | 10/2014 | Wildes et al. | |
| 8,935,893 B2 | 1/2015 | Liu et al. | |
| 8,938,932 B1 | 1/2015 | Wentworth et al. | |
| 9,166,522 B1 | 10/2015 | Zvanut et al. | |
| 9,166,552 B2 | 10/2015 | Hara et al. | |
| 9,175,878 B2 | 11/2015 | Kemmer et al. | |
| 9,196,755 B2 | 11/2015 | Wildes | |
| 9,209,609 B2 | 12/2015 | Kellerman et al. | |
| 9,413,285 B2 | 8/2016 | Wildes et al. | |
| 9,584,062 B2 | 2/2017 | Ganshaw et al. | |
| 9,698,289 B2 | 7/2017 | Braley et al. | |
| 2001/0053316 A1 * | 12/2001 | Bakker | ................ B65D 39/084 411/371.1 |
| 2003/0070368 A1 | 4/2003 | Shingleton | |
| 2004/0163338 A1 | 8/2004 | Liebendorfer | |
| 2005/0072456 A1 | 4/2005 | Stevenson et al. | |
| 2005/0166955 A1 | 8/2005 | Nath et al. | |
| 2005/0257453 A1 | 11/2005 | Cinnamon | |
| 2006/0086382 A1 | 4/2006 | Plaisted | |
| 2007/0095388 A1 | 5/2007 | Mergola et al. | |
| 2007/0144575 A1 | 6/2007 | Mascolo et al. | |
| 2008/0053517 A1 | 3/2008 | Plaisted et al. | |
| 2008/0172955 A1 | 7/2008 | McClintock et al. | |
| 2009/0019796 A1 | 1/2009 | Liebendorfer | |
| 2009/0078299 A1 | 3/2009 | Cinnamon et al. | |
| 2009/0134291 A1 | 5/2009 | Meier et al. | |
| 2009/0242014 A1 | 10/2009 | Leary | |
| 2009/0320904 A1 | 12/2009 | Botkin et al. | |
| 2009/0320905 A1 | 12/2009 | Botkin et al. | |
| 2009/0320906 A1 | 12/2009 | Botkin et al. | |
| 2009/0320907 A1 | 12/2009 | Botkin et al. | |
| 2010/0089390 A1 | 4/2010 | Miros et al. | |
| 2010/0147362 A1 | 6/2010 | King et al. | |
| 2010/0154780 A1 | 6/2010 | Linke | |
| 2010/0192505 A1 | 8/2010 | Schaefer et al. | |
| 2010/0212714 A1 | 8/2010 | Rothschild et al. | |
| 2010/0219304 A1 | 9/2010 | Miros et al. | |
| 2010/0236542 A1 | 9/2010 | Pierson et al. | |
| 2010/0263704 A1 * | 10/2010 | Fornage | .................. H02S 40/32 136/244 |
| 2010/0269428 A1 | 10/2010 | Stancel et al. | |
| 2010/0269430 A1 | 10/2010 | Haddock | |
| 2011/0000519 A1 | 1/2011 | West | |
| 2011/0000520 A1 | 1/2011 | West | |
| 2011/0000526 A1 | 1/2011 | West | |
| 2011/0000544 A1 | 1/2011 | West | |
| 2011/0056536 A1 | 3/2011 | Meppelink et al. | |
| 2011/0120047 A1 * | 5/2011 | Stearns | .................. E04D 13/10 52/698 |
| 2011/0179727 A1 | 7/2011 | Liu | |
| 2011/0220180 A1 | 9/2011 | Cinnamon et al. | |
| 2011/0260027 A1 * | 10/2011 | Farnham, Jr. | .......... F24J 2/5207 248/309.1 |
| 2011/0278411 A1 | 11/2011 | Carbonare et al. | |
| 2011/0284058 A1 | 11/2011 | Cinnamon | |
| 2012/0031473 A1 | 2/2012 | Chan et al. | |
| 2012/0032045 A1 | 2/2012 | Lallier et al. | |
| 2012/0048351 A1 | 3/2012 | Rizzo | |
| 2012/0061337 A1 | 3/2012 | Seery et al. | |
| 2012/0102853 A1 | 5/2012 | Rizzo | |
| 2012/0138764 A1 | 6/2012 | Kemple | |
| 2012/0180406 A1 | 7/2012 | Kobayashi | |
| 2012/0234378 A1 | 9/2012 | West et al. | |
| 2012/0240489 A1 | 9/2012 | Rivera et al. | |
| 2012/0255598 A1 | 10/2012 | West | |
| 2012/0260972 A1 | 10/2012 | West et al. | |
| 2012/0266944 A1 | 10/2012 | Wildes | |
| 2012/0275066 A1 | 11/2012 | O'Brien et al. | |
| 2012/0279558 A1 | 11/2012 | West et al. | |
| 2012/0298186 A1 | 11/2012 | West | |
| 2012/0298188 A1 | 11/2012 | West et al. | |
| 2012/0298817 A1 | 11/2012 | West et al. | |
| 2013/0032208 A1 | 2/2013 | Walz et al. | |
| 2013/0075152 A1 | 3/2013 | Mazzone | |

(56) References Cited

U.S. PATENT DOCUMENTS

| | | | |
|---|---|---|---|
| 2013/0133270 A1 | 5/2013 | West et al. | |
| 2013/0133723 A1 | 5/2013 | Croft et al. | |
| 2013/0140416 A1 | 6/2013 | West et al. | |
| 2013/0180089 A1 | 7/2013 | Seery et al. | |
| 2013/0180572 A1 | 7/2013 | West | |
| 2013/0180573 A1 | 7/2013 | West | |
| 2013/0180574 A1 | 7/2013 | West et al. | |
| 2013/0183084 A1 | 7/2013 | West et al. | |
| 2013/0200245 A1 | 8/2013 | Markiewicz et al. | |
| 2013/0220403 A1 | 8/2013 | Rizzo | |
| 2013/0276867 A1 | 10/2013 | Wildes et al. | |
| 2014/0014158 A1 | 1/2014 | Wildes et al. | |
| 2014/0041706 A1* | 2/2014 | Haddock | F24J 2/5258 136/244 |
| 2014/0174510 A1 | 6/2014 | Kanbara | |
| 2014/0175244 A1 | 6/2014 | West et al. | |
| 2014/0182662 A1 | 7/2014 | West et al. | |
| 2014/0202525 A1 | 7/2014 | Janssens et al. | |
| 2014/0220834 A1* | 8/2014 | Rizzo | H01L 31/042 439/834 |
| 2014/0311552 A1 | 10/2014 | Garrett | |
| 2014/0319307 A1* | 10/2014 | Schrock | F16B 9/023 248/542 |
| 2015/0040969 A1 | 2/2015 | Wildes | |
| 2015/0129517 A1 | 5/2015 | Wildes | |
| 2015/0288320 A1 | 10/2015 | Stearns et al. | |
| 2016/0079912 A1 | 3/2016 | Wildes et al. | |
| 2016/0190979 A1 | 6/2016 | Wildes | |

FOREIGN PATENT DOCUMENTS

| | | | |
|---|---|---|---|
| EP | 2607816 A1 * | 6/2013 | F24J 2/5207 |
| FR | 2990730 A1 | 11/2013 | |
| FR | 2990730 A1 * | 11/2013 | F24J 2/5245 |
| GB | 2466003 A * | 6/2010 | F24J 2/4614 |
| JP | 07018795 A | 1/1995 | |
| JP | 09177272 A | 7/1997 | |
| JP | 2004060358 A | 2/2004 | |
| JP | 2008214875 A | 9/2008 | |
| JP | 2013044114 A | 3/2013 | |
| JP | 2013-87579 A | 5/2013 | |
| JP | WO2011/077538 A1 | 5/2013 | |
| JP | 2013-227859 A | 7/2013 | |
| WO | 2005020290 A2 | 3/2005 | |
| WO | 2008/028151 A2 | 3/2008 | |
| WO | 2009120923 A2 | 10/2009 | |
| WO | 2011025585 A2 | 3/2011 | |
| WO | 2011019460 A2 | 8/2011 | |
| WO | 2012/086271 A1 | 6/2012 | |
| WO | 2012079060 A2 | 6/2012 | |
| WO | 2012079061 A1 | 6/2012 | |
| WO | 2012082806 A2 | 6/2012 | |
| WO | 2012116121 A1 | 8/2012 | |
| WO | WO-2012165538 A1 * | 12/2012 | F16B 5/0607 |

OTHER PUBLICATIONS

PCT Form 237, Written Opinion of the International Searching Authority for PCT/US2012/060032, dated Mar. 18, 2013.
First office action on the merits (Non-Final Rejection) in U.S. Appl. No. 13/273,525, dated Mar. 21, 2013.
First office action on the merits (Non-Final Rejection) in U.S. Appl. No. 13/923,303, dated Sep. 20, 2013.
First office action on the merits (Non-Final Rejection) in U.S. Appl. No. 13/923,342, dated Sep. 17, 2013.
PCT Form 210, International Search Report for PCT/US2013/049851, dated Nov. 7, 2013.
PCT Form 237, Written Opinion of the International Searching Authority for PCT/US2013/049851, dated Nov. 7, 2013.
First office action on the merits (Non-Final Rejection) in U.S. Appl. No. 14/521,951, dated Jan. 30, 2015.
PCT Form 210, International Search Report for PCT/US2014/065624, dated Apr. 9, 2015.
PCT Form 237, Written Opinion of the International Searching Authority for PCT/US2014/065624, dated Apr. 9, 2015.
PCT Form 210, International Search Report for PCT/US2016/022219, dated Jul. 26, 2015.
PCT Form 237, Written Opinion of the International Searching Authority for PCT/US2016/022219, dated Jul. 26, 2016.
First office action on the merits (Non-Final Rejection) in U.S. Appl. No. 14/541,127, dated Apr. 7, 2016.
Second office action on the merits (Non-Final Rejection) in U.S. Appl. No. 14/541,127, dated Dec. 7, 2016.
First office action on the merits (Non-Final Rejection) in U.S. Appl. No. 14/948,342, dated Dec. 22, 2015.
First office action on the merits (Non-Final Rejection) in U.S. Appl. No. 15/387,481, dated Dec. 21, 2016.
Second office action on the merits (Final Rejection) in U.S. Appl. No. 15/387,481, dated Jun. 29, 2018.
First office action on the merits (Notice of Rejection) from Japanese Patent Office (JPO) for Japanese Patent Appl. No. 2016-530120, dated Oct. 23, 2018.

* cited by examiner

SLOPED ROOF SOLAR PANEL MOUNTING SYSTEM

CROSS-REFERENCE TO RELATED APPLICATIONS

This patent application claims priority to U.S. Provisional Patent Application No. 62/131,743, entitled "Sloped Roof Solar Panel Mounting System", filed on Mar. 11, 2015; and further claims priority to U.S. Provisional Patent Application No. 62/192,529, entitled "Sloped Roof Solar Panel Mounting System", filed on Jul. 14, 2015, the disclosure of each of which is hereby incorporated by reference as if set forth in their entirety herein.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The field of the present invention generally relates to mounting systems and, more particularly, to support assemblies and mounting systems for mounting photovoltaic modules or panels on sloped support surfaces such as, for example, sloped building rooftops, or the like.

2. Background

There is a need for a sloped roof solar panel mounting system that attaches to rafters or roof supporting members, avoids using rails or struts, and is universal.

Solar panels must be secured to the roof and underlying structure to disperse wind and snow loads into the building structure. Although some mounting systems that avoid using rails attach to the roof decking, they do not attach to the roof rafters because the spacing of rafters is different than the length of modules.

Rails and struts are long extrusions or roll-formed strips that must be cut to length, use excess material, are costly to manufacture and high in shipping cost. Therefore, a mounting system avoiding the use of rails or struts is desired.

There is a need for the system to mount to any solar module on the market, giving installers the flexibility to choose the module of their choice, rather than be required to buy a module with a custom profile rail to accommodate the mounting system.

BRIEF SUMMARY OF EMBODIMENTS OF THE INVENTION

Accordingly, the present invention is directed to a sloped roof solar panel mounting system that substantially obviates one or more problems resulting from the limitations and deficiencies of the related art.

In accordance with one or more embodiments of the present invention, there is provided a support surface attachment device, the support surface attachment device configured to attach one or more photovoltaic modules to a support surface. The support surface attachment device including a base assembly configured to be attached to a support surface; and a clamp assembly configured to engage one or more photovoltaic modules, the clamp assembly including a lower clamp member and an upper clamp member, the upper clamp member connected to the lower clamp member by a fastener member, the lower clamp member including one or more first teeth disposed thereon, and the upper clamp member including one or more second teeth disposed thereon, the one or more first teeth on the lower clamp member configured to engage the one or more second teeth on the upper clamp member when the fastener is being tightened so as to maintain a minimum gap between the upper clamp member and the lower clamp member for receiving one or more photovoltaic module frames of the one or more photovoltaic modules when the one or more photovoltaic modules are pivotably installed into a first side of the clamp assembly. The clamp assembly is capable of being selectively positioned along a length of the base assembly prior to being fixed in place relative to the base assembly so as to permit adjustability when the one or more photovoltaic modules are being attached to the support surface.

In a further embodiment of the present invention, the upper clamp member of the clamp assembly comprises one or more grooves for receiving a portion of a bonding clip for grounding the one or more photovoltaic modules.

In yet a further embodiment, the support surface attachment device further comprises a spring member disposed between the upper clamp member and the lower clamp member of the clamp assembly, the spring member configured to hold the clamp assembly open for facilitating the installation of the one or more photovoltaic modules into the clamp assembly, and the spring member further configured to enable the clamp assembly to be secured on the base assembly while maintaining the minimum gap between the upper clamp member and the lower clamp member.

In still a further embodiment, the support surface attachment device further comprises a strut nut threadingly coupled to the fastener member, the strut nut configured to fix the clamp assembly in place relative to the base assembly when the fastener member is tightened.

In yet a further embodiment, the fastener member comprises a visual indicator line formed on a head portion of the fastener member for indicating an orientation of the strut nut.

In still a further embodiment, the support surface attachment device further comprises a glider member coupling the upper and lower clamp members of the clamp assembly to the base assembly, the glider member configured to slide relative to the base assembly so as to allow the clamp assembly to be selectively positioned along the length of the base assembly prior to being fixed in place relative to the base assembly.

In yet a further embodiment, the glider member comprises one or more protrusions or grooves formed in an outer side of the glider member, the one or more protrusions or grooves configured to serve as a visual indicator indicating a height of the clamp assembly relative to the base assembly and/or serve as a means for holding a chalk line during an installation of the one or more photovoltaic modules.

In yet a further embodiment, the upper and lower clamp members of the clamp assembly are configured to rotate together relative to the glider member, and wherein an upstanding base member of the base assembly is configured to rotate relative to the support surface, whereby the rotation of the upper and lower clamp members relative to the glider member and the rotation of the upstanding base member of the base assembly relative to a flashing member of the support surface attachment device enables a lateral position of the clamp assembly to be adjusted by an installer.

In still a further embodiment, the lower clamp member of the clamp assembly comprises one or more ridges disposed on a bottom surface of the lower clamp member, the one or more ridges configured to increase a frictional engagement between the lower clamp member and the glider member so as resist the upper and lower clamp members of the clamp assembly from rotating relative to the glider member when the fastener member is tightened by an installer.

In yet a further embodiment, base assembly includes an upstanding base member, the upstanding base member comprising one or more mating grooves and one or more mating protrusions for engaging with one or more mating protrusions and one or more mating grooves of the glider member, wherein a selected engagement between the one or more mating grooves and protrusions of the upstanding base member and the one or more mating grooves and protrusions of the glider member enables the clamp assembly to be selectively positioned at a predetermined height relative to the base assembly prior to being fixed in place relative to the base assembly so as to permit vertical adjustability when the one or more photovoltaic modules are being attached to the support surface.

In still a further embodiment, the upper clamp member of the clamp assembly comprises a first downwardly protruding member and a second downwardly protruding member spaced apart from the first downwardly protruding member by a gap, the second downwardly protruding member being shorter in length than the first downwardly protruding member, and the second downwardly protruding member configured to provide an abutment surface for a skirt member.

In yet a further embodiment, the lower clamp member of the clamp assembly comprises one or more mating grooves and one or more mating protrusions for engaging with one or more mating protrusions and one or more mating grooves of a skirt member.

In still a further embodiment, the one or more mating protrusions on the lower clamp member are upwardly inclined so as to enable the skirt member to be inserted into the clamp assembly from above during installation, and so as to prevent the skirt member from becoming disengaged from the clamp assembly after the installation of the skirt member.

In yet a further embodiment, the upper clamp member of the clamp assembly comprises a pair of downwardly extending lip portions on opposite sides of a top portion of the upper clamp member, a first one of the pair of downwardly extending lip portions being longer than a second one of the pair of downwardly extending lip portions so as to facilitate the one or more photovoltaic modules being pivotably installed into the first side of the clamp assembly.

In still a further embodiment, the lower clamp member of the clamp assembly comprises an upwardly tapered ledge extending outwardly from the first side of the clamp assembly, the upwardly tapered ledge configured to support the one or more photovoltaic module frames of the one or more photovoltaic modules, and the upwardly tapered ledge being configured to function as a spring for applying a compressive force against the one or more photovoltaic module frames of the one or more photovoltaic modules so as to securely retain the one or more photovoltaic modules in the clamp assembly after the one or more photovoltaic modules are pivotably installed.

In yet a further embodiment, the base assembly includes an upstanding base member, the upstanding base member including a pair of vertically spaced-apart bottom wall portions, a first of the pair of vertically spaced-apart bottom wall portions comprising a first aperture and a second of the pair of vertically spaced-apart bottom wall portions comprising a second aperture, the first and second apertures of the upstanding base member configured to receive a raised portion of a flashing member therein so as to permit a fastener aperture disposed in the flashing member to be elevated above the support surface, thereby enabling the support surface attachment device to be more leakage resistant.

In yet a further embodiment, the upstanding base member of the base assembly further comprises one or more base flange portions, the one or more base flange portions having one or more mounting apertures disposed therethrough, the one or more mounting apertures configured to receive one or more respective fasteners for securing the upstanding base member to the support surface.

In still a further embodiment, a bottom surface of the upstanding base member comprises one or more ridges disposed thereon, the one or more ridges configured to increase a frictional engagement between the upstanding base member and the flashing member so as prevent the upstanding base member from rotating relative to the flashing member when a base fastener member is tightened by an installer.

In yet a further embodiment, the one or more ridges disposed on the bottom surface of the upstanding base member are additionally configured to capture and hold sealing tape when the upstanding base member is mounted directly against the support surface.

In still a further embodiment, a top surface of the upstanding base member comprises one or more visual installation guide marks configured to facilitate an installation of one or more rows of the one or more photovoltaic modules.

In yet a further embodiment, the support surface attachment device further comprises a flashing member having a fastener aperture configured to receive a base fastener member for attaching an upstanding base member of the base assembly and the flashing member to the support surface, the fastener aperture being disposed through a raised position of the flashing member so that water is prevented from passing through the fastener aperture.

In yet a further embodiment, the support surface attachment device further comprises a sealing washer configured to be disposed between a head of the base fastener member and a top rim of the raised position of the flashing member, the sealing washer including an upper portion formed from a first material and a lower portion formed from a second material, the first material forming the upper portion of the sealing washer restricting a deformation of the second material forming the lower portion of the sealing washer so as to prevent the sealing washer from entering the fastener aperture in the flashing member.

In still a further embodiment, the lower portion of the sealing washer further comprises a tapered bottom surface so as to tightly engage the top rim of the raised portion of the flashing member and to prevent the second material forming the lower portion of the sealing washer from entering the fastener aperture in the flashing member.

In yet a further embodiment, the raised portion of the flashing member comprises a circumferential ledge portion, wherein, when the upstanding base member of the base assembly is assembled with the flashing member, a top surface of the circumferential ledge portion of the raised portion of the flashing member is configured to regulate a height of an upper section of the raised portion of the flashing member that is disposed above the circumferential ledge portion so that a top rim of the upper section of the raised portion does not protrude substantially above a top surface of an elevated shelf of the upstanding base member.

In still a further embodiment, the support surface attachment device further comprises a cantilevered mounting arm coupling the clamp assembly to the base assembly, the cantilevered mounting arm configured to support the clamp assembly in a cantilevered manner from the base assembly so that the clamp assembly is capable of being horizontally offset from the base assembly, thereby allowing one or more edges of the one or more photovoltaic modules to be disposed above a region of the support surface that is unable to accommodate the base assembly.

In yet a further embodiment, the region of the support surface that is unable to accommodate the base assembly comprises an area at or near a roof ridge, and wherein the cantilevered mounting arm enables one or more additional photovoltaic modules to be installed proximate to the roof ridge.

In still a further embodiment, the support surface attachment device further comprises an electrical accessory bracket configured to mount an electrical accessory of a photovoltaic system to an upstanding base member of the base assembly, the electrical accessory bracket comprising at least one flange portion configured to attach the electrical accessory bracket to the upstanding base member, the electrical accessory bracket further comprising a bracket base portion comprising one or more mounting apertures for attaching the electrical accessory to the electrical accessory bracket.

In yet a further embodiment, the at least one flange portion of the electrical accessory bracket is offset from a center position of the bracket base portion in a widthwise direction of the bracket base portion so as to facilitate a connection of one or more wires to the electrical accessory without the upstanding base member of the base assembly interfering with a routing of the one or more wires.

In still a further embodiment, the bracket base portion of the electrical accessory bracket comprises a plurality of slots formed therein for accommodating various electrical accessories, and wherein the at least one flange portion of the electrical accessory bracket comprises at least one aperture formed therein for accommodating a grounding lug.

In yet a further embodiment, the support surface attachment device further comprises a conduit mounting member configured to mount electrical conduit of a photovoltaic system to an upstanding base member of the base assembly, the conduit mounting member including a securement portion comprising one or more mounting apertures for attaching the conduit mounting member to the upstanding base member, the conduit mounting member further comprising a conduit mounting portion connected to the securement portion, the conduit mounting portion comprising one or more securement apertures for attaching the electrical conduit to the conduit mounting member.

In accordance with one or more other embodiments of the present invention, there is provided a coupling device configured to attach one or more photovoltaic modules to one or more other photovoltaic modules. The coupling device including a lower coupling member including at least one ledge extending outwardly from a side surface of the lower coupling member, the lower coupling member further including one or more first teeth disposed thereon; and an upper coupling member including at least one flange portion extending outwardly from the upper coupling member, the upper coupling member further including one or more second teeth disposed thereon, the upper coupling member being adjustably connected to the lower coupling member by at least one fastening device, the one or more first teeth on the lower coupling member configured to engage the one or more second teeth on the lower coupling member when the at least one fastening device is being tightened so as to maintain a minimum gap between the upper coupling member and the lower coupling member for receiving one or more photovoltaic module frames of the one or more photovoltaic modules when the one or more photovoltaic modules are pivotably installed into a first side of the clamp assembly. The one or more other photovoltaic modules are configured to be clamped between the at least one ledge of the lower coupling member and the at least one flange portion of the upper coupling member.

In a further embodiment of the present invention, the at least one flange portion of the upper coupling member comprises a plurality of spaced-apart apertures disposed thererough, and wherein the at least one fastening device comprises a first and second fastening device, a first one of the plurality of spaced-apart apertures comprising a fastener hole for receiving the first fastening device, and the second one of the plurality of spaced-apart apertures comprising a fastener slot for receiving the second fastening device, the fastener slot providing clearance so as to allow the tightening of one of the first and second fastening devices prior to the tightening of the other of the first and second fastening devices.

In yet a further embodiment, the at least one flange portion of the upper coupling member comprises a central slot disposed between the first one of the plurality of spaced-apart apertures and the second one of the plurality of spaced-apart apertures, the central slot configured to receive a fastener member for connecting the coupling device to a glider member of a support surface attachment device so that the coupling device is capable of being used with a base assembly of the support surface attachment device for attaching the one or more photovoltaic modules to a support surface.

In still a further embodiment, a top surface of the at least one flange portion of the upper coupling member comprises one or more visual installation guide marks to indicate locational limits of mounting the one or more photovoltaic modules within the coupling device.

In yet a further embodiment, the lower coupling member comprises one or more mating grooves and one or more mating protrusions for engaging with one or more mating protrusions and one or more mating grooves of a skirt member.

In still a further embodiment, the one or more mating protrusions of the lower coupling member comprise a plurality of mating protrusions disposed in alternating upward and downward orientations so that the coupling device is capable of remaining in engagement with the skirt member prior to the at least one fastening device being tightened by an installer.

In yet a further embodiment, the lower coupling member comprises one or more water drainage troughs formed therein for draining water from the one or more photovoltaic modules.

In accordance with yet one or more other embodiments of the present invention, there is provided a bonding clip configured to ground one or more photovoltaic modules. The bonding clip includes a clip body portion having a first surface and a second surface disposed opposite to the first surface, the clip body portion further including a plurality of protruding members, at least one of the plurality of protruding members projecting outwardly from the first surface in a first direction, and at least another of the plurality of protruding members projecting outwardly from the second surface in a second direction, the first direction being generally opposite to the second direction; and one or more clip attachment portions connected to the clip body portion, the one or more clip attachment portions configured to attach the bonding clip to an object on which the bonding clip is mounted.

In a further embodiment of the present invention, the plurality of protruding members are arranged in a generally staggered pattern along a length of the clip body portion.

In yet a further embodiment, the clip body portion is in the form of flat plate that does not comprise any folds formed therein.

In still a further embodiment, the one or more clip attachment portions comprise a plurality of bent tab members, the plurality of bent tab members configured to engage with a groove in the object.

In yet a further embodiment, the one or more clip attachment portions comprise a pair of flange members, each of the pair of flange members being disposed at an opposite end of the clip body portion; and wherein, when the bonding clip is installed on the object, a top portion of each of the pair of flange members remains visible to an installer so that an installed condition of the bonding clip is capable of being verified by the installer.

In accordance with still one or more other embodiments of the present invention, there is provided a power accessory bracket configured to attach one or more power accessories of a photovoltaic system to one or more frames of one or more photovoltaic modules. The power accessory bracket includes a bracket body portion having a first side and a second side disposed opposite to the first surface; a first plurality of teeth disposed on the first side of the bracket body portion, the first plurality of teeth configured to engage the one or more frames of the one or more photovoltaic modules; and a second plurality of teeth disposed on the second side of the bracket body portion, the second plurality of teeth configured to engage one or more mounting members of the one or more power accessories. The power accessory bracket is configured to provide electrical bonding of the one or more photovoltaic modules to the one or more power accessories.

In a further embodiment of the present invention, at least one of the first and second pluralities of teeth extend below a bottom surface of the bracket body portion so as to provide the electrical bonding and to accommodate a plurality of different photovoltaic module flange dimensions.

In yet a further embodiment, the bracket body portion comprises at least one mounting aperture disposed therethrough, the at least one mounting aperture being offset from a center position of the bracket body portion in a widthwise direction of the bracket body portion so as to accommodate a plurality of different photovoltaic module flange dimensions by allowing the power accessory bracket to positioned in two different orientations.

In still a further embodiment, the bracket body portion comprises at least one additional aperture formed therein for accommodating one or more components of one or more power accessories.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS OF THE INVENTION

Figure 1:
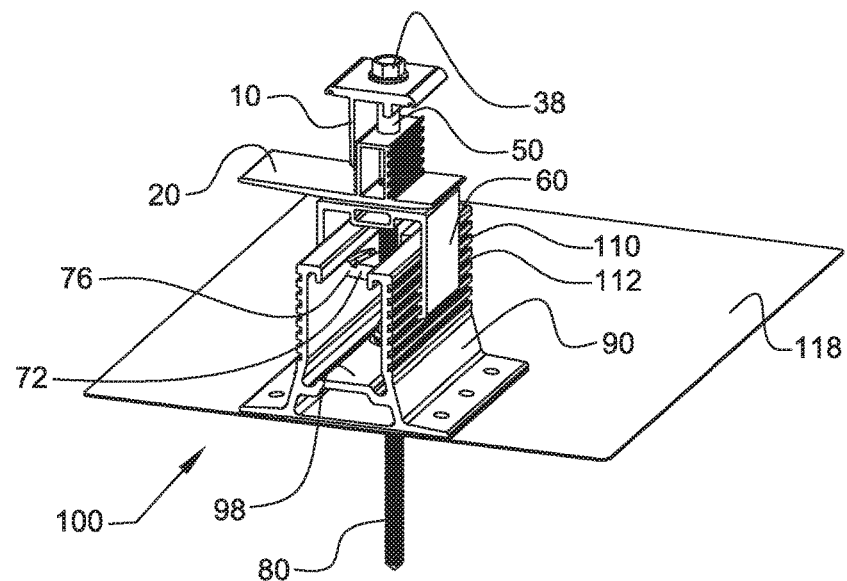
FIG. 1 is a perspective view of a support surface attachment device of a photovoltaic mounting system, according to a first embodiment of the invention, wherein the support surface attachment device is illustrated in an assembled state.
Figure 2:
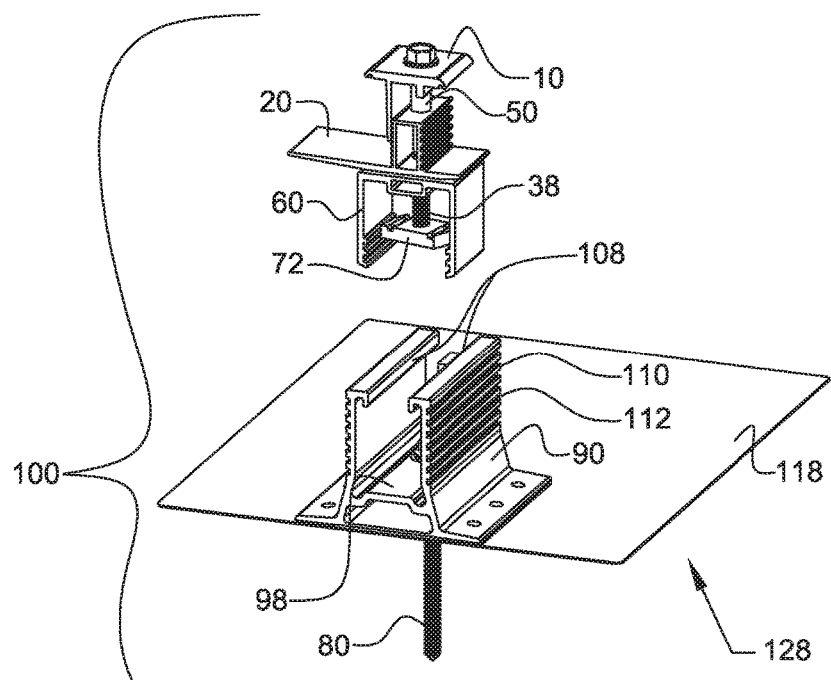
FIG. 2 is another perspective view of the support surface attachment device of FIG. 1, wherein a clamp assembly of the support surface attachment device is shown exploded from a base assembly of the support surface attachment device.

An first illustrative embodiment of the support surface attachment device is seen generally at 100 in FIGS. 1 and 2. In one or more embodiments, a plurality of support surface attachment devices 100 are used to securely attach an array of photovoltaic modules to a support surface (e.g., a sloped building roof). Referring to FIG. 2, it can be seen that support surface attachment device 100 generally comprises a clamp assembly 126 and a base assembly 128. Each of these assemblies 126, 128 will be described in detail hereinafter.

Figure 10:
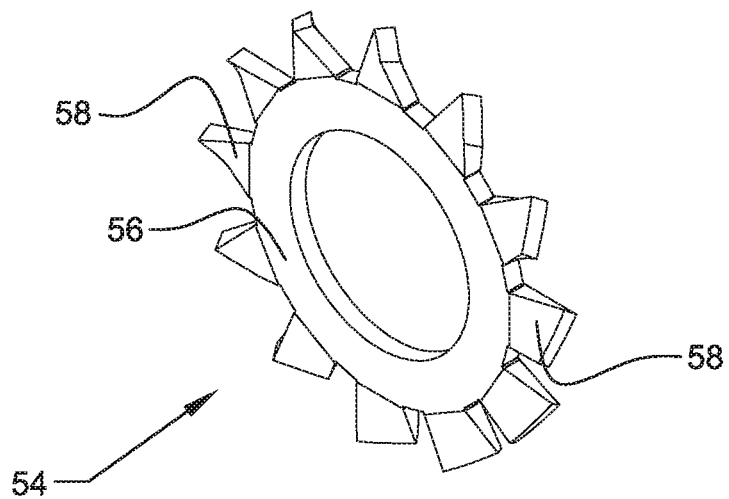
FIG. 10 is a perspective view of a washer of the clamp assembly of FIG. 3.
Figure 11:
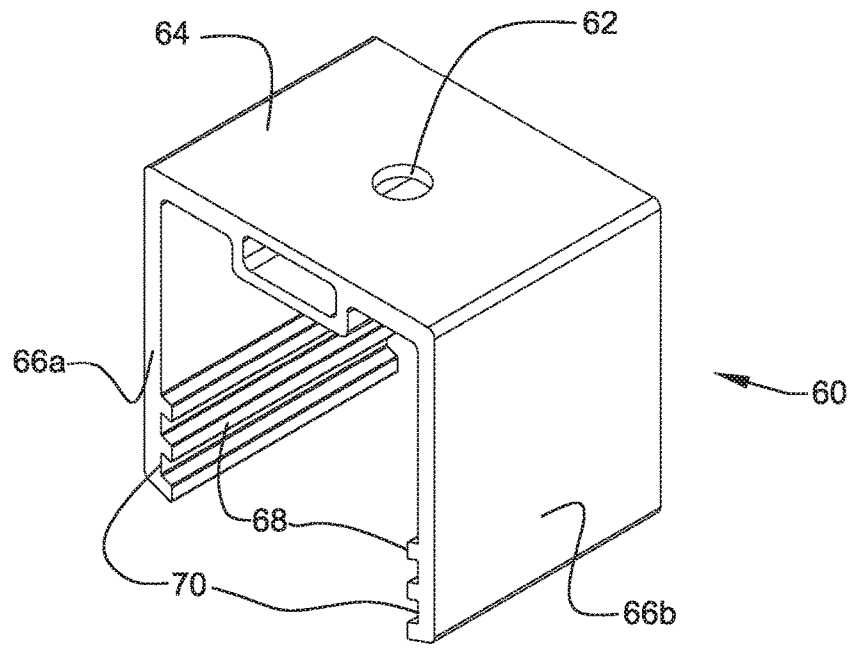
FIG. 11 is a perspective view of a glider member of the clamp assembly of FIG. 3.
Figure 12:
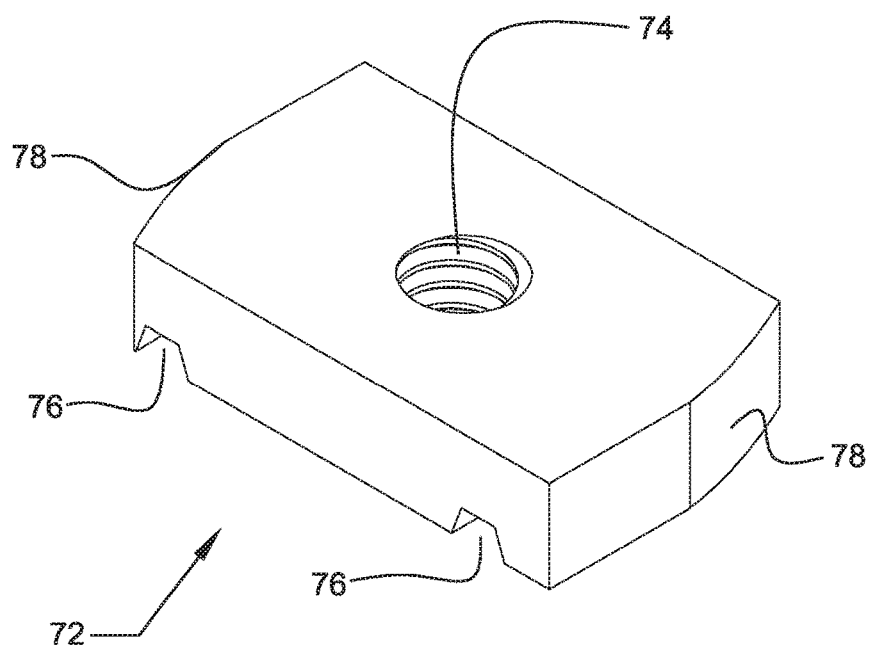
FIG. 12 is a bottom perspective view of a strut nut of the clamp assembly of FIG. 3.
Figure 13:
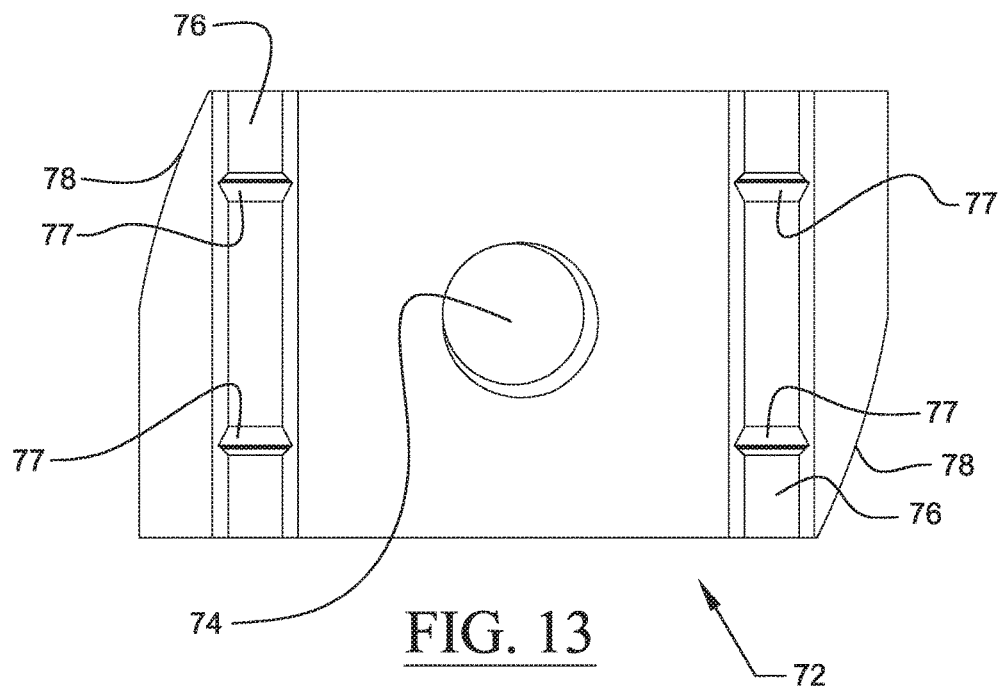
FIG. 13 is a top plan view of the strut nut of FIG. 12.

Initially, with reference to FIGS. 3-13, it can be seen that the illustrative embodiment of the clamp assembly 126 generally includes an upper clamp member 10, a lower clamp member 20, and a glider member 60. As best shown in the assembled view of FIG. 3, the upper clamp member 10, lower clamp member 20, and glider member 60 are connected to one another by means of a threaded fastener member 38 and a strut nut 72. In the illustrated embodiment, the threaded fastener member 38 is in the form of a bolt with a head portion having a serrated flange 40 (refer to FIG. 5). The serrations in the lower surface of the bolt head flange of the threaded fastener member 38 are configured to interferingly engage with the top surface of the upper clamp member 10 (i.e., "dig into" the top surface of the upper clamp member 10). The external threads on the shaft of the threaded fastener member 38 are configured to threadingly engage with the internal threads 74 in the middle of the strut nut 72 (see FIG. 12). As shown in FIGS. 12 and 13, the strut nut 72 has spaced-apart elongate grooves 76 disposed in the top surface thereof that are each configured to receive a respective downturned lip 108 of the base member 90, which will be described hereinafter. In addition, as best shown in the top view of FIG. 13, it can be seen that each of the elongate grooves 76 is provided with two (2) spaced-apart protrusions or teeth 77 disposed therein. The spaced-apart teeth 77 in each groove 76 are configured to interferingly engage with a bottom surface of one of the downturned lips 108 (i.e., "dig into" the bottom surface of one of the downturned lips 108). Also, referring collectively to FIGS. 12 and 13, it can be seen that the strut nut 72 comprises curved sidewall portions 78 arranged diagonally opposite from one another. The curved sidewall portions 78 allow the strut nut 72 to rotate clockwise into position until the flat sidewall portions contact the inside walls of the base member 90.

Figure 3:
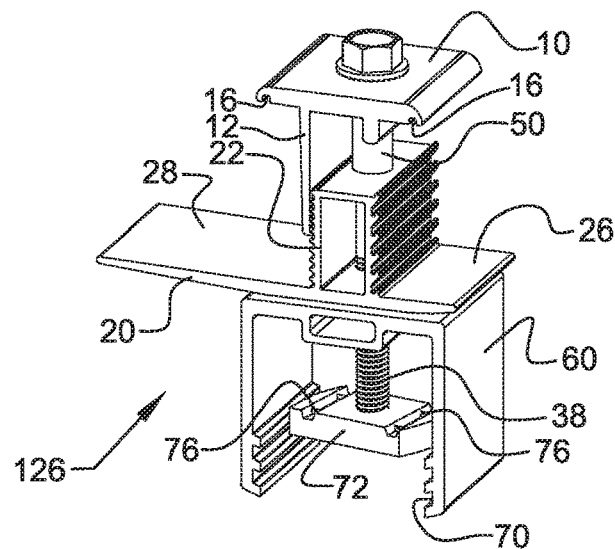
FIG. 3 is a perspective view of the clamp assembly of the support surface attachment device of FIG. 1, wherein the clamp assembly is illustrated in an assembled state.

Referring again to the illustrative embodiment of FIG. 3, it can be seen that the upper clamp member 10 and the lower clamp member 20 of clamp assembly 126 cooperate to clamp one or more photovoltaic modules in place on a support surface. That is, each photovoltaic module is clamped in place either between the first opposed flange portion 14a of the upper clamp member 10 and the second outwardly extending ledge 28 of the lower clamp member 20 or between the second opposed flange portion 14b of the upper clamp member 10 and the first outwardly extending ledge 26 of the lower clamp member 20, depending on which side of the clamp assembly 126 the photovoltaic module is disposed.

Figure 6:
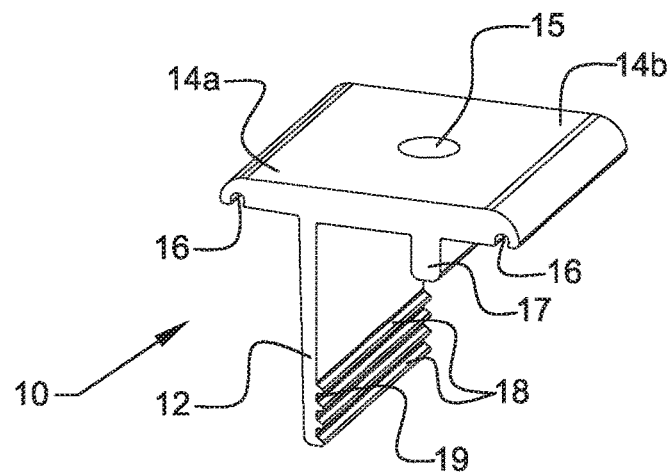
FIG. 6 is a perspective view of an upper clamp member of the clamp assembly of FIG. 3.

Now, with reference to FIG. 6, the structure of the upper clamp member 10 will be described. As shown in this figure, the upper clamp member 10 generally includes a base portion 12 that is attached to the bottom surface of a flange portion 14a, 14b at approximately a 90 degree angle. In this figure, it can be seen that one side surface of base portion 12 comprises a plurality of elongate protrusions or teeth 18 that are each spaced apart from one another by respective elongate grooves 19. As will be described hereinafter, the plurality of elongate protrusions or teeth 18 matingly engage with elongate protrusions or teeth 30 disposed on the first opposed wall portion 24a of the upstanding middle portion 22 of the lower clamp member 20. Referring again to FIG. 6, it can be seen that the flange portion 14a, 14b of the upper clamp member 10 further comprises a fastener aperture 15 for receiving the threaded fastener member 38 and a downwardly protruding member 17 that forms a back surface against which a photovoltaic module rests when disposed in the clamp assembly 126. Also, as shown in FIG. 6, each of the flange portions 14a, 14b includes an elongate groove 16 disposed in the bottom surface thereof. Each of the elongate grooves 16 is configured to receive a trough portion 48 of a respective bonding clip 42 (see FIG. 7) that provides integrated grounding for the photovoltaic module installation. The trough portion 48 of each respective bonding clip 42 is received within its respective elongate groove 16 in a press-fit or interference-fit type mounting arrangement.

Figure 7:
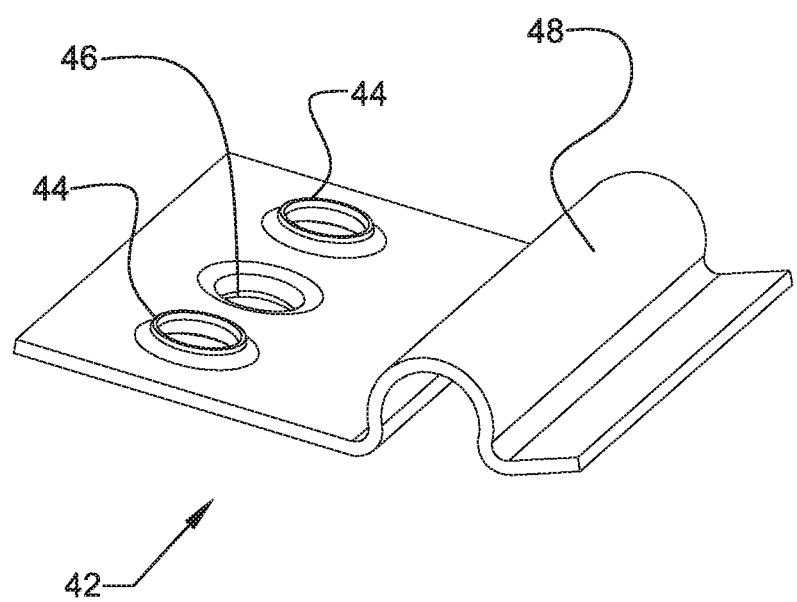
FIG. 7 is a perspective view of a bonding clip of the clamp assembly of FIG. 3.

The bonding or grounding clip 42, which provides integrated grounding for the photovoltaic modules, is illustrated in FIG. 7. The bonding clip 42 generally comprises a plate-like body portion with a trough portion 48 extending laterally across the plate-like body portion and dividing the plate-like body portion into two sections. In FIG. 7, it can be seen that the plate-like body portion includes one or more upwardly protruding annular members 44 and one or more downwardly protruding annular members 46. In particular, in the illustrative embodiment, the upwardly and downwardly protruding annular members 44, 46 are arranged in an alternating sequence (i.e., a first upwardly protruding annular member 44 followed by a downwardly protruding annular member 46, then followed by a second upwardly protruding annular member 44). The upwardly protruding members 44 are designed to pierce the metallic bottom surface of the flange portion 14a, 14b of the upper clamp member 10, while the downwardly protruding annular member 46 is designed to pierce the anodized layer of the photovoltaic module to provide integrated grounding between the photovoltaic modules. To facilitate integrated grounding between the photovoltaic modules, all of the components of the support surface attachment device 100 and the coupling device 130 may be formed from metal.

Figure 9:
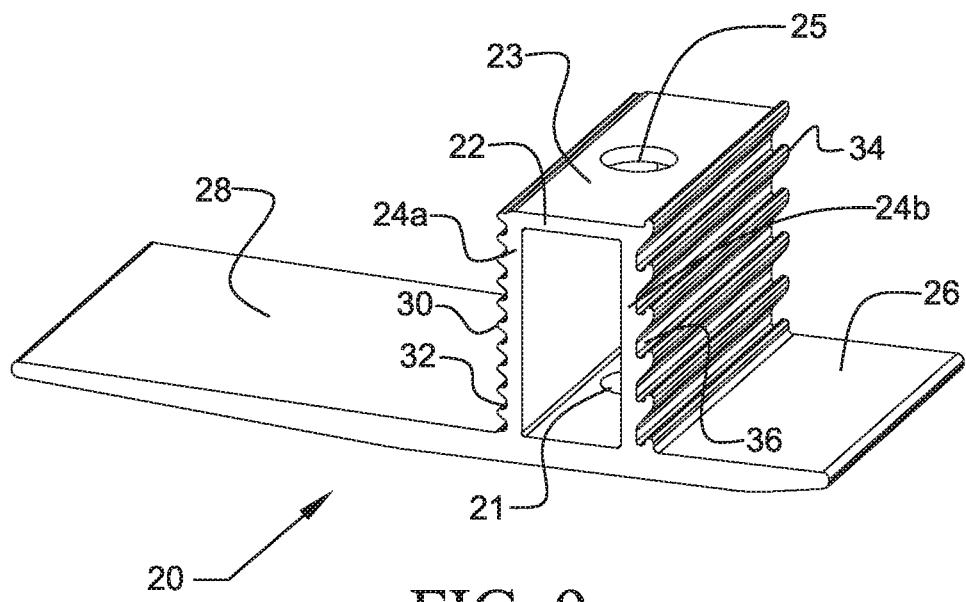
FIG. 9 is a perspective view of a lower clamp member of the clamp assembly of FIG. 3.

Next, turning to FIG. 9, the structure of the lower clamp member 20 will be explained. With reference to this figure, it can be seen that the lower clamp member 20 generally includes an upstanding middle portion 22 with first and second ledge portions 26, 28 extending outwardly from the upstanding middle portion 22. In FIG. 9, it can be seen that the upstanding middle portion 22 of the lower clamp member 20 comprises a lower fastener aperture 21 disposed in a bottom wall portion thereof, and an upper fastener aperture 25 disposed in a top wall portion 23 thereof. Each of these apertures 21, 25 receives the shaft of the threaded fastener member 38. The bottom wall portion and the top wall portion 23 of the upstanding middle portion 22 of the lower clamp member 20 are connected to one another by first and second opposed wall portions 24a, 24b. As shown in FIG. 9, the first opposed wall portion 24a comprises a plurality of elongate protrusions or teeth 30 that are each spaced apart from one another by respective elongate grooves 32. As explained above, the elongate teeth 30 of the first opposed wall portion 24a engage with the elongate teeth 18 of the base portion 12 of the upper clamp member 10. Referring again to FIG. 9, it can be seen that the second opposed wall portion 24b comprises a plurality of elongate hook-shaped upwardly inclined protrusions or teeth 34 that are each spaced apart from one another by respective elongate grooves 36. The hook-shaped teeth 34 on the second opposed wall portion 24b are configured to engage with a wind deflector and/or a mounting skirt for deflecting wind up and over the photovoltaic array and/or improving the aesthetics of the array. Each of the first and second ledge portions 26, 28 of the lower clamp member 20 is configured to accommodate a photovoltaic module frame member resting thereon.

Figure 4:
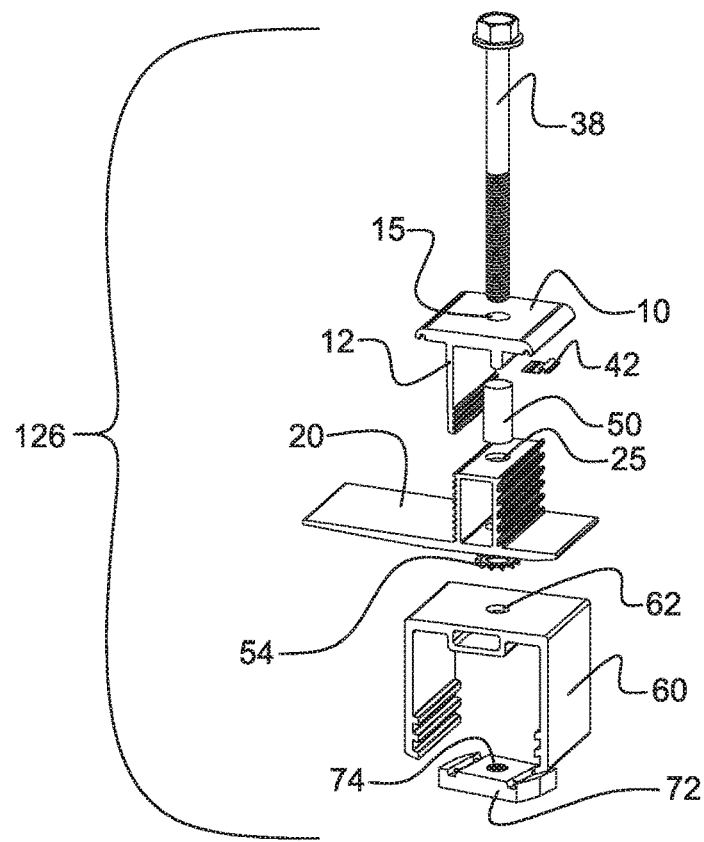
FIG. 4 is another perspective view of the clamp assembly of the support surface attachment device of FIG. 1, wherein the components of the clamp assembly are shown exploded from one another.
Figure 5:
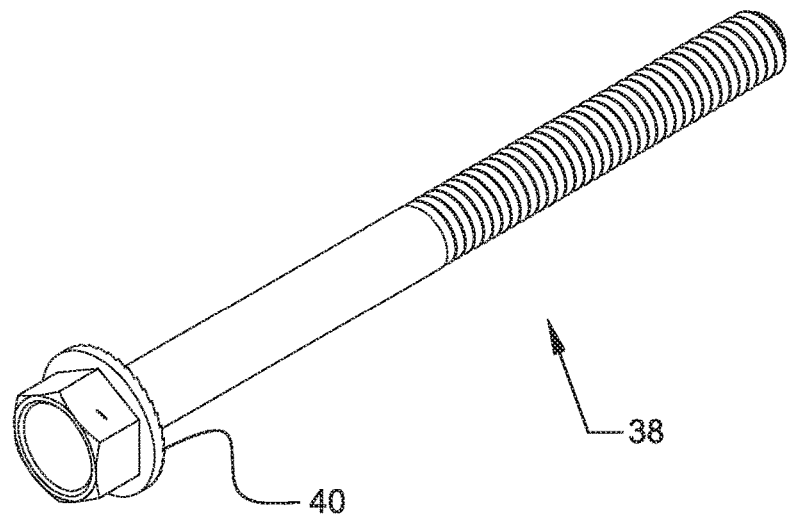
FIG. 5 is a perspective view of a fastener member of the clamp assembly of FIG. 3.

With reference to FIGS. 3, 4, and 9, it can be seen that the second opposed ledge 28 of the lower clamp member 20 is bent slightly upward or is tapered slightly upward at an acute angle. In the installed state, the upwardly tapered ledge 28 of the lower clamp member 20 extends uphill and slightly up and away from the building roof so as to act as a leaf spring that takes up the difference in gap between the uphill clamp opening and the photovoltaic (PV) module thickness, thereby preventing the PV module from rattling and allowing it to be secured into place. In some embodiments, this also creates enough pressure on the upper clamp lip (i.e., first opposed flange portion 14a of upper clamp member 10) to enable a bonding point to function. Advantageously, because the second opposed ledge 28 of the lower clamp member 20 is provided with a slight upward taper (i.e., bowed upwardly), the lower clamp member 20 applies a compressive force against the PV module when it is installed therein. During the installation of each PV module, the PV module is initially disposed at an upward acute angle relative to its one or more southern clamp assemblies 126. Then, each PV module is rotated down until it is generally parallel with the roof surface. As each PV module is rotated downwardly towards the roof surface, the edge portion of the uphill PV module presses down on the upwardly tapered ledge(s) 28 of the lower clamp member(s) 20 so as to apply a downward force on the upwardly tapered ledge 28, thereby ensuring that the PV module is securely engaged with the lower clamp member(s) 20 and the PV module is tightly held in place. In response to the downward force applied by the PV module, the upwardly tapered ledges 28 elastically deforms or yields in a spring-like manner. As a result of the leaf spring design of the upwardly tapered ledge 28, the installer is not required to reach down over the PV module to tighten the fasteners on its one or more southern clamp assemblies 126. An attempt by the installer to tighten the fasteners on the one or more southern clamp assemblies 126 would not be safe, ergonomic, or efficient. The second ledge portion 158 of the lower coupling member 150 may be bent slightly upward or tapered slightly upward at an acute angle in the same manner as that described above for the upwardly tapered ledge 28 of the lower clamp member 20 so that the coupling device 130 is provided with the same functionality that is described above for the clamp assembly 126.

Figure 8:
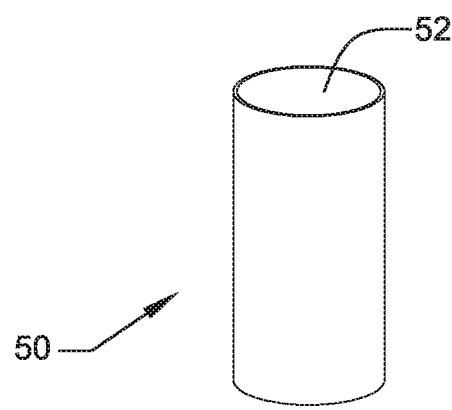
FIG. 8 is a perspective view of a sleeve member of the clamp assembly of FIG. 3.

In order to maintain a predetermined spacing distance between the upper and lower clamp members 10, 20, a sleeve member 50 is provided between the clamp members 10, 20 (refer to FIGS. 3 and 4). That is, as best shown in FIG. 3, the sleeve member 50 is disposed between the top wall portion 23 of the lower clamp member 20 and the bottom surface of the flange portion 14a, 14b of the upper clamp member 10. Turning to FIG. 8, it can be seen that the sleeve member 50 of the clamp assembly 126 comprises a cylindrical recess 52 extending therethrough for receiving the shaft of the threaded fastener member 38. In an alternative embodiment, a spring may be used rather than the sleeve member 50 to maintain the predetermined spacing distance between the upper and lower clamp members 10, 20.

As best shown in FIG. 3, the lower clamp member 20 is positioned above a glider member 60 that is configured to be adjustably disposed on the upstanding base member 90 in both a horizontal and vertical direction, as will be explained hereinafter. Referring to FIG. 11, it can be seen that the glider member 60 of the clamp assembly 126 comprises a generally inverted, U-shaped profile with a top wall portion 64 and first and second opposed wall portions 66a, 66b extending downwardly from the top wall portion 64. The top wall portion 64 comprises a fastener aperture 62 disposed centrally therein for receiving the shaft of the threaded fastener member 38. In FIG. 11, it can be seen that the inner surfaces of each of the first and second opposed wall portions 66a, 66b comprises a plurality of elongate protrusions or teeth 68 that are each spaced apart from one another by respective elongate grooves 70. The set of teeth 68 on each of the inner surfaces of the opposed wall portions 66a, 66b are designed to engage with respective teeth 110 on opposed upstanding wall portions 104a, 104b of the base member 90. The glider member 60 may be elastically deformable such that it is capable of snapping into place on the top of the base member 90. To permit horizontal adjustability, the glider member 60 is capable of being slid along the length of the base member 90. And, to permit vertical adjustability, the glider member 60 is capable of being moved up and down along a vertical height of the upstanding wall portions 104a, 104b of the base member 90 and selectively engaging certain ones of the teeth 68, 110 with one another.

With reference to FIG. 4, it can be seen that, in the illustrative embodiment, the clamp assembly 126 is further provided with a serrated washer 54 disposed between the lower clamp member 20 and the glider member 60. In FIG. 10, it can be seen that the serrated washer 54 includes an annular body portion 56 with a plurality of diagonally-oriented teeth 58 extending radially outward from the annular body portion 56. The diagonally-oriented teeth 58 of the serrated washer 54 are designed to cut into the adjacent surfaces of the lower clamp member 20 and the glider member 60 so as resist a rotation of the lower clamp member 20 relative to the glider member 60. The serrated washer 54 with the diagonally-oriented teeth 58 is also used to electrically bond the lower clamp member 20 to the glider member 60.

Now, referring to FIGS. 1, 2, 14, and 15, it can be seen that the illustrative embodiment of the base assembly 128 generally includes an upstanding base member 90 and a lower flashing member 118. As best shown in the assembled views of FIGS. 2 and 14, the upstanding base member 90 is connected to the lower flashing member 118 by a threaded fastener member 80. In the illustrated embodiment, the threaded fastener member 80 is in the form of a structural mounting bolt with a head portion 82 and a threaded shaft portion (see FIG. 16). In the illustrated embodiment, each support surface attachment device 100 is secured to a respective one of the roof rafters of a building by means of a structural mounting bolt 80 (e.g., refer to FIG. 1). In one or more embodiments, the structural mounting bolt or screw 80 may be self-drilling so as not to require any predrilled holes in the roof.

Figure 18:
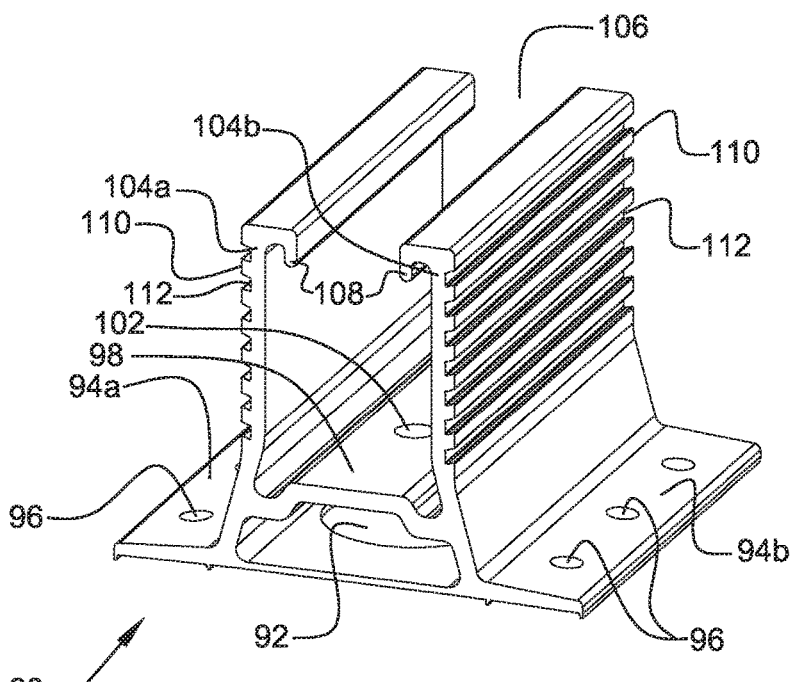
FIG. 18 is a perspective view of an upstanding base member of the base assembly of FIG. 14.

Turning to FIG. 18, the upstanding base member 90 of the base assembly 128 will now be described. As shown in this figure, the upstanding base member 90 generally comprises a base portion with first and second opposed base flange portions 94a, 94b and an elevated shelf portion 98. Two opposed upstanding wall portions 104a, 104b extend upwardly from the base portion of the base member 90. In FIG. 18, it can be seen that each of the opposed base flange portions 94a, 94b comprises a plurality of fastener apertures 96 arranged in a substantially linear configuration along the length thereof. When it is desired to mount the upstanding base member 90 directly to the roof deck, rather than a roof rafter, the base member 90 is secured to the roof deck using fasteners disposed in the fastener apertures 96. The base portion of the base member 90 comprises a centrally disposed aperture 92 for accommodating the raised portion 122 of the flashing member 118 passing therethrough. The elevated shelf portion 98 of the base portion of the base member 90 comprises a fastener aperture 102 disposed therethrough for accommodating the shaft of the threaded fastener member 80. In FIG. 18, it can be seen that the outer surfaces of each of the first and second opposed upstanding wall portions 104a, 104b comprises a plurality of elongate protrusions or teeth 110 that are each spaced apart from one another by respective elongate grooves 112. As described above, the set of teeth 110 on each of the outer surfaces of the opposed wall portions 104a, 104b are designed to engage with the respective teeth 68 on the opposed wall portions 66a, 66b of the glider member 60. Also, as shown in FIG. 18, the opposed wall portions 104a, 104b of the base member 90 cooperate to define an upper elongate slot 106 that accommodates the shaft of the threaded fastener member 38 passing therethrough. Also, each of the opposed wall portions 104a, 104b comprises a downturned lip portion 108 that is received within a respective one of the elongate grooves 76 disposed in the top surface of the strut nut 72.

Figure 17:
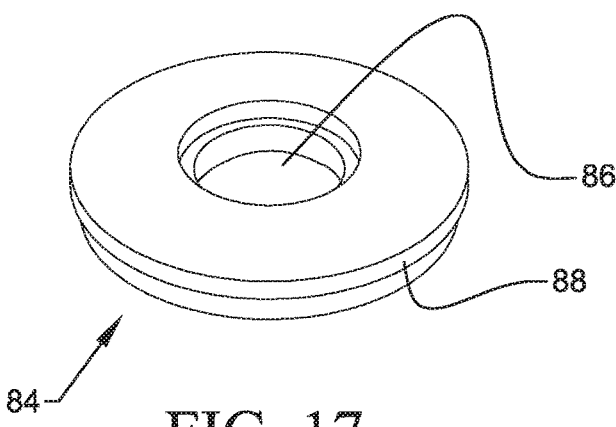
FIG. 17 is a perspective view of an upper sealing washer of the base assembly of FIG. 14.
Figure 19:
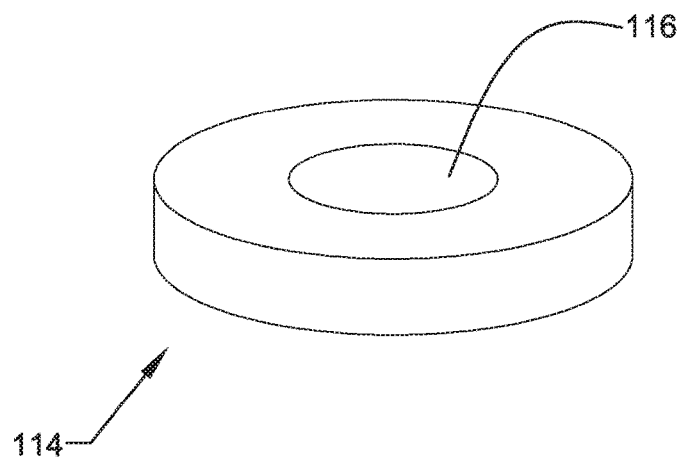
FIG. 19 is a perspective view of a lower sealing washer of the base assembly of FIG. 14.
Figure 20:
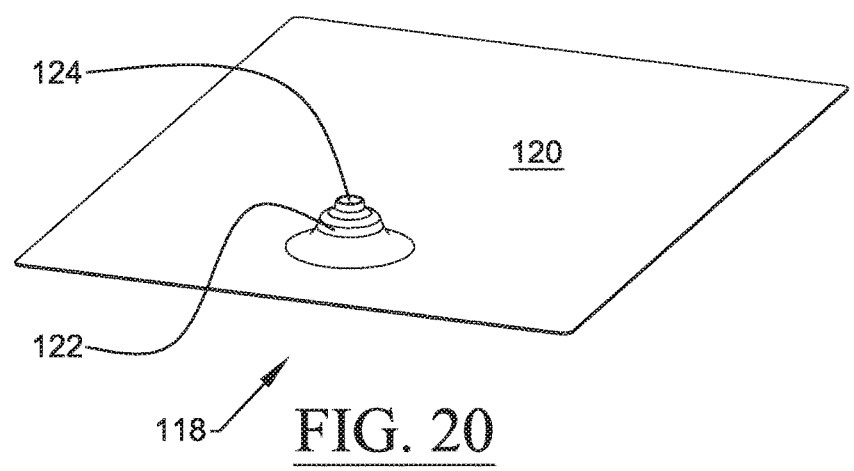
FIG. 20 is a perspective view of a flashing member of the base assembly of FIG. 14.
Figure 21:
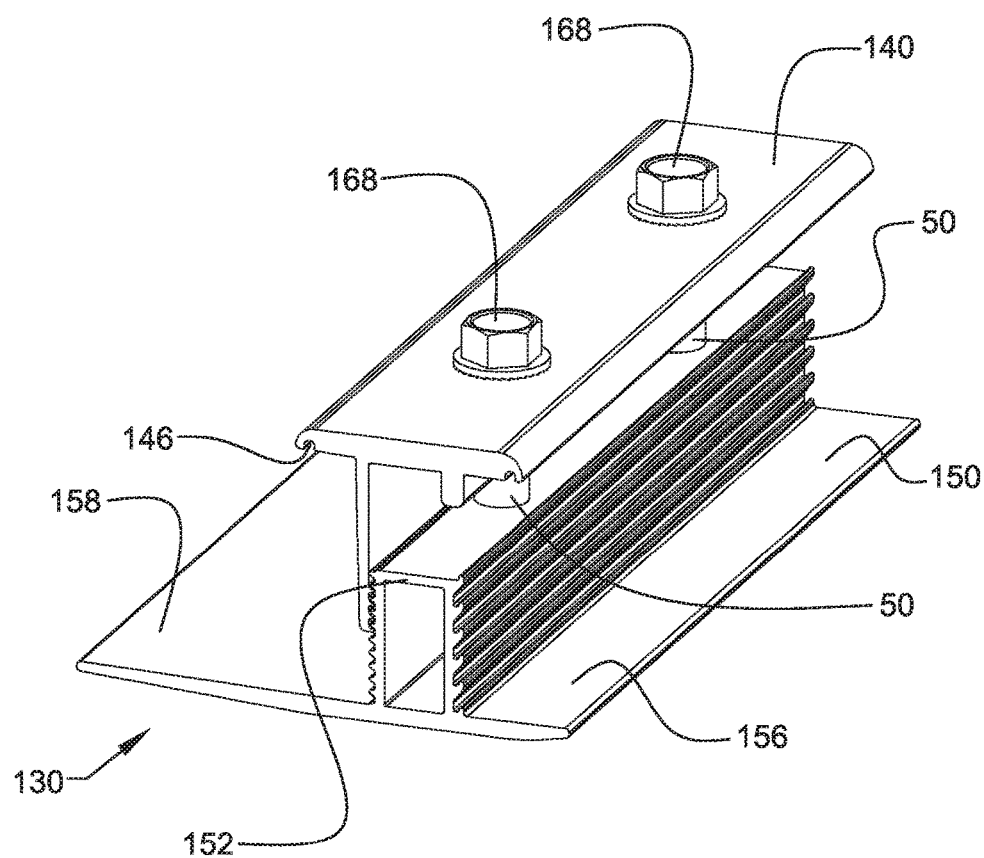
FIG. 21 is a perspective view of a coupling device of a photovoltaic mounting system, according to a first embodiment of the invention, wherein the coupling device is illustrated in an assembled state.
Figure 22:
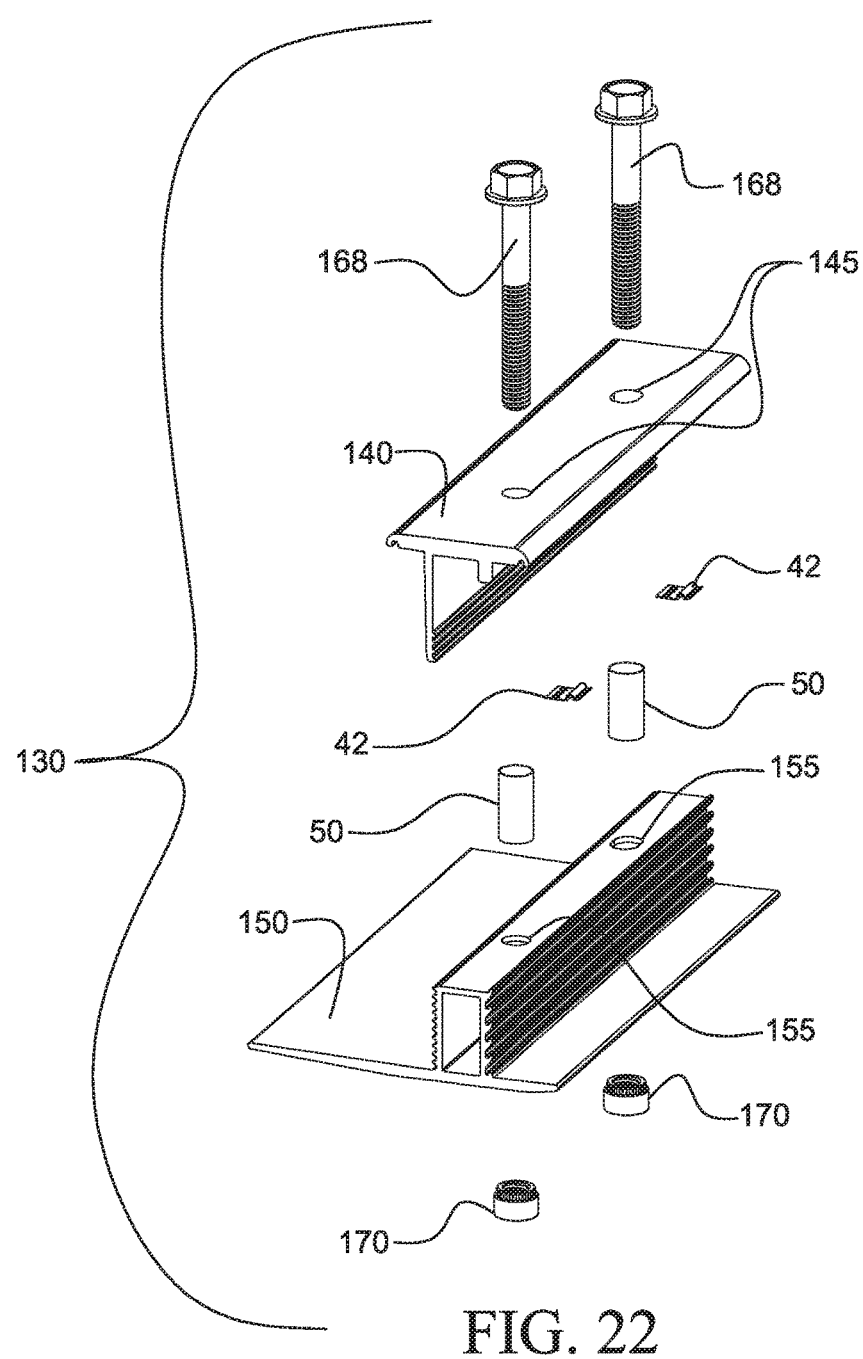
FIG. 22 is another perspective view of the coupling device of FIG. 21, wherein the components forming the coupling device are shown exploded from one another.

With reference primarily to FIG. 20, the flashing member 118 of the base assembly 128 will now be explained. The flashing member 118 helps to maintain the integrity of the building roof by preventing roof leaks. In FIG. 20, it can be seen that the flashing member 118 generally comprises a generally planar body portion 120 and a raised portion or projection 122 that extends upwardly from the generally planar body portion 120 in a generally vertical direction. As best shown in the perspective view of FIG. 20, the raised portion or projection 122 is offset with respect to the center of the generally planar body portion 120 (i.e., the raised portion or projection 122 is disposed to the side of the central point of the generally planar body portion 120). In FIG. 20, it can be seen that the raised portion or projection 122 includes a centrally disposed fastener aperture 124 for receiving the shaft of the structural mounting bolt 80 therein. Advantageously, the raised nature of the protrusion or projection 122 above the remainder of the generally planar body portion 120 of the flashing member 118 substantially prevents any precipitation (i.e., rain water) from entering the structure of the building roof through the fastener aperture 124. In the assembled state of the support surface attachment device 100, in order to further prevent any leaks through the aperture 124 of the flashing member 118, a lower sealing washer 114 (see FIGS. 15 and 19) is provided on the top of the raised portion or projection 122 of the flashing member 118. The lower sealing washer 114 comprises a fastener aperture 116 disposed therein for accommodating the shaft of the structural mounting bolt 80. The lower sealing washer 114 is sandwiched between the raised portion or projection 122 of the flashing member 118 and the bottom surface of the elevated shelf portion 98 of the base member 90 when the base member 90 is disposed on top of the flashing member 118 in the assembled state of the support surface attachment device 100. In addition, in the assembled state, an upper sealing washer 84 is disposed between the bottom surface of the head portion 82 of the bolt 80 and the top surface of the elevated shelf portion 98 of the base member 90 to additionally prevent any leaks through the roof. As shown in FIG. 17, the upper sealing washer 84 comprises a flanged top portion 88 with a fastener aperture 86 disposed through the center thereof for accommodating the shaft of the structural mounting bolt 80. In the assembled state of the support surface attachment device 100, the upper sealing washer 84 is sandwiched between the bottom surface of the bolt head portion 82 and the top surface of the elevated shelf portion 98 of the base member 90. In one exemplary embodiment, the flashing member 118 may be formed from stamped metal, and the upper and lower sealing washers 84, 114 may be formed from a suitable plastic or rubber, such as ethylene propylene diene monomer (EPDM).

Figure 14:
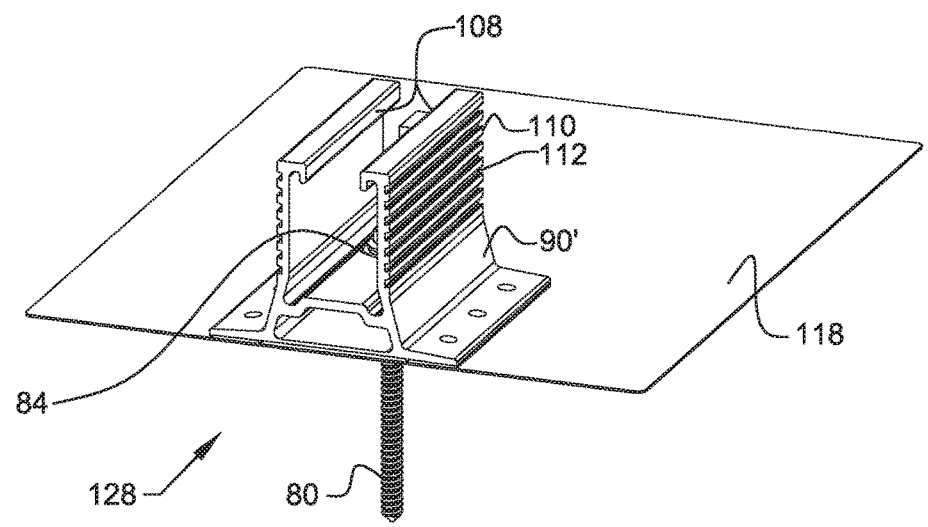
FIG. 14 is a perspective view of the base assembly of the support surface attachment device of FIG. 1, wherein the base assembly is illustrated in an assembled state.
Figure 15:
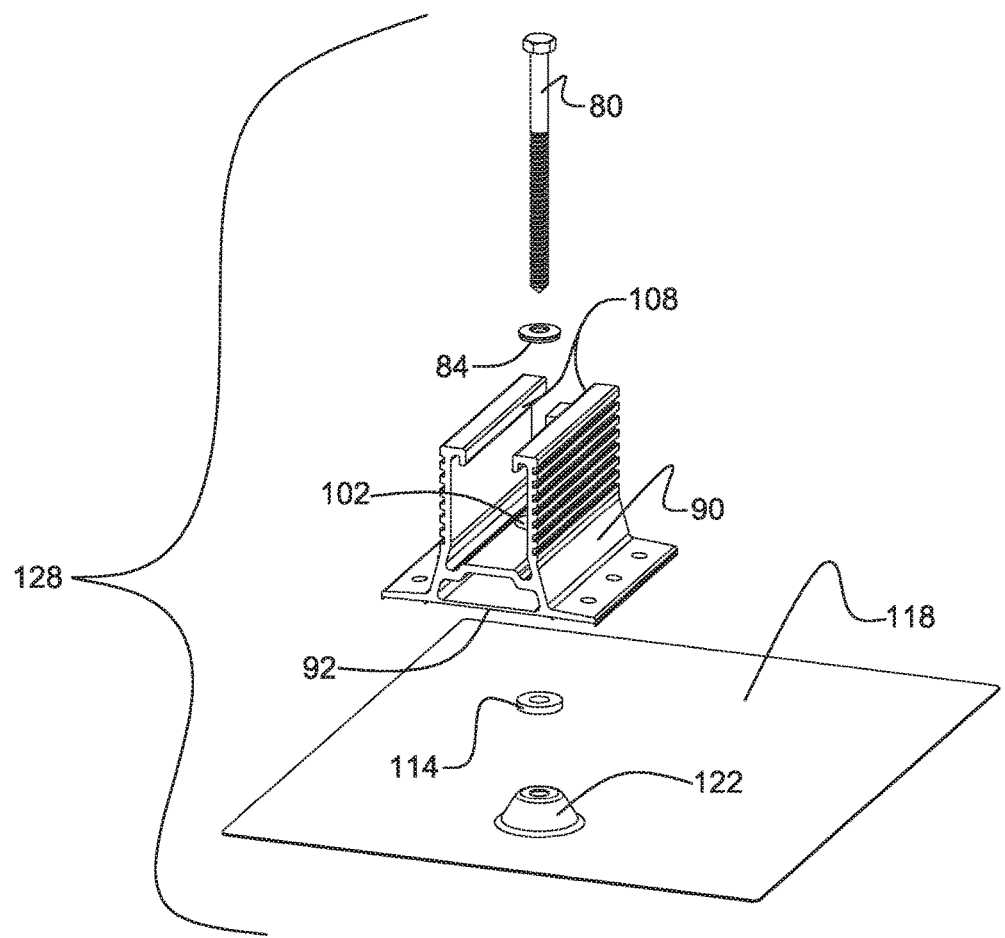
FIG. 15 is another perspective view of the base assembly of the support surface attachment device of FIG. 1, wherein the components of the base assembly are shown exploded from one another.
Figure 16:
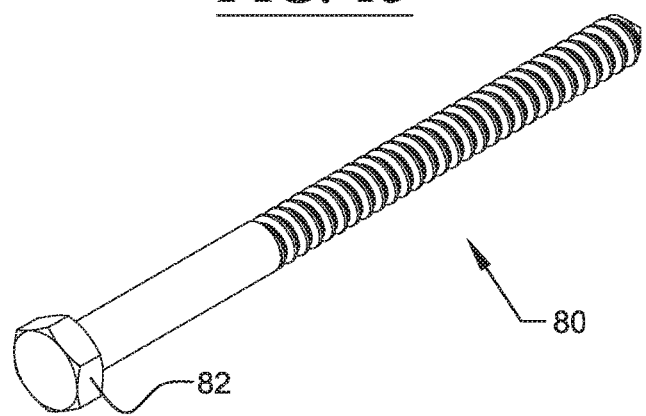
FIG. 16 is a perspective view of a fastener member of the base assembly of FIG. 14.

Advantageously, the design of the flashing member 118 illustrated in FIGS. 14, 15, and 20 results in superior waterproofing because its water seal is elevated above the roof surface (i.e., at the top of the raised portion or projection 122) so that the integrity of the flashing waterproofing is maintained even if the sealing washer 114 would fail. Also, because the flashing member 118 may be formed by stamping, its manufacturing costs are inexpensive. In addition, the configuration of the flashing member 118 allows adjacent flashing members 118 to be readily stacked for compact shipping.

Now, with reference to FIGS. 21-25, it can be seen that the illustrative embodiment of the coupling device or assembly 130 generally includes an upper coupling member 140 secured to a lower coupling member 150. As best shown in the assembled view of FIG. 21 and the exploded view of FIG. 22, the upper coupling member 140 and the lower coupling member 150 are connected to one another by means of one or more threaded fastener members 168 (e.g., two (2) threaded fastener members 168) and one or more respective captive nuts 170 (e.g., two (2) captive nuts 170, one for each threaded fastener member 168). In the illustrated embodiment, each threaded fastener member 168 is in the form of a bolt with a head portion having a serrated flange (e.g., refer to FIG. 21). As described above for the bolts 38, the serrations in the lower surface of the bolt head flange of each threaded fastener member 168 are configured to interferingly engage with the top surface of the upper coupling member 140 (i.e., "dig into" the top surface of the upper coupling member 140). The external threads on the shaft of each threaded fastener member 168 are configured to threadingly engage with the internal threads in the threaded aperture 172 of the captive nut 170 (see FIG. 25).

Figure 23:
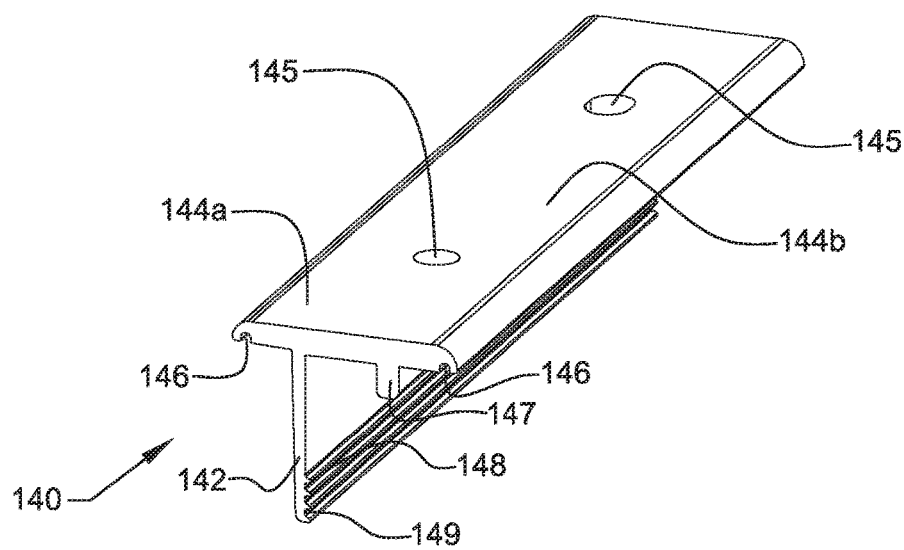
FIG. 23 is a perspective view of an upper coupling member of the coupling device of FIG. 21.

Turning to FIG. 23, the structure of the upper coupling member 140 will be described. As shown in this figure, the upper coupling member 140 generally includes a base portion 142 that is attached to the bottom surface of a flange portion 144a, 144b at approximately a 90 degree angle. In this figure, it can be seen that one side surface of base portion 142 comprises a plurality of elongate protrusions or teeth 148 that are each spaced apart from one another by respective elongate grooves 149. As will be described hereinafter, the plurality of elongate protrusions or teeth 148 matingly engage with elongate protrusions or teeth 160 disposed on the first opposed wall portion 154a of the upstanding middle portion 152 of the lower coupling member 150. Referring again to FIG. 23, it can be seen that the flange portion 144a, 144b of the upper coupling member 140 further comprises a plurality of fastener apertures 145 for receiving respective threaded fastener members 168 and a downwardly protruding member 147 that forms a back surface against which a photovoltaic module rests when disposed in the coupling assembly 130. Also, as shown in FIG. 23, each of the flange portions 144a, 144b includes an elongate groove 146 disposed in the bottom surface thereof. Each of the elongate grooves 146 is configured to receive a trough portion 48 of a respective bonding clip 42 (see FIGS. 7 and 22) that provides integrated grounding for the photovoltaic module installation. The trough portion 48 of each respective bonding clip 42 is received within its respective elongate groove 146 in a press-fit or interference-fit type mounting arrangement.

Figure 24:
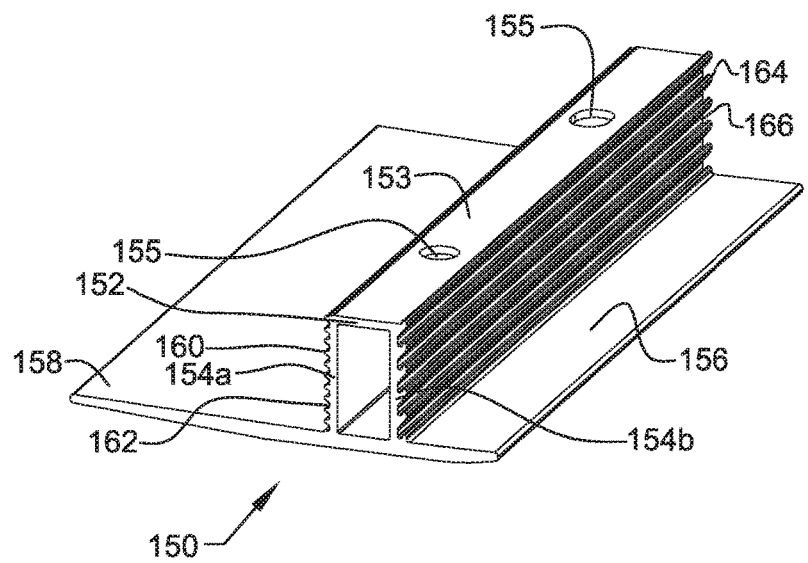
FIG. 24 is a perspective view of a lower coupling member of the coupling device of FIG. 21.
Figure 25:
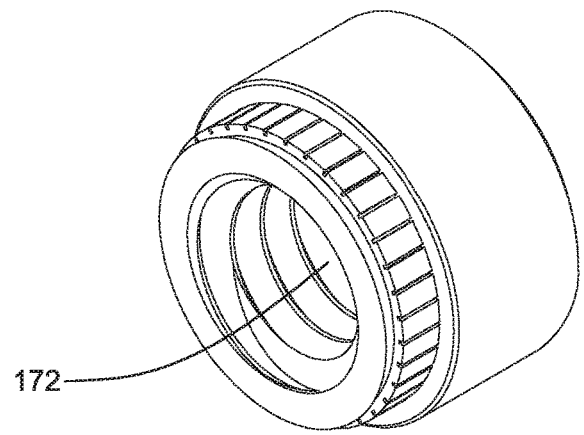
FIG. 25 is a perspective view of a captive nut of the coupling device of FIG. 21.

Next, turning to FIG. 24, the structure of the lower coupling member 150 will be explained. With reference to this figure, it can be seen that the lower coupling member 150 generally includes an upstanding middle portion 152 with first and second ledge portions 156, 158 extending outwardly from the upstanding middle portion 152. In FIG. 24, it can be seen that the upstanding middle portion 152 of the lower coupling member 150 comprises spaced-apart lower fastener apertures disposed in a bottom wall portion thereof, and spaced-apart upper fastener apertures 155 disposed in a top wall portion 153 thereof. Each of these apertures receives a respective shaft of a respective threaded fastener member 168. The bottom wall portion and the top wall portion 153 of the upstanding middle portion 152 of the lower coupling member 150 are connected to one another by first and second opposed wall portions 154a, 154b. As shown in FIG. 24, the first opposed wall portion 154a comprises a plurality of elongate protrusions or teeth 160 that are each spaced apart from one another by respective elongate grooves 162. As explained above, the elongate teeth 160 of the first opposed wall portion 154a engage with the elongate teeth 148 of the base portion 142 of the upper coupling member 140. Referring again to FIG. 24, it can be seen that the second opposed wall portion 154b comprises a plurality of elongate hook-shaped protrusions or teeth 164 that are each spaced apart from one another by respective elongate grooves 166. The hook-shaped teeth 164 on the second opposed wall portion 154b are configured to engage with a wind deflector and/or a mounting skirt for deflecting wind up and over the photovoltaic array and/or improving the aesthetics of the array, as will be described hereinafter. Each of the first and second ledge portions 156, 158 of the lower coupling member 150 is configured to accommodate a photovoltaic module frame member resting thereon.

Figure 26:
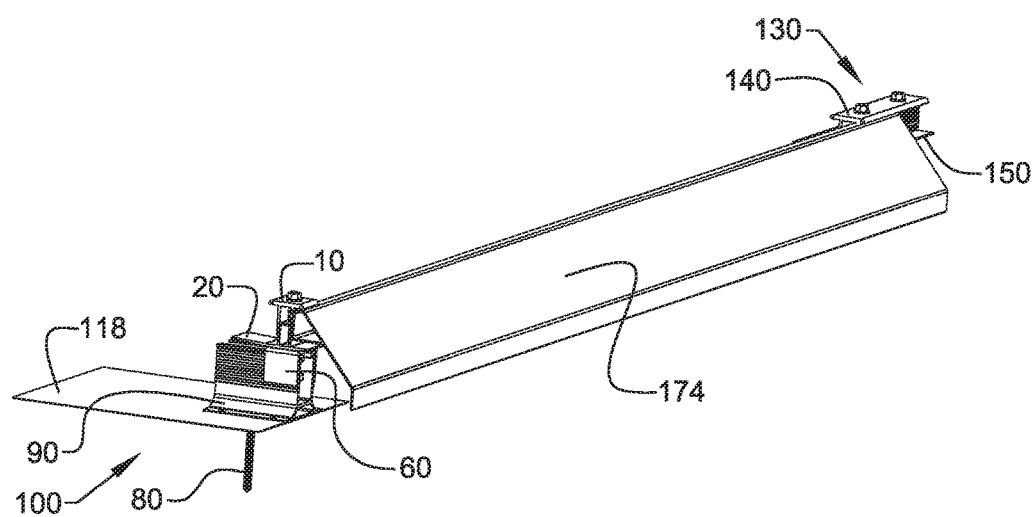
FIG. 26 is a perspective view illustrating the support surface attachment device of FIG. 1 together with the coupling device of FIG. 21 and a lower skirt member connected to the support surface attachment device and the coupling device.
Figure 27:
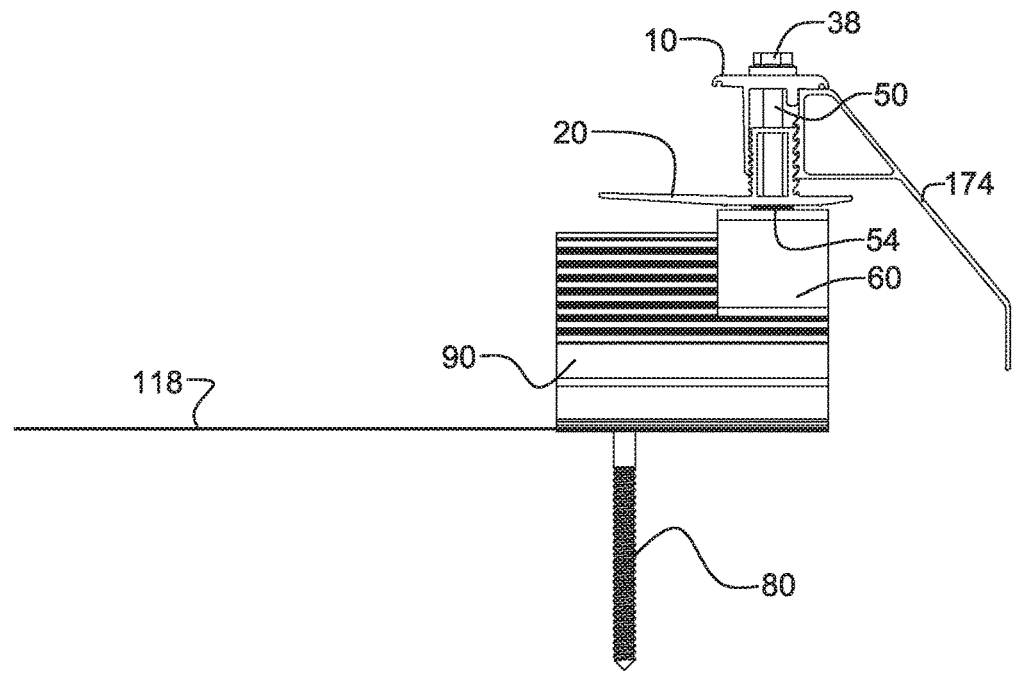
FIG. 27 is an end view of the assembly of FIG. 26, wherein the support surface attachment device and lower skirt member are shown.
Figure 28:
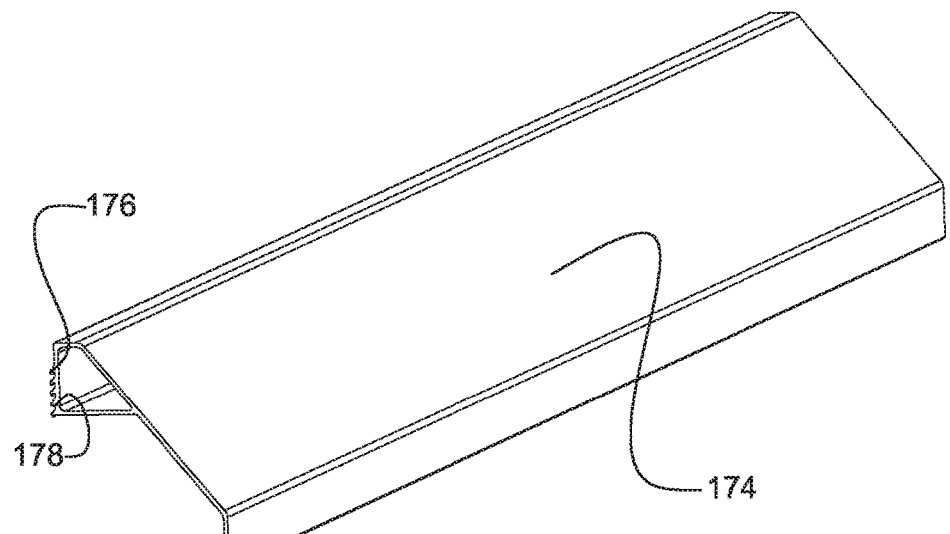
FIG. 28 is a perspective view of a lower skirt member, similar to the lower skirt member illustrated in FIG. 26.

With reference to FIGS. 26-28, a skirt member 174 of the photovoltaic mounting system will be described. Initially, referring to the perspective view of FIG. 26, it can be seen that the skirt member 174 is configured to be located on the southernmost edge of the array of PV modules. The skirt member 174 is supported by spaced-apart support surface attachment devices 100. In particular, as shown in the side view of FIG. 27, the skirt member 174 engages with the upper clamp member 10 and the lower clamp member 20 of the clamp assembly 126 of the support surface attachment device 100. As shown in this figure, the skirt member 174 is clampingly engaged by the upper clamp member 10, and is additionally engaged by the hook-shaped teeth 34 of the lower clamp member 20.

Referring again to FIGS. 27 and 28, the engagement between the skirt member 174 and the lower clamp member 20 will be explained in more detail. As shown in the perspective view of FIG. 28, a backside of the skirt member 174 comprises a plurality of elongate hook-shaped protrusions or teeth 176 that are each spaced apart from one another by respective elongate grooves 178. With reference to the side view of FIG. 27, it can be seen that at least some of the hook-shaped protrusions or teeth 176 of the skirt member 174 matingly engage with at least some of the hook-shaped protrusions or teeth 34 on the lower clamp member 20. This engagement between the hook-shaped protrusions or teeth 34, 176 enables the skirt member 174 to be securely supported on the clamp assembly 126. The hook-shaped protrusions or teeth 164 on the lower coupling member 150 engage with the hook-shaped protrusions or teeth 176 of the skirt member 174 in a manner that is generally the same as that of the hook-shaped protrusions or teeth 34 on the lower clamp member 20. Advantageously, the hook-shaped protrusions or teeth 176, 34 on the skirt member 174 and the lower clamp member 20, respectively, allows the skirt member 174 to be mounted at various heights relative to the lower clamp member 20 so that the skirt member 174 is capable of matching PV modules having more than one height. This is important because the skirt member 174 sets the gap size of the clamp assembly 126 and the coupling assembly 130 on the south row of the PV array to accept the first row of PV modules.

In the perspective view of FIG. 26, it can be seen that the skirt member 174 is configured to cover the exposed downhill edge of the array of PV modules (only one skirt member 174 is shown in FIG. 26). Because the skirt member(s) 174 closes out the south row of PV modules, it improves the aesthetics of the completed photovoltaic array. No clamps or hardware is seen from ground. Airflow around the array is permitted. In one exemplary embodiment, the skirt member 174 may be formed from aluminum. In another exemplary embodiment, the skirt member 174 may be formed from a suitable polymer.

Although the invention has been shown and described with respect to a certain embodiment or embodiments, it is apparent that this invention can be embodied in many different forms and that many other modifications and variations are possible without departing from the spirit and scope of this invention.'

Figure 29:
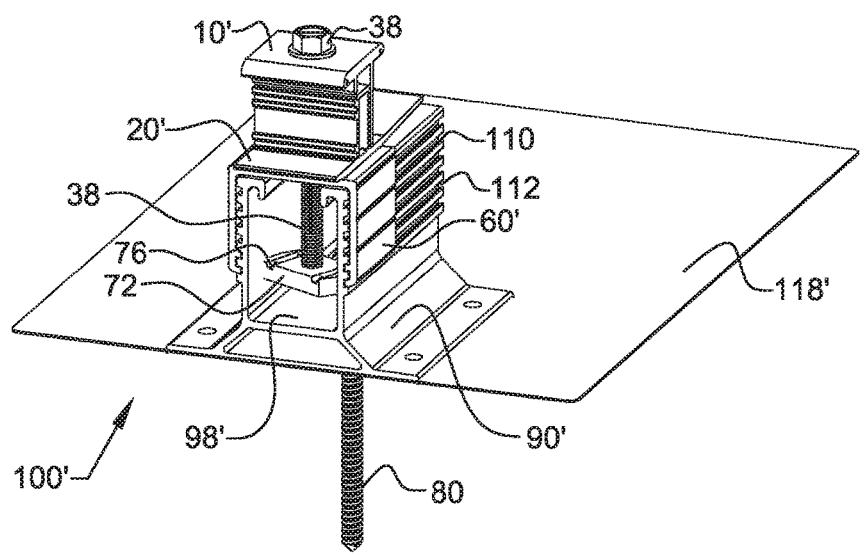
FIG. 29 is a perspective view of a support surface attachment device of a photovoltaic mounting system, according to a second embodiment of the invention, wherein the support surface attachment device is illustrated in an assembled state.

A second illustrative embodiment of a support surface attachment device is seen generally at 100' in FIG. 29. Referring to this figure, it can be seen that, in some respects, the second illustrative embodiment is similar to that of the first embodiment of the support surface attachment device 100. Moreover, some elements are common to both such embodiments. For the sake of brevity, the elements that the second embodiment of the support surface attachment device has in common with the first embodiment will not be discussed in detail because these components have already been described above.

Figure 43:
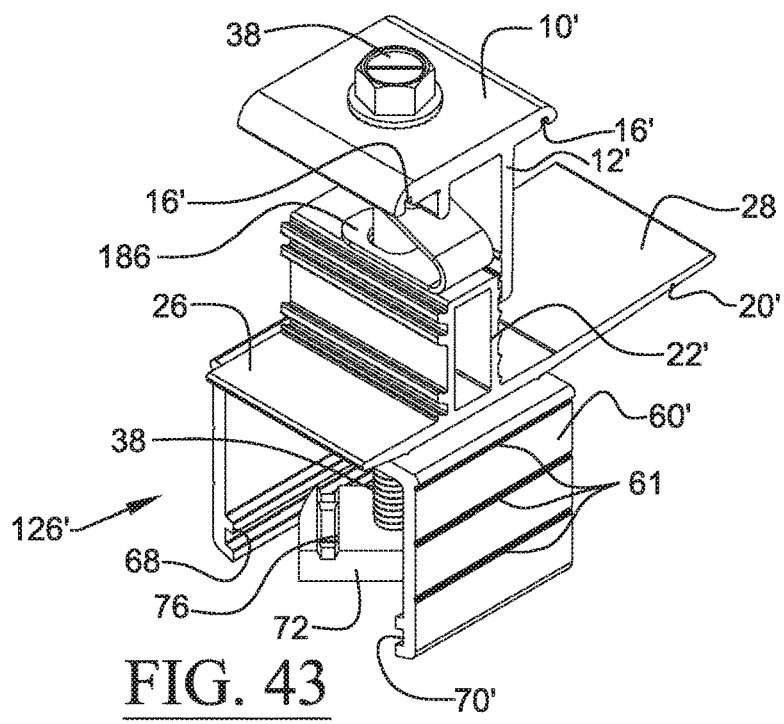
FIG. 43 is a perspective view of the clamp assembly of the support surface attachment device of FIG. 29, wherein the clamp assembly is illustrated in an assembled state.
Figure 44:
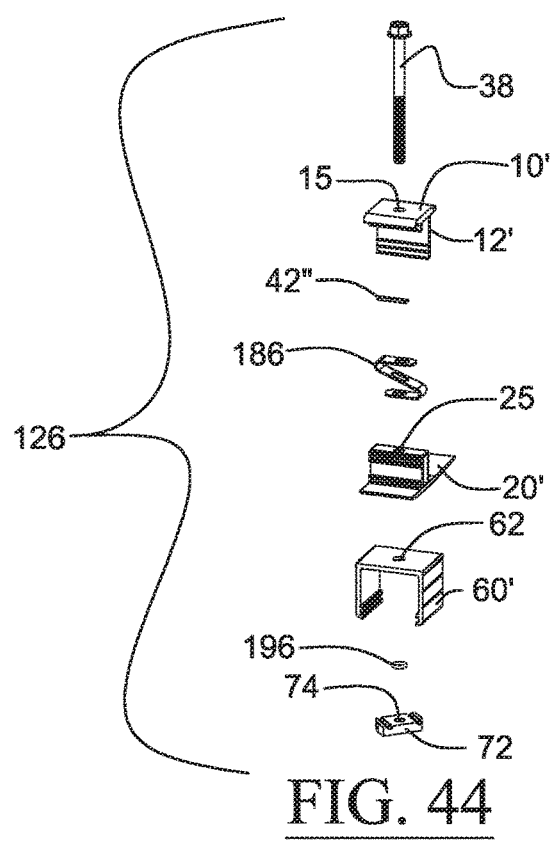
FIG. 44 is an exploded view of the clamp assembly of FIG. 43.

Initially, with reference to FIGS. 43 and 44, it can be seen that the second embodiment of the clamp assembly 126' generally includes an upper clamp member 10', a lower clamp member 20', and a glider member 60'. As best shown in the assembled view of FIG. 43, the upper clamp member 10', lower clamp member 20', and glider member 60' are connected to one another by means of a threaded fastener member 38 and a strut nut 72. As in the first illustrated embodiment, the threaded fastener member 38 is in the form of a bolt with a head portion having a serrated flange 40 (refer to FIG. 5). The strut nut 72 that is used in the second illustrative embodiment is also the same as that utilized in the first illustrative embodiment. As shown in the exploded view of FIG. 44, an O-ring 196 is provided on the shaft of the threaded fastener member 38. The O-ring 196 stabilizes the clamp assembly on the glider member 60' prior to installation.

Figure 30:
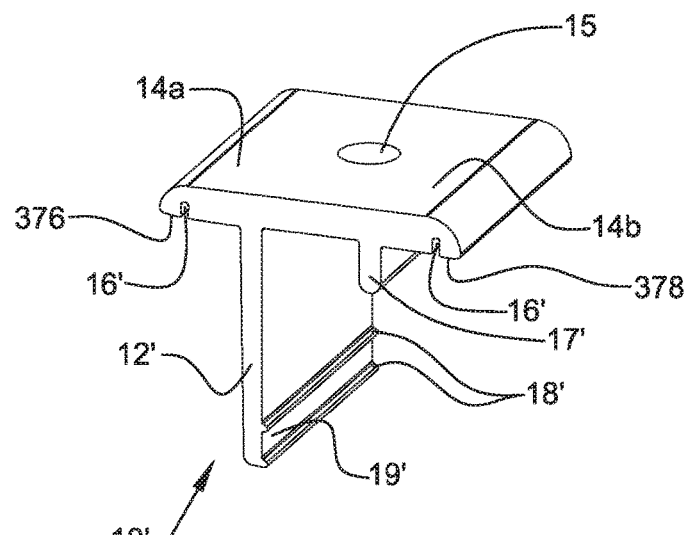
FIG. 30 is a perspective view of an upper clamp member of the clamp assembly of the support surface attachment device of FIG. 29.

Now, with reference to FIG. 30, the structure of the upper clamp member 10' of the second embodiment will be described. Similar to that described above for the first embodiment, the upper clamp member 10' generally includes a base portion 12' that is attached to the bottom surface of a flange portion 14a, 14b at approximately a 90 degree angle. In this figure, it can be seen that one side surface of base portion 12' comprises a pair of elongate protrusions or teeth 18' that are each spaced apart from one another by an elongate groove 19'. As will be described hereinafter, the pair of elongate protrusions or teeth 18' matingly engage with elongate protrusions or teeth 30' disposed on the first opposed wall portion 24a' of the upstanding middle portion 22' of the lower clamp member 20'. Referring again to FIG. 30, it can be seen that the flange portion 14a, 14b of the upper clamp member 10' further comprises a fastener aperture 15 for receiving the threaded fastener member 38 and a downwardly protruding member 17' that forms a back surface against which a photovoltaic module rests when disposed in the clamp assembly 126'. Also, as shown in FIG. 30, each of the flange portions 14a, 14b includes an elongate groove 16' disposed in the bottom surface thereof. Each of the elongate grooves 16' is configured to receive a projection portion 49' of a respective bonding clip 42' (see FIG. 31) that provides integrated grounding for the photovoltaic module installation. The projection portion 49' of each respective bonding clip 42' is received within its respective elongate groove 16' in a press-fit or interference-fit type mounting arrangement. Also, as shown in FIG. 30, the upper clamp member 10' of the clamp assembly comprises a pair of downwardly extending lip portions 376, 378 on opposite sides of the flanged top portion 14a, 14b of the upper clamp member 10'. The first downwardly extending lip portion 376 is shorter than the second downwardly extending lip portion 378 so as to facilitate the one or more photovoltaic modules being pivotably installed into the first side of the clamp assembly (i.e., into the side of clamp assembly with flange portion 14a). As such, the shorter downwardly extending lip portion 376 does not interfere with the minimum gap needed to allow pivoted north side PV module mounting.

Figure 45:
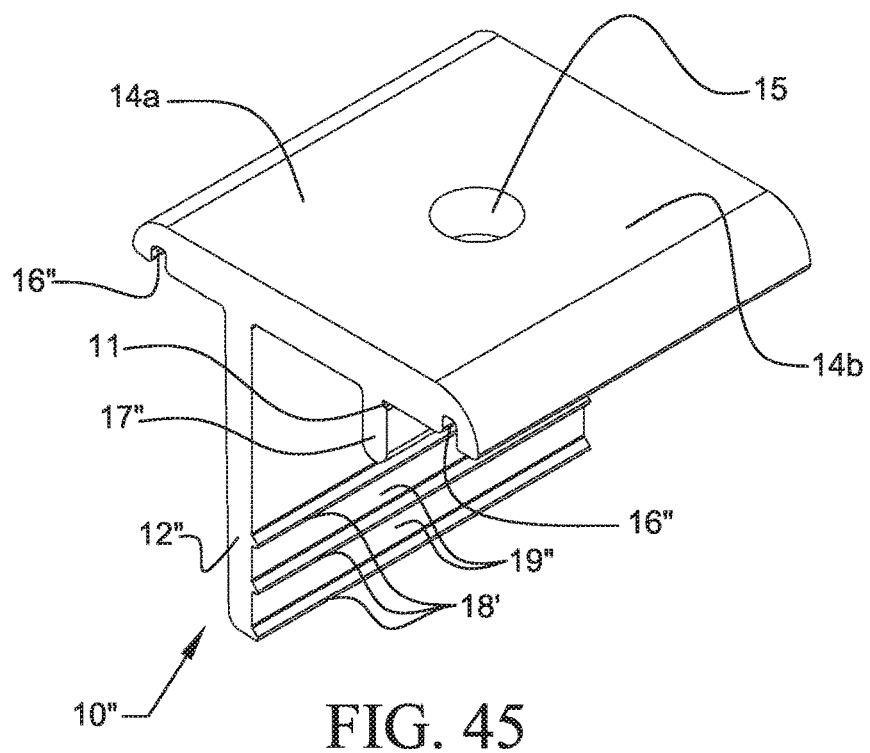
FIG. 45 is a perspective view of an upper clamp member of the clamp assembly of the support surface attachment device, according to an alternative embodiment of the invention.
Figure 46:
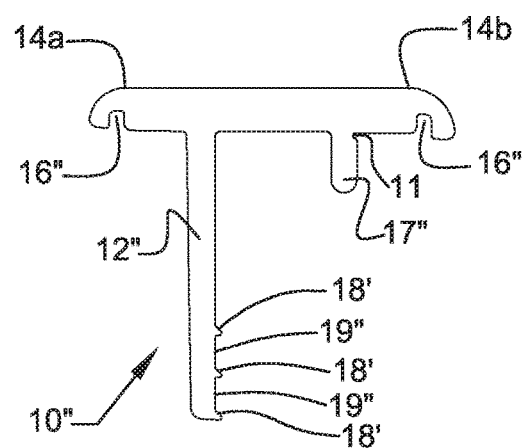
FIG. 46 is a side view of the upper clamp member of FIG. 46.
Figure 75:
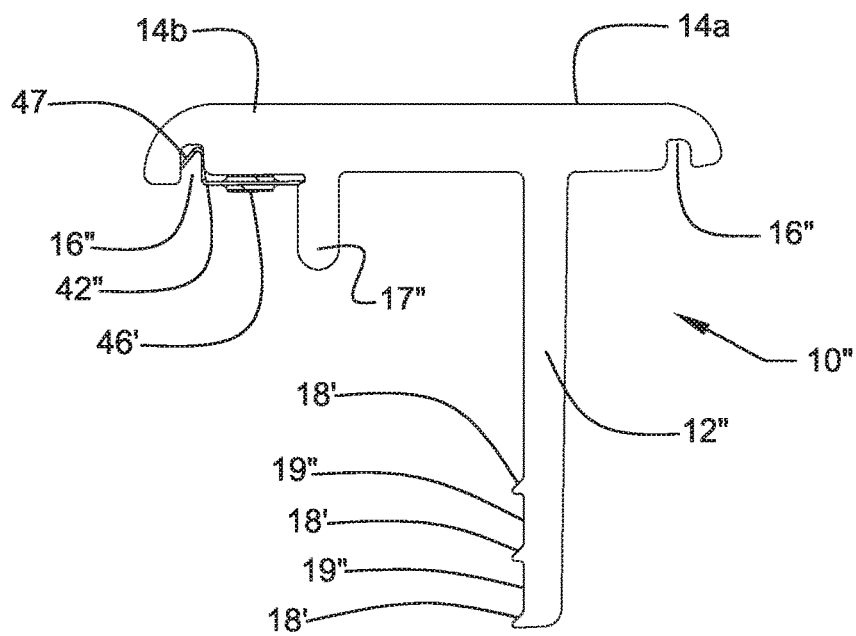
FIG. 75 is a side view of the upper clamp member of FIGS. 45 and 46 together with a bonding clip attached thereto, according to an embodiment of the invention.

A third illustrative embodiment of the upper clamp member 10" is shown in FIGS. 45 and 46. The third embodiment of the upper clamp member 10" is similar in most respects to the second embodiment of the upper clamp member 10' explained above. Like the second embodiment of the upper clamp member 10', the upper clamp member 10" in FIGS. 45 and 46 generally includes a base portion 12" that is attached to the bottom surface of a flange portion 14a, 14b at approximately a 90 degree angle. Although, in FIGS. 45 and 46, it can be seen that the one side of the base portion 12" of the upper clamp member 10" comprises three (3) elongate protrusions or teeth 18' that are each spaced apart from one another by respective elongate grooves 19", rather than the pair of elongate protrusions or teeth 18' described above for the second embodiment. Similar to the upper clamp member 10' of FIG. 30, each of the flange portions 14a, 14b of the upper clamp member 10" of FIGS. 45 and 46 includes an elongate groove 16" disposed in the bottom surface thereof for accommodating a respective bonding clip (e.g., bonding clip 42' in FIG. 31 or bonding clip 42" in FIG. 47). However, unlike the upper clamp member 10' of FIG. 30, the downwardly protruding member 17" of the upper clamp member 10" additionally contains a groove 11 formed in one side thereof for capturing an edge of the bonding clip (e.g., bonding clip 42' in FIG. 31 or bonding clip 42" in FIG. 47), and holding it in place (refer to FIG. 75).

Figure 31:
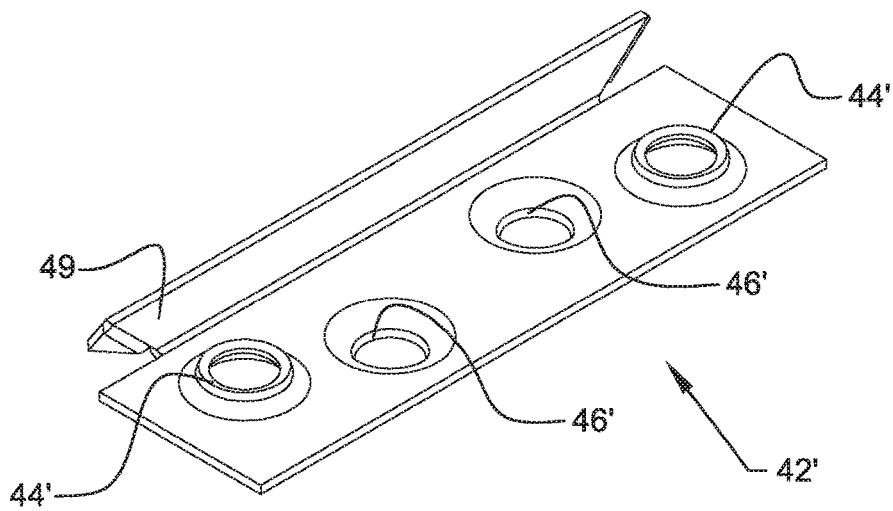
FIG. 31 is a perspective view of a bonding clip of the clamp assembly of the support surface attachment device of FIG. 29.
Figure 47:
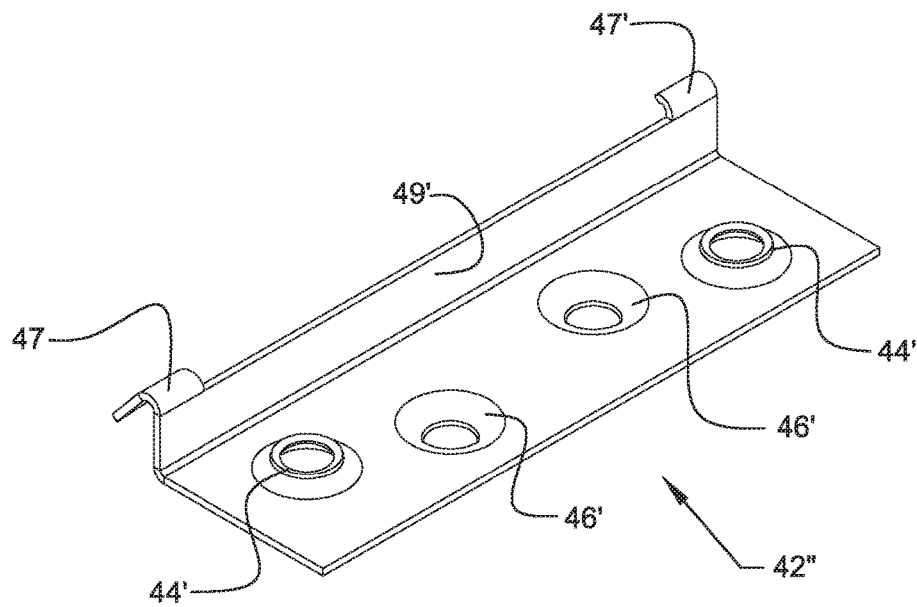
FIG. 47 is a perspective view of a bonding clip, according to an alternative embodiment of the invention.
Figure 81:
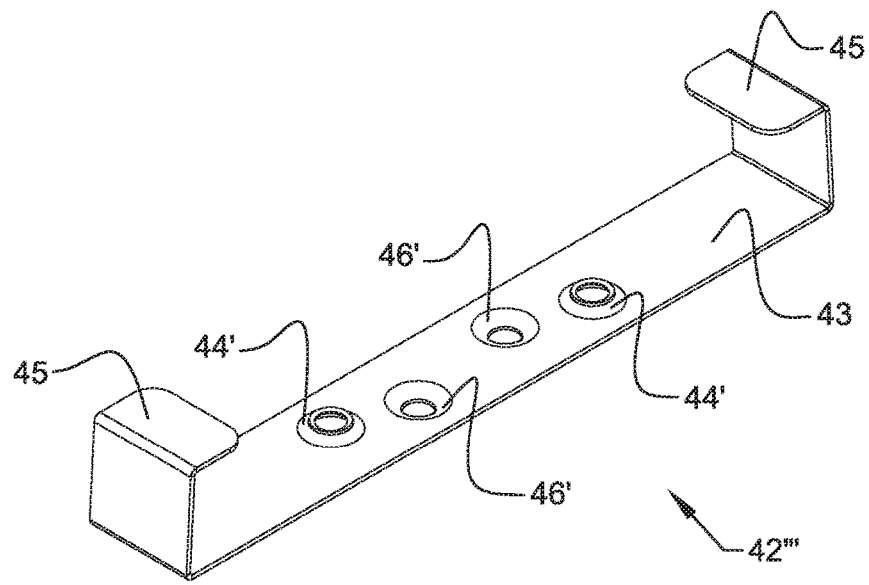
FIG. 81 is a perspective view of a bonding clip, according to another alternative embodiment of the invention.

Additional embodiments of the bonding or grounding clip, which provides integrated grounding for the photovoltaic modules, are illustrated in FIGS. 31, 47, and 81, respectively. Similar to the bonding clip 42 of FIG. 7 described above, the bonding clips 42', 42" of FIGS. 31 and 47 each comprise a plate-like body portion with a plurality of upwardly protruding annular members 44' and a plurality of downwardly protruding annular members 46' formed therein. In particular, in the illustrative embodiments, each of the upwardly protruding annular members 44' is arranged adjacent to a respective opposite end of the plate-like body portion, and the pair of downwardly protruding annular members 46' are disposed between the pair of upwardly protruding annular members 44'. The upwardly and downwardly protruding annular members 44', 46' are also generally arranged in a staggered, non-aligned configuration on the plate-like body portions of the bonding clips 42', 42". As explained above for bonding clip 42, the upwardly protruding members 44 are designed to pierce the metallic bottom surface of the flange portion 14a, 14b of the upper clamp member 10', while the downwardly protruding annular member 46 is designed to pierce the anodized layer of the photovoltaic module to provide integrated grounding between the photovoltaic modules.

Referring to bonding clip 42' in FIG. 31, it can be seen that a projection portion 49 is attached to the plate-like body portion of the bonding clip 42'. The projection portion 49 of the bonding clip 42' engages with a selected one of the elongate grooves 16', 16" in the upper clamp members 10', 10" so as to hold the bonding clip 42' in place. The bonding clip 42" of FIG. 47 also contains a projection portion 49' that is attached to the plate-like body portion of the bonding clip 42". As shown in FIG. 47, the projection portion 49' of the bonding clip 42" comprises a pair of spaced-apart bent over tabs 47, 47', wherein each tab 47, 47' is disposed at an opposite end of the projection portion 49'. Each of the tabs 47, 47' engages with a selected one of the elongate grooves 16', 16" in the upper clamp members 10', 10" in order to hold the bonding clip 42', 42" in place in the clamp assembly 126'. Also, similar to the bonding clips 42, 42', 42", the bonding clip 42''' of FIG. 81 comprises a plate-like body portion 43 with a plurality of upwardly protruding annular members 44' and a plurality of downwardly protruding annular members 46' formed therein. The plate-like body portion 43 of the clip 42''' is not folded over. Like the embodiment of FIGS. 31 and 47, the upwardly and downwardly protruding annular members 44', 46' of the clip 42''' are arranged in a staggered configuration. However, unlike the preceding embodiments of the bonding clip, the clip attachment portions of the bonding clip 42''' of FIG. 81 comprise a pair of flange members 45, each of which is disposed at an opposite end of the clip body portion 43. When the bonding clip 42''' is installed on an object (e.g., upper clamp members 10', 10"), a top portion of each of the pair of flange members 45 (i.e., the top fold of the flange members 45) remains visible to an installer so that an installed condition of the bonding clip 42''' is capable of being verified by the installer. Also, advantageously, the flange members 45 of the bonding clip 42''' allow the clip 42''' to be installed without the need to fully open the clamp assembly (i.e., the installer only needs to open the clamp a small amount). In one or more embodiments, the bonding clip 42''' may be used on the north side of a photovoltaic module row.

Figure 32:
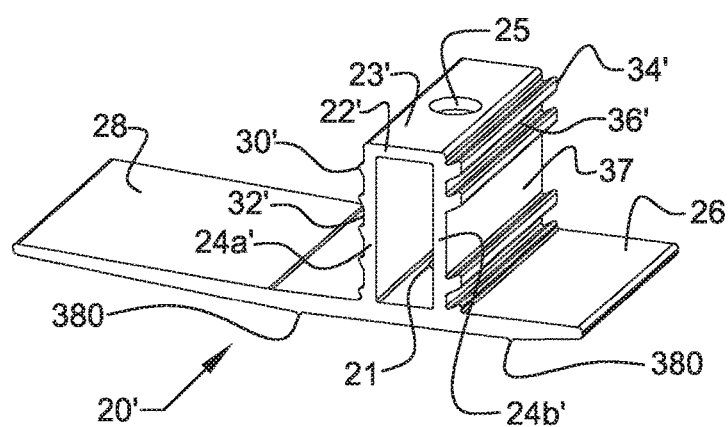
FIG. 32 is a perspective view of a lower clamp member of the clamp assembly of the support surface attachment device of FIG. 29.

Next, turning to FIG. 32, the structure of the second embodiment of the lower clamp member 20' will be explained. Similar to that described above for the lower clamp member 20, it can be seen that the lower clamp member 20' generally includes an upstanding middle portion 22' with first and second ledge portions 26, 28 extending outwardly from the upstanding middle portion 22' (refer to FIG. 32). In FIG. 32, it can be seen that the upstanding middle portion 22 of the lower clamp member 20 comprises a lower fastener aperture 21 disposed in a bottom wall portion thereof, and an upper fastener aperture 25 disposed in a top wall portion 23' thereof. Each of these apertures 21, 25 receives the shaft of the threaded fastener member 38. The bottom wall portion and the top wall portion 23' of the upstanding middle portion 22 of the lower clamp member 20 are connected to one another by first and second opposed wall portions 24a', 24b'. As shown in FIG. 32, the first opposed wall portion 24a' comprises a plurality of elongate protrusions or teeth 30' (e.g., with generally wedge-shaped cross-sections) that are each spaced apart from one another by respective elongate grooves 32'. As explained above, the elongate teeth 30' of the first opposed wall portion 24a' engage with the elongate teeth 18' of the base portion 12' of the upper clamp member 10'. Referring again to FIG. 32, it can be seen that the second opposed wall portion 24b' comprises a plurality of upwardly inclined elongate protrusions or teeth 34' that are spaced apart from one another by elongate grooves 36', 37. More particularly, the upper two (2) protrusions or teeth 34' are spaced apart from one another by the narrow width elongate groove 36', while the upper two (2) protrusions or teeth 34' are spaced apart from a bottom protrusion or tooth 34' disposed near the surface of the second ledge portion 28 by a wide elongate groove 37. The upwardly inclined elongate protrusions or teeth 34' on the second opposed wall portion 24b' are configured to engage with a wind deflector and/or a mounting skirt for deflecting wind up and over the photovoltaic array and/or improving the aesthetics of the array (see e.g., FIG. 72). Advantageously, the upwardly inclined elongate protrusions or teeth 34' allow the skirt to be dropped in at the appropriate height, and once the skirt is secured, the upward facing protrusions or teeth 34' resist torsional detachment from the lower clamp member 20' (e.g., due to ice expansion on the PV array applying a force against the skirt). Each of the first and second ledge portions 26, 28 of the lower clamp member 20 is configured to accommodate a photovoltaic module frame member resting thereon. As described above for the first embodiment of the lower clamp member 20, the second opposed ledge 28 of the lower clamp member 20' is bent slightly upward, or is tapered slightly upward at an acute angle, so as to be capable of performing the same functionality explained above for the lower clamp member 20. In addition, as shown in FIG. 32, the lower clamp member 20' of the clamp assembly comprises a plurality of ridges 380 disposed on a bottom surface thereof. The ridges 380 are configured to increase a frictional engagement between the lower clamp member 20' and the glider member 60' so as prevent the upper and lower clamp members 10', 20' of the clamp assembly from rotating relative to the glider member 60' when the threaded fastener member 38 is tightened by an installer (i.e., the ridges 380 increase the resistance to rotation of the clamp assembly on the glider member 60').

In the illustrated embodiment, one or more of the teeth or serrations 30' on the lower clamp member 20' are configured to engage one or more of the teeth or serrations 18' on the upper clamp member 10' when the threaded fastener 38 is being tightened so as to maintain a minimum gap between the upper clamp member 10' and the lower clamp member 20' for receiving one or more photovoltaic module frames of one or more photovoltaic modules when the one or more photovoltaic modules are pivotably installed into a first side (e.g., north side) of the clamp assembly. In an exemplary embodiment, the clamp assembly 10', 20' is designed to accept 32, 33, 35, 40, 45, and 50 millimeter (mm) PV modules. As such, in the exemplary embodiment, the serrations 18', 30' on the upper and lower clamp members 10', 20' are positioned to engage at the above mentioned dimensions. As the threaded fastener 38 of the clamp is tightened, the downhill side of the clamp contacts a module (e.g., the south side of the clamp), and a torque is applied to the upper clamp member 10' engaging the teeth. This allows the uphill side of the clamp (e.g., the north side of the clamp), to remain open, allowing the next module to slide in from above, and to be pivoted mounted in place.

In order to maintain a predetermined spacing distance between the upper and lower clamp members 10', 20' during PV module installation, a leaf spring member 186 is provided between the clamp members 10', 20' (refer to FIGS. 43 and 44). In an exemplary embodiment, the leaf spring member 186 may be Z-shaped. That is, as best shown in FIG. 43, the leaf spring member 186 is disposed between the top wall portion 23' of the lower clamp member 20' and the bottom surface of the flange portion 14a, 14b of the upper clamp member 10'. During the installation of the PV modules in the PV array, the spring member 186 holds the upper clamp member 10' in place above the lower clamp member 20' so that a PV module can be inserted between the two (2) clamp members 10', 20'. Without the use of the spring member 186, the flange 14a, 14b of the upper clamp member 10' would tend to just rest on the top of the lower clamp member 20', thereby making it very difficult to insert between the two (2) clamp members 10', 20'. In addition, the use of the spring member 186 in the clamp assembly 126' allows the fastener member 38 to be tightened so that the strut nut 72 engages the base and secures the clamp to the base 90' without the clamp being compressed.

Figure 73:
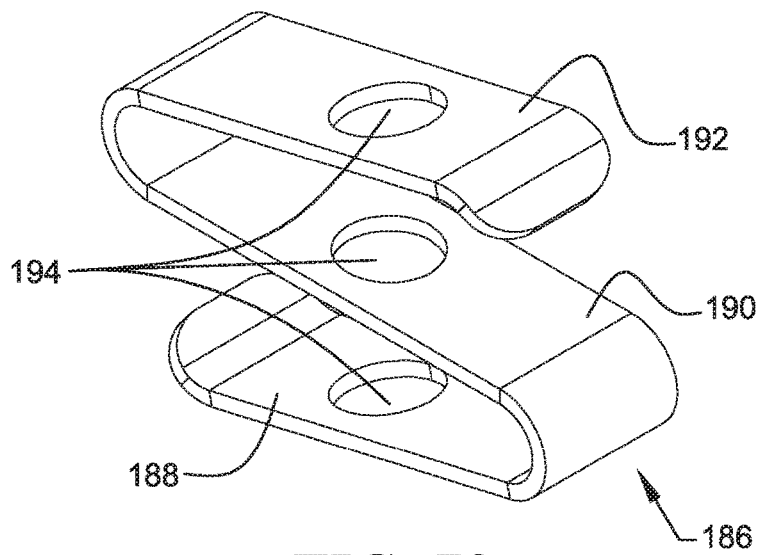
FIG. 73 is a perspective view of a first spring member that may be utilized in the clamp assembly of FIGS. 43 and 44, according to one embodiment of the invention.
Figure 74:
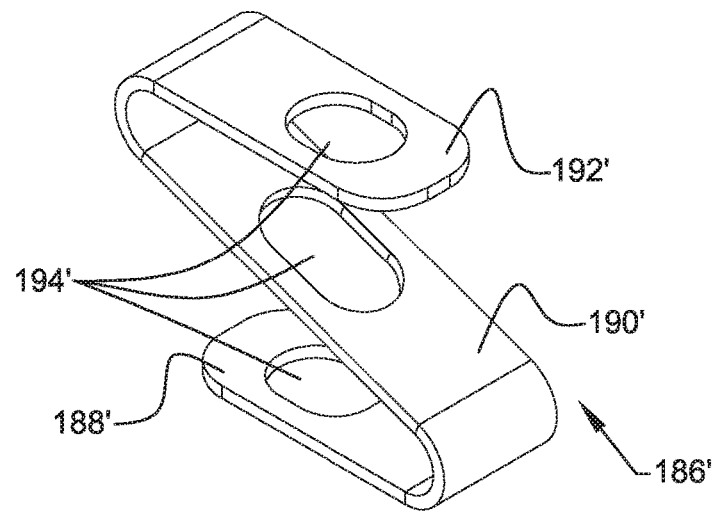
FIG. 74 is a perspective view of a second spring member that may be utilized in the clamp assembly of FIGS. 43 and 44, according to another embodiment of the invention.

Turning to FIG. 73, it can be seen that the leaf spring member 186 of the clamp assembly 126' comprises bottom and top leg portions 188, 192, which are connected to one another by a middle diagonal leg portion 190. Each of the leg portions 188, 190, 192 is provided with a respective fastener aperture 194 disposed therethrough for accommodating the shaft of the threaded fastener member 38. An alternative embodiment of the leaf spring member 186' is depicted in FIG. 74. Like the spring member 186, the leaf spring member 186' of FIG. 74 comprises bottom and top leg portions 188', 192', which are connected to one another by a middle diagonal leg portion 190'. However, it can be seen that the geometry of the leg portions 188', 190', 192' of the spring member 186' of FIG. 74 are slightly different than the leg portions 188, 190, 192 of the spring member 186 (e.g., the outer ends of the bottom and top leg portions 188', 192' are not bent like the bottom and top leg portions 188, 192 of the FIG. 73 embodiment). Also, similar to the spring member 186, each of the leg portions 188, 190, 192 of the spring member 186' in FIG. 74 is provided with a respective fastener aperture 194' disposed therethrough for accommodating the shaft of the threaded fastener member 38. However, it can be seen that the fastener apertures 194' are generally oval-shaped, rather than being circular as in FIG. 73.

Figure 33:
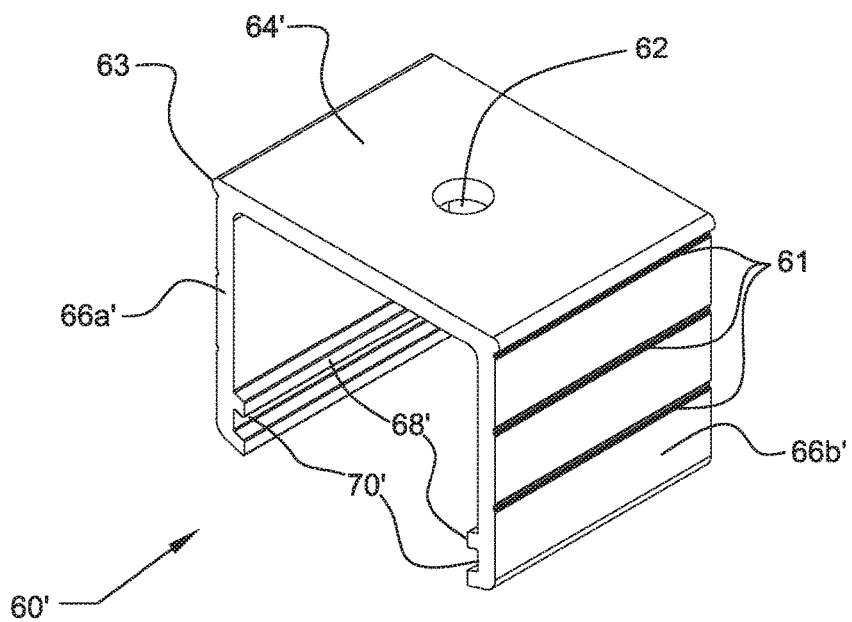
FIG. 33 is a perspective view of a glider member of the clamp assembly of the support surface attachment device of FIG. 29.

As best shown in FIG. 43, the lower clamp member 20' is positioned above a glider member 60' that is configured to be adjustably disposed on the upstanding base member 90' in both a horizontal and vertical direction, similar to that explained above for the glider member 60. Referring to FIG. 33, like the glider member 60 described above, it can be seen that the glider member 60' of the clamp assembly 126' comprises a generally inverted, U-shaped profile with a top wall portion 64' and first and second opposed wall portions 66a', 66b' extending downwardly from the top wall portion 64'. The top wall portion 64' comprises a fastener aperture 62 disposed centrally therein for receiving the shaft of the threaded fastener member 38. In FIG. 33, it can be seen that the inner surfaces of each of the first and second opposed wall portions 66a', 66b' comprises a pair of elongate protrusions or teeth 68' that are spaced apart from one another by a respective elongate groove 70'. The pair of teeth 68' on each of the inner surfaces of the opposed wall portions 66a', 66b' are designed to engage with respective teeth 110 on opposed upstanding wall portions 104a', 104b' of the base member 90'. The glider member 60' may be slid into place on the top of the base member 90' by engaging its teeth 68' with the teeth 110 of the base member 90'. To permit horizontal adjustability, the glider member 60' is capable of being slid along the length of the base member 90'. And, to permit vertical adjustability, the glider member 60' is capable of being adjusted placed along a vertical height of the upstanding wall portions 104a', 104b' of the base member 90' by selectively engaging certain ones of the teeth 68' on the glider member 60' with certain ones of the grooves 112 on the base member 90', and the groove 70' on the glider member 60' with a certain one of the teeth 110 on the base member 90'.

As shown in FIG. 33, the outer sides of the first and second opposed wall portions 66a', 66b' of the glider member 60' are provided with a plurality of generally parallel, visual indicator grooves 61 formed therein (e.g., three (3) visual indicator grooves 61). During the installation of the PV modules, the visual indicator grooves 61 operate as visual indicating bands for positioning the clamp assembly 126' at its desired height (i.e., the visual indicator grooves 61 enable the desired height of the clamp assembly 126' relative to the base member 90' to be more easily obtained by the installer during the PV module installation process). Also, referring again to FIG. 33, it can be seen that opposed protrusions 63 may be provided at the top of the glider member 60' for holding a chalk line (e.g., a string) in place that is used for the alignment of the PV module row on the support surface (e.g., roof). In an illustrative embodiment, the chalk line (e.g., a string) may be received within the topmost one of the grooves 61, and the lower two (2) grooves 61 may be used as visual aid indicators showing the height of the glider member 60' on the upstanding base member 90' (i.e., corresponding to the grooves 61).

Figure 34:
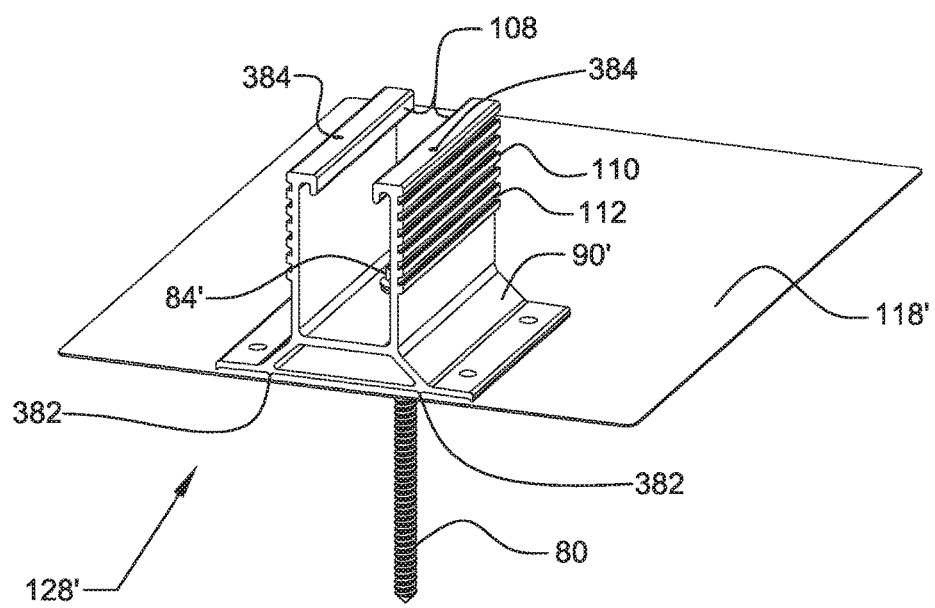
FIG. 34 is a perspective view of the base assembly of the support surface attachment device of FIG. 29, wherein the base assembly is illustrated in an assembled state.

Now, referring to FIGS. 29 and 34, it can be seen that the second illustrative embodiment of the base assembly 128' generally includes an upstanding base member 90' and a lower flashing member 118'. As best shown in the assembled view of FIG. 34, the upstanding base member 90' is connected to the lower flashing member 118' by a threaded fastener member 80. As described above for the first illustrated embodiment, the threaded fastener member 80 of the second embodiment is in the form of a structural mounting bolt with a head portion 82 and a threaded shaft portion (see FIG. 16). In the illustrated embodiment, each support surface attachment device 100' is secured to a respective one of the roof rafters of a building by means of a structural mounting bolt 80 (e.g., refer to FIG. 29).

Figure 35:
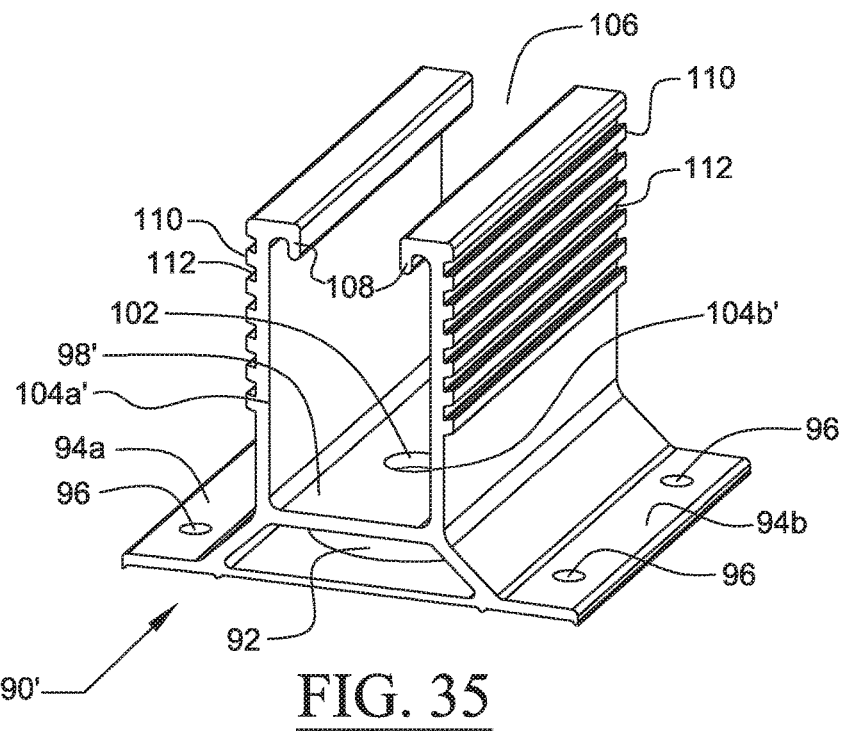
FIG. 35 is a perspective view of an upstanding base member of the base assembly of FIG. 34.

Turning to FIG. 35, the upstanding base member 90' of the base assembly 128' will now be described. As shown in this figure, the upstanding base member 90' generally comprises a base portion with first and second opposed base flange portions 94a, 94b and an elevated shelf portion 98'. Unlike the first embodiment of the upstanding base member 90', the elevated shelf portion 98' of the upstanding base member 90' does not comprise any recesses formed therein. Rather, the elevated shelf portion 98' is a generally planar plate that extends between the two (2) opposed upstanding wall portions 104a', 104b'. In FIG. 35, it can be seen that the opposed upstanding wall portions 104a', 104b' extend upwardly from the base portion of the base member 90'. Also, with reference to FIG. 35, it can be seen that each of the opposed base flange portions 94a, 94b comprises a plurality of fastener apertures 96 arranged in a substantially linear configuration along the length thereof. When it is desired to mount the upstanding base member 90' directly to the roof deck, rather than a roof rafter, the base member 90' is secured to the roof deck using fasteners disposed in the fastener apertures 96. The base portion of the base member 90' comprises a centrally disposed aperture 92 for accommodating the raised portion 122' of the flashing member 118' passing therethrough. The elevated shelf portion 98' of the base portion of the base member 90' comprises a flashing/fastener aperture 102 disposed therethrough for accommodating the top annular portion 125 of the flashing raised portion 122' and the shaft of the threaded fastener member 80 disposed within the flashing annular portion 125 (e.g., see the sectional view in FIG. 78). In FIG. 35, it can be seen that the outer surfaces of each of the first and second opposed upstanding wall portions 104a, 104b comprises a plurality of elongate protrusions or teeth 110 that are each spaced apart from one another by respective elongate grooves 112. As described above, the set of teeth 110 on each of the outer surfaces of the opposed wall portions 104a, 104b are designed to engage with the respective teeth 68' on the opposed wall portions 66a', 66b' of the glider member 60'. Also, as shown in FIG. 35, the opposed wall portions 104a', 104b' of the base member 90' cooperate to define an upper elongate slot 106 that accommodates the shaft of the threaded fastener member 38 passing therethrough. Also, each of the opposed wall portions 104a', 104b' comprises a downturned lip portion 108 that is received within a respective one of the elongate grooves 76 disposed in the top surface of the strut nut 72. Turning to FIG. 34, it can be seen that a bottom surface of the upstanding base member 90' may include a plurality of ridges 382 disposed thereon. The ridges 382 are configured to increase a frictional engagement between the upstanding base member 90' and the flashing member 118' so as prevent the upstanding base member 90' from rotating relative to the flashing member 118' when a base fastener member 80 is tightened by an installer (i.e., the ridges 382 slightly deform the flashing member 118' when the base member 90' is tightened against the flashing so as to resist the turning of the base member 90' relative to the flashing member 118'). Also, the ridges 382 disposed on the bottom surface of the upstanding base member 90' are additionally configured to capture and hold sealing tape (e.g., butyl tape) when the upstanding base member 90' is mounted directly against the support surface (e.g., directly against a roof deck in deck-mounted installation). Referring again to FIG. 34, it can be seen that a top surface of the upstanding base member 90' may include a plurality of visual installation guide marks 384 configured to facilitate an installation of one or more rows of the one or more photovoltaic modules (e.g., to facilitate the accurate setting of the south row in the PV module array).

Figure 37:
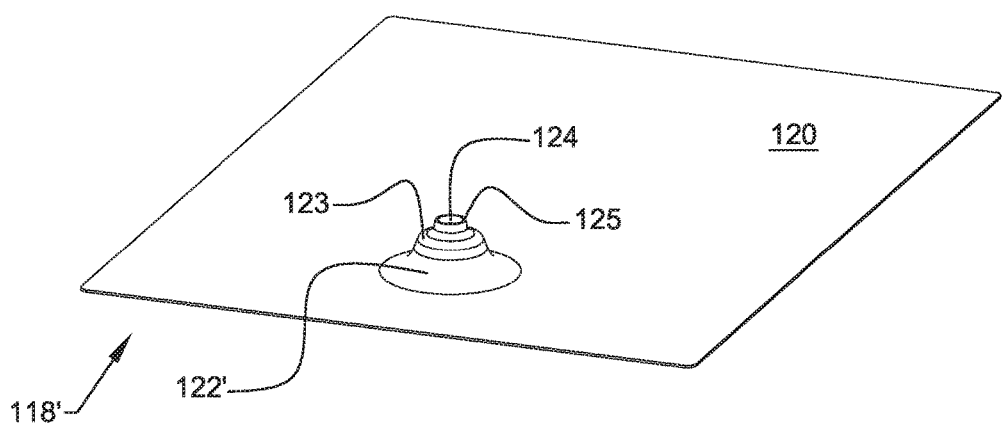
FIG. 37 is a perspective view of a flashing member of the base assembly of FIG. 34.

With reference primarily to FIG. 37, the flashing member 118' of the base assembly 128' will now be explained Like the flashing member 118 described above, the flashing member 118' helps to maintain the integrity of the building roof by preventing roof leaks. In FIG. 37, it can be seen that the flashing member 118' generally comprises a generally planar body portion 120' and a raised portion or projection 122' that extends upwardly from the generally planar body portion 120' in a generally vertical direction. As best shown in the perspective view of FIG. 37, the raised portion or projection 122' is offset with respect to the center of the generally planar body portion 120' (i.e., the raised portion or projection 122' is disposed to the side of the central point of the generally planar body portion 120'). In FIG. 37, it can be seen that the raised portion or projection 122' includes a centrally disposed fastener aperture 124 for receiving the shaft of the structural mounting bolt 80 therein. As shown in FIG. 37, the flashing raised portion 122' further includes a generally horizontal ledge portion 123 that extends radially inward towards the fastener aperture 124, and annular collar portion 125 that extends upwardly from the ledge portion 123 of the flashing raised portion 122'. As shown in the sectional view of FIG. 78, the bottom surface of the elevated shelf portion 98' of the base member 90' is disposed adjacent to the flashing ledge portion 123 in the assembled state of the base assembly 128', while the upstanding, annular collar portion 125 of the flashing raised portion 122' extends through the flashing/fastener aperture 102 in the base shelf portion 98' to help maintain the integrity of the building roof. As described above for the flashing member 118, the raised nature of the protrusion or projection 122' above the remainder of the generally planar body portion 120' of the flashing member 118' substantially prevents any precipitation (i.e., rain water) from entering the structure of the building roof through the fastener aperture 124. In the assembled state of the support surface attachment device 100', in order to further prevent any leaks through the aperture 124 of the flashing member 118', an upper sealing washer 84' (see FIGS. 76-78) is provided on the top of the annular collar portion 125 of the flashing raised portion 122' of the flashing member 118'.

Figure 78:
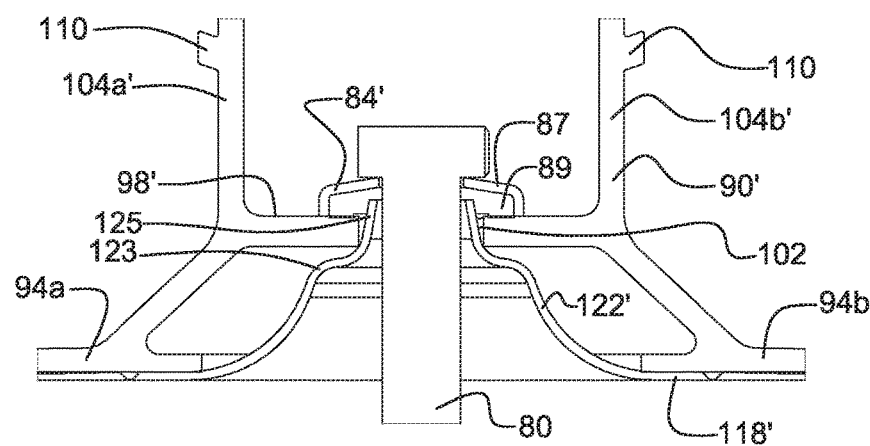
FIG. 78 is a partial sectional view cut through the base assembly of FIG. 34, wherein sealing engagement between the base member and the flashing member is shown.

In the illustrated embodiment of FIG. 78, when the upstanding base member 90' of the base assembly is assembled with the flashing member 118', a top surface of the circumferential ledge portion 123 of the raised portion 122' of the flashing member 118' is configured to regulate a height of the top annular portion 125 of the raised portion 122' of the flashing member 118' so that a top rim of the top annular portion 125 of the raised portion 122' does not protrude substantially above a top surface of the elevated shelf 98' of the upstanding base member 90'. That is, in the illustrative embodiment, when the base member 90' contacts the flashing member 118', the top annular portion 125 protrudes a small predetermined distance above the top surface of the elevated shelf 98'. The interface between the base member 90' and the flashing member 118' dictates the height of the flashing protruding above the base web or shelf 98', and it prevents the over compression of the sealing member 89 of the sealing washer 84'. The large radius at the base of the raised portion 122' of the flashing member 118' is designed to flex to accommodate various roof conditions further increasing the uniformity of sealing interface.

Figure 76:
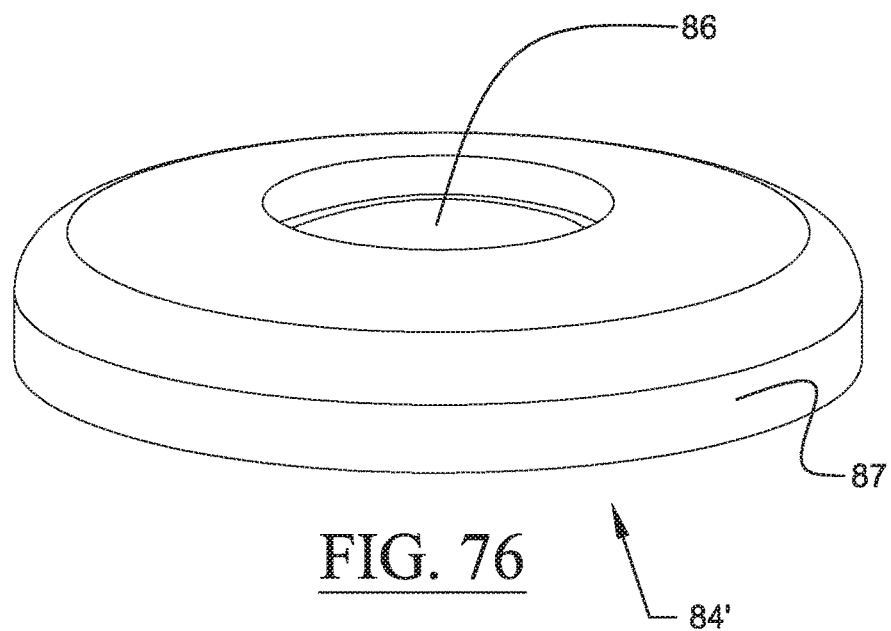
FIG. 76 is a perspective view of an upper sealing washer of the base assembly of FIGS. 34 and 78, according to an embodiment of the invention.
Figure 77:
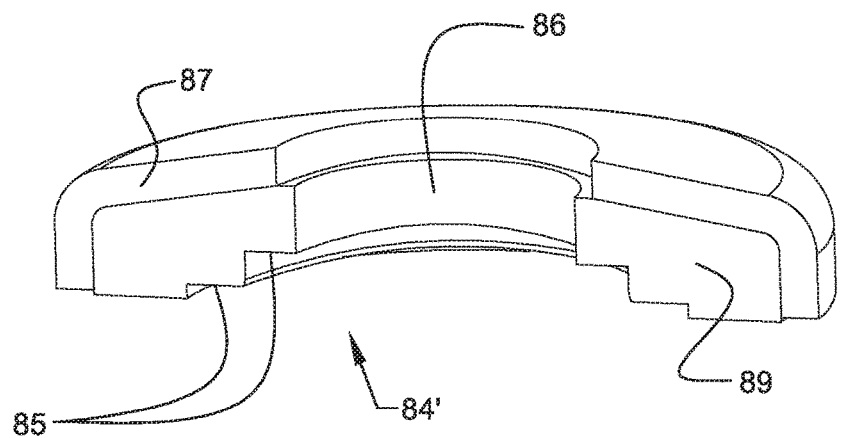
FIG. 77 is a sectional view cut through the upper sealing washer of FIG. 76.

With combined reference to FIGS. 76-78, it can be seen that the upper sealing washer 84' comprises a fastener aperture 86 disposed therethrough for accommodating the shaft of the structural mounting bolt 80. The upper sealing washer 84' is disposed between the bottom surface of the head portion 82 of the bolt 80 and the top surface of the elevated shelf portion 98' of the base member 90' to additionally prevent any leaks through the roof. As shown in FIGS. 76-78, the upper sealing washer 84' comprises a top outer portion 87 and a bottom inner portion 89 disposed within, and underneath the top outer portion 87. In one exemplary embodiment, the top outer portion 87 of the upper sealing washer 84' may be formed from stainless steel and the bottom inner portion 89 of the upper sealing washer 84' may be formed from a suitable plastic or rubber, such as ethylene propylene diene monomer (EPDM). In one or more embodiments, the upper sealing washer 84' is a cup washer that is configured to control the type and/or amount of washer compression so that, when compressed by the tightening of the bolt 80, the EPDM inner portion 89 of the washer 84' will not enter into the annular gap between the outer surface of the flashing annular collar portion 125 and the inner circular wall of the flashing/fastener aperture 102 in the base shelf portion 98' of the base member 90'. That is, the compression of the upper sealing washer 84' is regulated so as to seal around the outer sidewall of the flashing annular collar portion 125, but not enter the annular gap between the flashing annular collar portion 125 and the inner circular wall of the flashing/fastener aperture 102, thereby creating an efficient waterproof seal for the base assembly 128'.

As best shown in the illustrative embodiment of FIG. 77, the bottom inner portion 89 of the upper sealing washer 84' may comprise a stepped and/or upwardly tapered bottom surface 85 so as to tightly engage the top rim of the flashing annular collar portion 125, and to prevent the EPDM inner portion 89 of the washer 84' from entering the fastener aperture 124 in the flashing member 118' (see FIGS. 37 and 78).

Advantageously, the design of the flashing member 118' illustrated in FIGS. 34, 37, and 78 results in superior waterproofing because its water seal is elevated above the roof surface (i.e., at the top of the raised portion or projection 122') so that the integrity of the flashing waterproofing is maintained. Also, because the flashing member 118' may be formed by stamping, its manufacturing costs are inexpensive. In addition, the configuration of the flashing member 118' allows adjacent flashing members 118' to be readily stacked for compact shipping.

Figure 36:
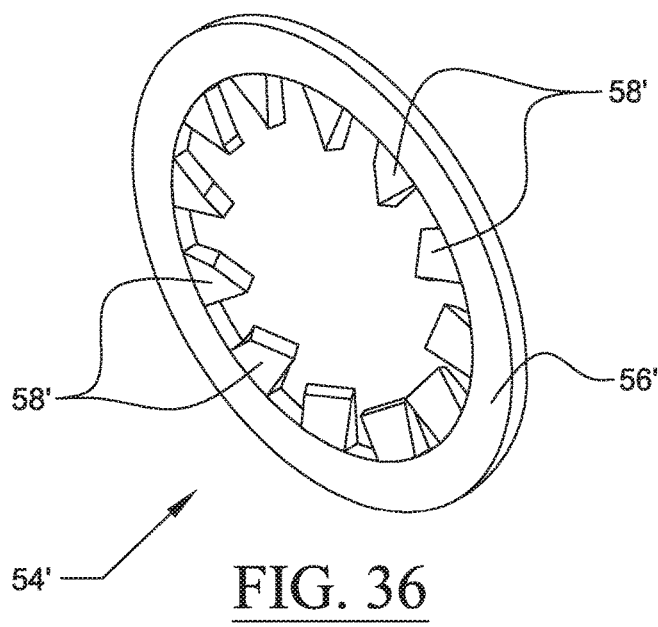
FIG. 36 is a perspective view of a washer of the clamp assembly of the support surface attachment device of FIG. 29.

With reference to FIG. 36, in the illustrative embodiment, the base assembly 128' may be further provided with a serrated washer 54' disposed between the ledge portion 123 of the flashing raised portion 122' and the bottom surface of the elevated shelf portion 98' of the base member 90' when the base member 90' is disposed on top of the flashing member 118' in the assembled state of the support surface attachment device 100'. The serrated washer 54' is used for electrically grounding the base assembly 128' by creating a current path between the base member 90' and the flashing member 118'. In FIG. 36, it can be seen that the serrated washer 54' includes an outer annular body portion 56' with a plurality of diagonally-oriented teeth 58' extending radially inward from the outer annular body portion 56'. The diagonally-oriented teeth 58' of the serrated washer 54' are designed to cut into the adjacent surfaces of the base member 90' and the flashing member 118' so as to provide an electrical grounding path between the two components so that the two components are electrically bonded to one another.

Figure 40:
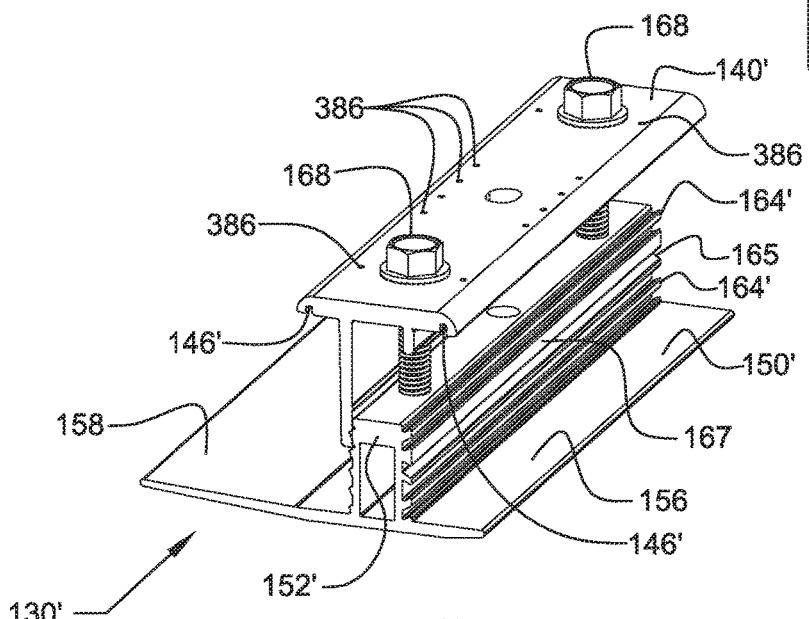
FIG. 40 is a perspective view of a coupling device of a photovoltaic mounting system, according to a second embodiment of the invention, wherein the coupling device is illustrated in an assembled state.
Figure 41:
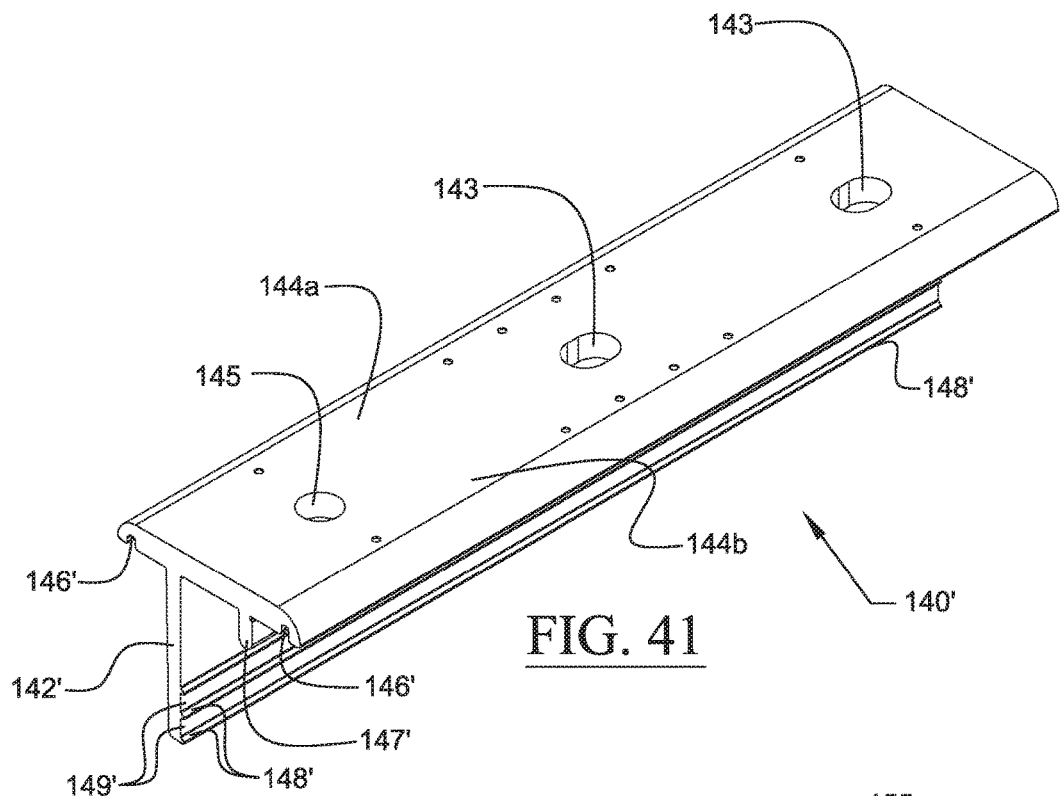
FIG. 41 is a perspective view of an upper coupling member of the coupling device of FIG. 40.
Figure 42:
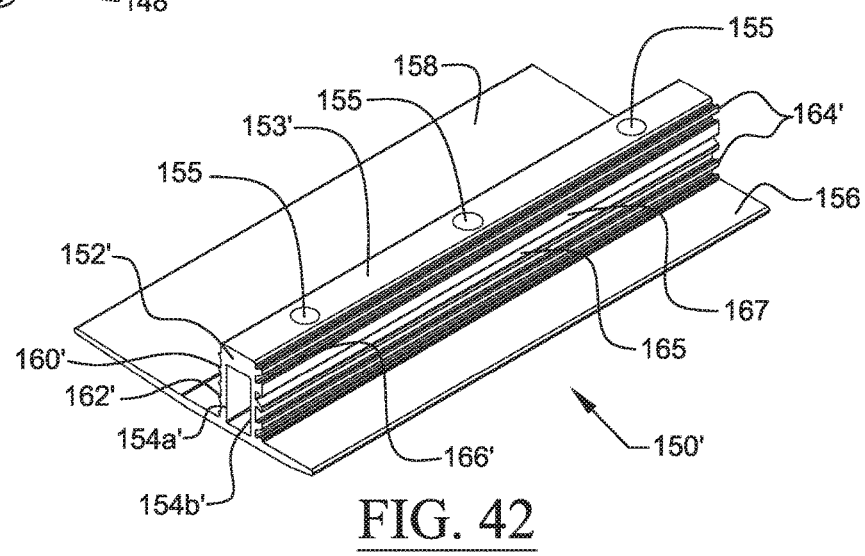
FIG. 42 is a perspective view of a lower coupling member of the coupling device of FIG. 40.

Now, with reference to FIGS. 40-42, it can be seen that, like the coupling assembly 130 described above, the second illustrative embodiment of the coupling assembly 130' generally includes an upper coupling member 140' secured to a lower coupling member 150'. As best shown in the assembled view of FIG. 40, the upper coupling member 140' and the lower coupling member 150' are connected to one another by means of one or more threaded fastener members 168 (e.g., two (2) threaded fastener members 168) and one or more respective captive nuts 170 (e.g., two (2) captive nuts 170, one for each threaded fastener member 168). In the illustrated embodiment, each threaded fastener member 168 is in the form of a bolt with a head portion having a serrated flange (e.g., refer to FIG. 40).

Turning to FIG. 41, the structure of the upper coupling member 140' will be described. As shown in this figure, the upper coupling member 140' generally includes a base portion 142' that is attached to the bottom surface of a flange portion 144*a*, 144*b* at approximately a 90 degree angle. In this figure, it can be seen that one side surface of base portion 142' comprises a plurality of elongate protrusions or teeth 148' that are each spaced apart from one another by respective elongate grooves 149'. As will be described hereinafter, the plurality of elongate protrusions or teeth 148' matingly engage with elongate protrusions or teeth 160' disposed on the first opposed wall portion 154*a*' of the upstanding middle portion 152' of the lower coupling member 150'. Referring again to FIG. 41, it can be seen that the flange portion 144*a*, 144*b* of the upper coupling member 140 further comprises a plurality of fastener apertures 143, 145 for receiving respective threaded fastener members 168 and a downwardly protruding member 147' that forms a back surface against which a photovoltaic module rests when disposed in the coupling assembly 130. In the illustrative embodiment of FIG. 41, it can be seen that each of fastener apertures 143 has a generally oval shape, while the fastener apertures 145 has a generally circular shape. Also, as shown in FIG. 41, each of the flange portions 144*a*, 144*b* includes an elongate groove 146' disposed in the bottom surface thereof. Each of the elongate grooves 146' is configured to receive one or more projection portions 49, 49' of the bonding clip 42', 42" that provides integrated grounding for the photovoltaic module installation. The projection portion 49, 49' of each bonding clip 42', 42" is received within its respective elongate groove 146' in a press-fit or interference-fit type mounting arrangement. Turning to FIG. 41, it can be seen that a top surface of flanged portion 144*a*, 144*b* of the upper coupling member 140' may include a plurality of visual installation guide marks 386 to indicate locational limits of mounting the one or more photovoltaic modules within the coupling device 130' (i.e., location limits of mounting against the PV modules).

Next, turning to FIG. 42, the structure of the lower coupling member 150' will be explained. With reference to this figure, it can be seen that the lower coupling member 150' generally includes an upstanding middle portion 152' with first and second ledge portions 156, 158 extending outwardly from the upstanding middle portion 152'. In FIG. 42, it can be seen that the upstanding middle portion 152' of the lower coupling member 150' comprises spaced-apart lower fastener apertures disposed in a bottom wall portion thereof, and spaced-apart upper fastener apertures 155 disposed in a top wall portion 153' thereof. Each of these apertures receives a respective shaft of a respective threaded fastener member 168. The bottom wall portion and the top wall portion 153' of the upstanding middle portion 152' of the lower coupling member 150' are connected to one another by first and second opposed wall portions 154*a*', 154*b*'. As shown in FIG. 42, the first opposed wall portion 154*a*' comprises a plurality of elongate protrusions or teeth 160' that are each spaced apart from one another by respective elongate grooves 162'. As explained above, the elongate teeth 160' of the first opposed wall portion 154*a*' engage with the elongate teeth 148' of the base portion 142' of the upper coupling member 140'. Referring again to FIG. 42, it can be seen that the second opposed wall portion 154*b*' comprises a plurality of elongate upwardly inclined protrusions or teeth 164', one or more elongate downwardly inclined protrusions or teeth 165, and one or more elongate V-shaped protrusions or teeth 167. As shown in FIG. 42, the protrusions or teeth 164', 165, 167 are spaced apart from one another by elongate grooves 166'. The protrusions or teeth 164', 165, 167 on the second opposed wall portion 154*b*' of the base portion 142' of the lower coupling member 150' are configured to engage with a wind deflector and/or a mounting skirt for deflecting wind up and over the photovoltaic array and/or improving the aesthetics of the array, as will be described hereinafter. Each of the first and second ledge portions 156, 158 of the lower coupling member 150 is configured to accommodate a photovoltaic module frame member resting thereon. As shown in FIG. 42, the protrusions or teeth 164', 165, 167 of the lower coupling member 150' comprise a plurality of mating protrusions or teeth 164', 165, 167 disposed in alternating upward and downward orientations so that the coupling device 130' is capable of remaining in engagement with the skirt member 174" prior to the threaded fastening members 168 being tightened by an installer. For example, in one or more embodiments, the coupling device 130' is initially slid on the skirt member 174" by the installer, and once slid on, the coupling device 130' will stay in place and the installer can take his or her hand off the coupling device 130'. The alternating protrusions or teeth 164', 165, 167 of the lower coupling member 150' allow the coupling device 130' to stay in place on the skirt member 174".

In the illustrated embodiment, one or more of the teeth or serrations 160' on the lower coupling member 150' are configured to engage one or more of the teeth or serrations 148' on the upper coupling member 140' when the threaded fasteners 168 are being tightened so as to maintain a minimum gap between the upper coupling member 140' and the lower coupling member 150' for receiving one or more photovoltaic module frames of one or more photovoltaic modules when the one or more photovoltaic modules are pivotably installed into a first side (e.g., north side) of the coupling assembly 130'. In an exemplary embodiment, the coupling assembly 130' is designed to accept 32, 33, 35, 40, 45, and 50 millimeter (mm) PV modules. As such, in the exemplary embodiment, the serrations 148', 160' on the upper and lower coupling members 140', 150' are positioned to engage at the above mentioned dimensions. As the threaded fasteners 168 of the coupling are tightened, the downhill side of the coupling contacts a module (e.g., the south side of the coupling), and a torque is applied to the upper coupling member 140' engaging the teeth. This allows the uphill side of the coupling (e.g., the north side of the coupling), to remain open, allowing the next module to slide in from above, and to be pivoted mounted in place.

Figure 38:
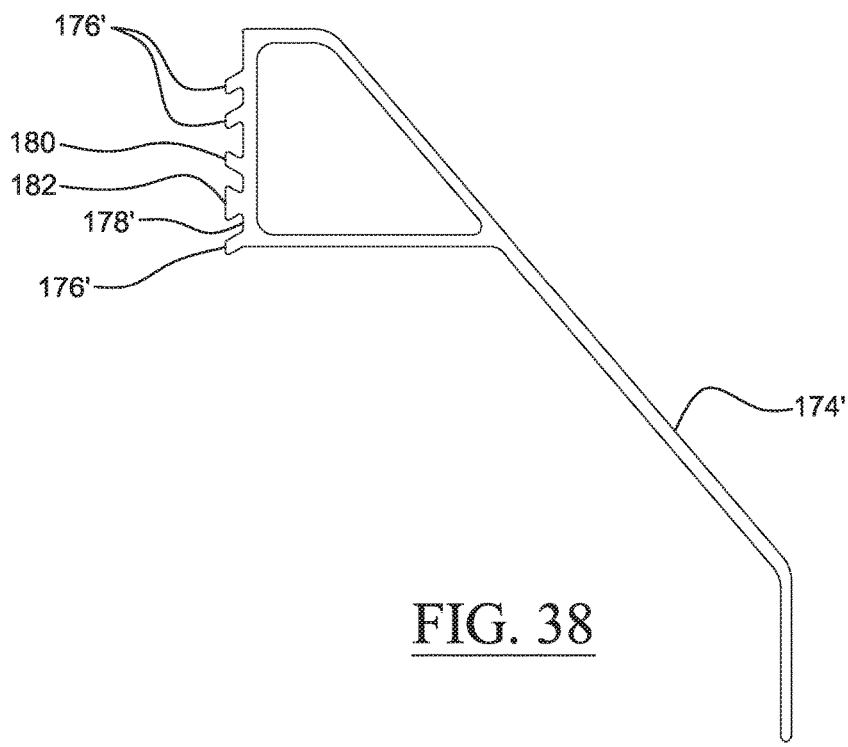
FIG. 38 is an end view of a lower skirt member, according to another embodiment of the invention.
Figure 39:
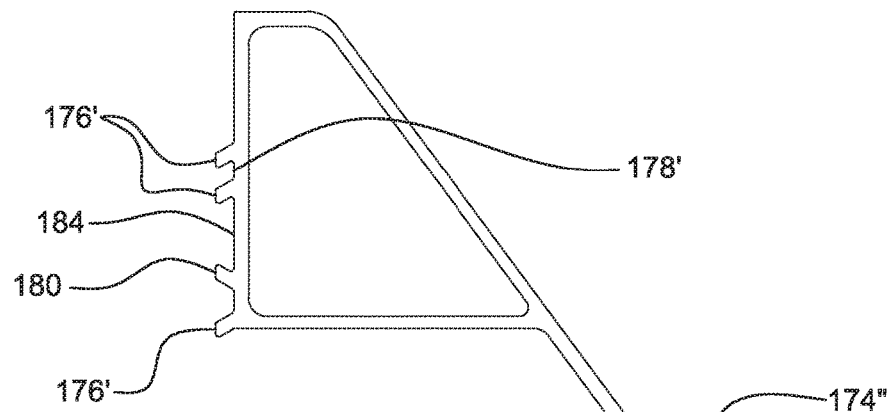
FIG. 39 is an end view of a lower skirt member, similar to the lower skirt member illustrated in FIG. 38, according to yet another embodiment of the invention.
Figure 72:
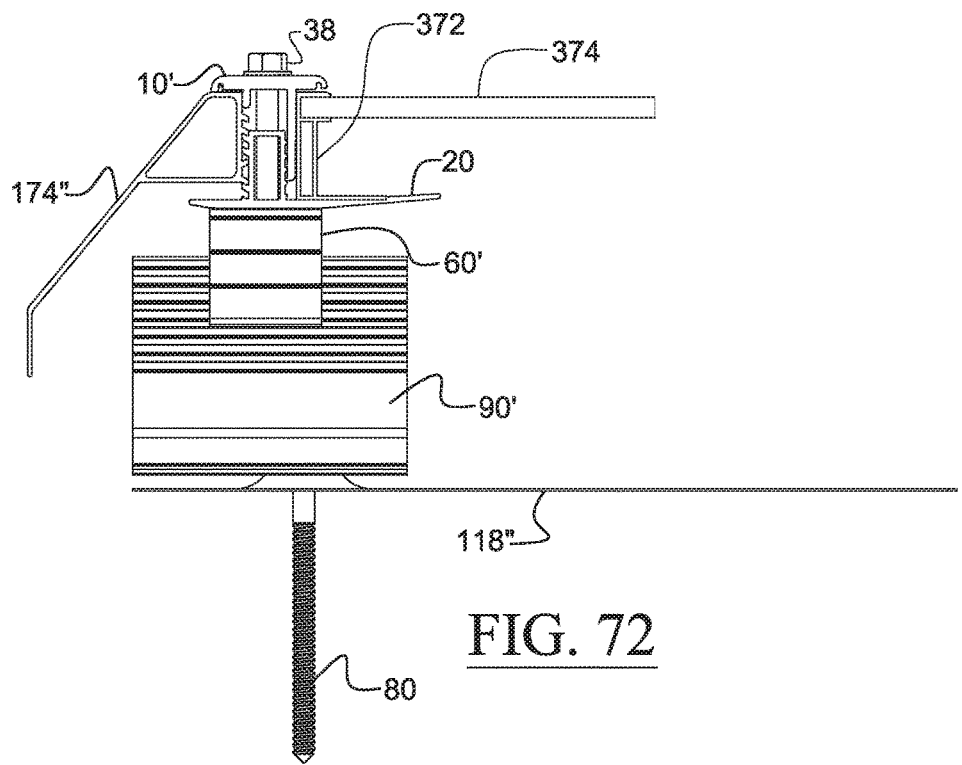
FIG. 72 is an end view illustrating the support surface attachment device of FIG. 29 together with a lower skirt member connected to the support surface attachment device, according to an embodiment of the invention.

With reference to FIGS. 38, 39, and 72, additional embodiments of the lower skirt member 174', 174" of the photovoltaic mounting system will be described. Initially, referring to the end view of FIG. 72, it can be seen that the skirt member 174', 174" is configured to be located on the southernmost edge of the array of PV modules. The skirt member 174', 174" is supported by spaced-apart support surface attachment devices 100'. In particular, as shown in the end view of FIG. 72, the skirt member 174" engages with the upper clamp member 10' and the lower clamp member 20' of the clamp assembly 126' of the support surface attachment device 100'. As shown in this figure, the skirt member 174" is clampingly engaged by the upper clamp member 10', and is additionally engaged by the teeth 34' of the lower clamp member 20' (e.g., on the south side of the clamp). FIG. 72 also illustrates the photovoltaic module frame 372 of the photovoltaic module 374 engaged with the side of the clamp assembly 10', 20' that is opposite to the side on which the skirt member 174" is engaged (e.g., the north side).

Figure 85:
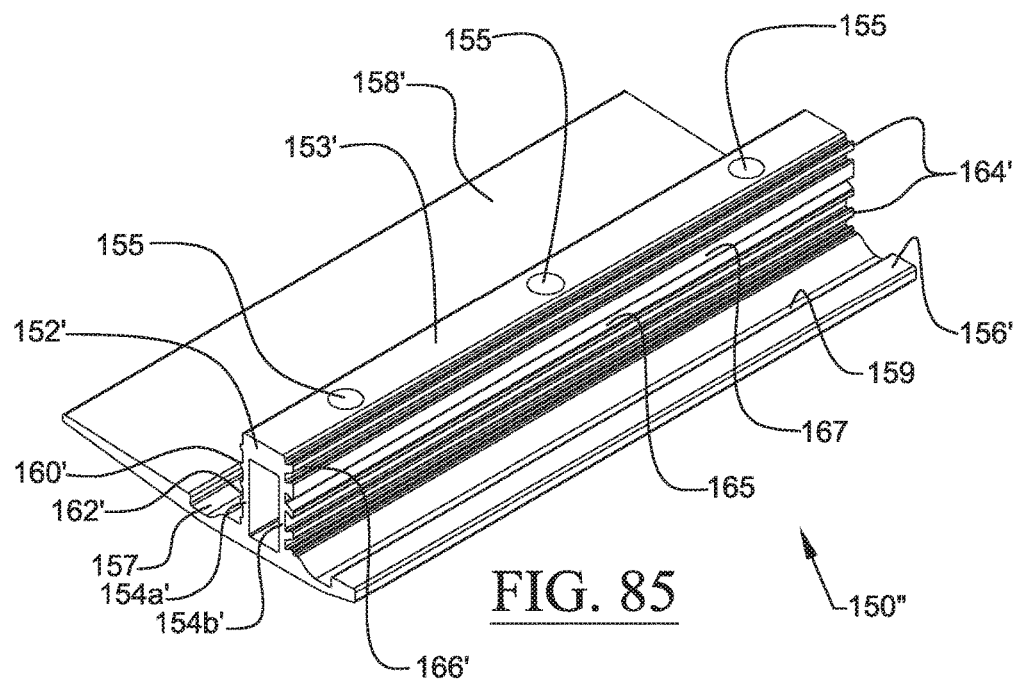
FIG. 85 is a perspective view of a lower coupling member of a coupling device, according to an alternative embodiment.

Now, with reference to FIG. 85, an alternative of a lower coupling member 150''' will be described. The lower coupling member 150''' of FIG. 85 is similar in most respects to the lower coupling member 150' of FIG. 42 explained above. Although, unlike the lower coupling member 150', the first and second ledge portions 156', 158' of the lower coupling member 150''' are provided with respective drainage troughs 157, 159 formed therein for draining water from one or more photovoltaic modules that incorporate a module drainage feature.

Referring again to FIGS. 39 and 72, the engagement between the skirt member 174" and the lower clamp member 20' will be explained in more detail. As shown in the end view of FIG. 39, a backside of the skirt member 174" comprises a plurality of downwardly-directed protrusions or teeth 176' and one or more upwardly-directed protrusions or teeth 180 that are spaced apart from one another by elongate grooves or gaps 178', 184. More particularly, the upper two (2) protrusions or teeth 176' are spaced apart from one another by the narrow width elongate groove 178', while the pair of upper protrusions or teeth 176' are spaced apart from upwardly-directed protrusion or tooth 180 by a wide elongate groove or gap 184. With reference to the end view of FIG. 72, it can be seen that at least some of the protrusions or teeth 176', 180 of the skirt member 174" matingly engage with at least some of the protrusions or teeth 34' on the lower clamp member 20'. This engagement between the protrusions or teeth 34', 176', 180 enables the skirt member 174" to be securely supported on the clamp assembly 126'. The protrusions or teeth 164' on the lower coupling member 150' engage with the protrusions or teeth 176', 180 of the skirt member 174''' in a manner that is generally the same as that of the protrusions or teeth 34' on the lower clamp member 20'. Advantageously, the protrusions or teeth 176', 180, 34' on the skirt member 174" and the lower clamp member 20', respectively, allows the skirt member 174" to be mounted at various heights relative to the lower clamp member 20' so that the skirt member 174' is capable of matching the height of many different PV modules. This is important because then the skirt member 174" sets the gap size of the clamp assembly 126' and the coupling assembly 130' on the south row of the PV array to accept the first row of PV modules.

Another embodiment of the skirt member 174' is illustrated in FIG. 38. The skirt member 174' of FIG. 38 is similar in many respects to the skirt member 174" of FIG. 39 that was described above. However, unlike the skirt member 174", the skirt member 174' of FIG. 38 additionally comprises a V-shaped protrusions or tooth 182 disposed on the backside of the skirt member 174'. As shown in this figure, the V-shaped protrusions or tooth 182 is disposed between the bottommost downwardly-directed protrusion or tooth 176' and the upwardly-directed protrusion or tooth 180. The skirt member 174' of FIG. 38 is designed to be used with a PV array comprising PV modules with specific heights, while the skirt member 174" of FIG. 39 is designed to be used with a PV array comprised of PV modules of different heights. Advantageously, the upwardly-directed protrusions or teeth 34' on the lower clamp member 20', and the downwardly-directed protrusion or teeth 176' on the skirt members 174', 174", allow the skirt members 174', 174" to be dropped into the clamp assemblies 126' from the side, thereby greatly facilitating the installation of the PV array by obviating the need to slide the skirt members 174', 174" into the clamp assemblies 126' from the end of the PV array. The skirt members 174', 174" are able to be slid into the coupling assemblies 130 without difficulty during the installation of the PV array.

Figure 48:
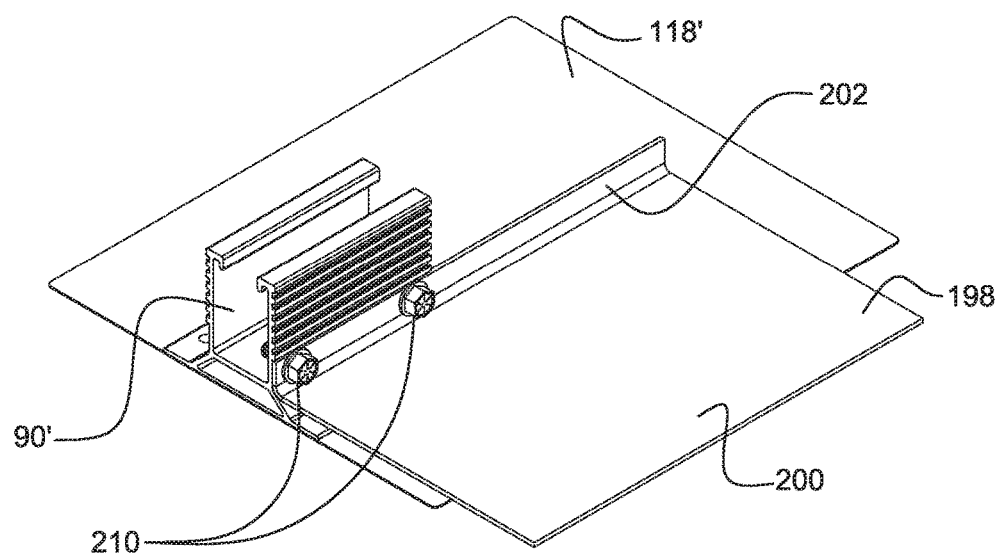
FIG. 48 is a perspective view of a junction box bracket attached to a base member, according to one embodiment of the invention.

Now, with reference to FIGS. 48-71 79, and 80, various accessories of the sloped roof solar panel mounting system will be described. Initially, turning to FIGS. 48-50, the junction box bracket 198, 198' will be explained. In the PV array, the junction box bracket 198, 198' holds a junction box where PV module wires terminate at the end of the array. The junction box bracket 198, 198' may be provided with pre-drilled holes or self-drilling/self-tapping screws may be used. A first embodiment of the junction box bracket 198 is shown in FIG. 48. In FIG. 48, it can be seen that the junction box bracket 198 comprises a base portion 200 and a flange portion 202, which is disposed at approximately a ninety (90) degree angle relative to the base portion 200. The flange portion 202 of the junction box bracket 198 is attached to the base member 90' by a plurality of fasteners 210. To facilitate the installation of the junction box bracket 198, the fasteners 210 may be self-drilling and/or self-tapping type fasteners (i.e., self-drilling/self-tapping bolts or screws).

Figure 49:
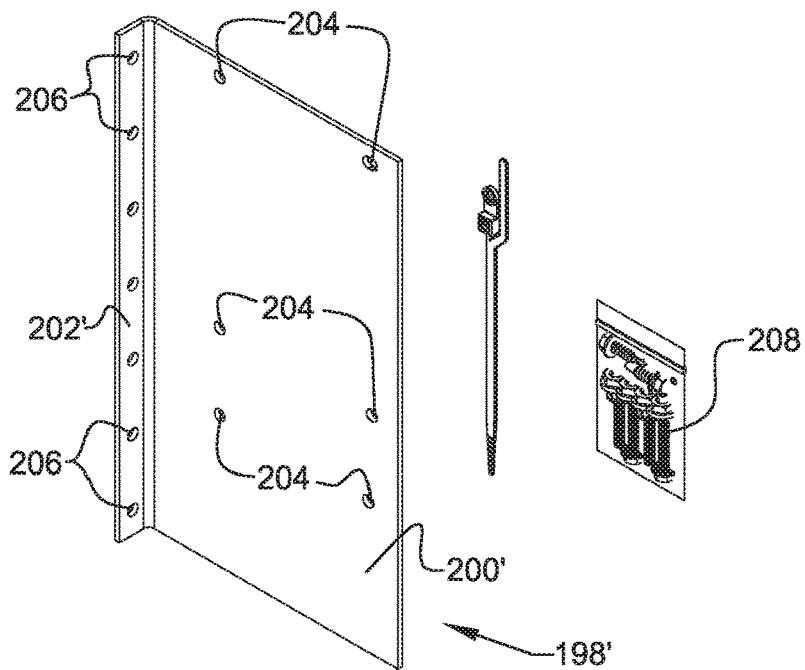
FIG. 49 is a perspective view of a junction box bracket kit, according to another embodiment of the invention.
Figure 50:
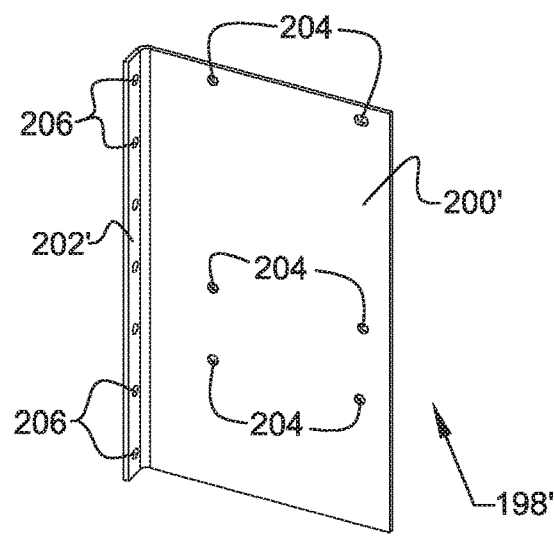
FIG. 50 is a perspective view of the junction box bracket of the junction box bracket kit of FIG. 49.
Figure 51:
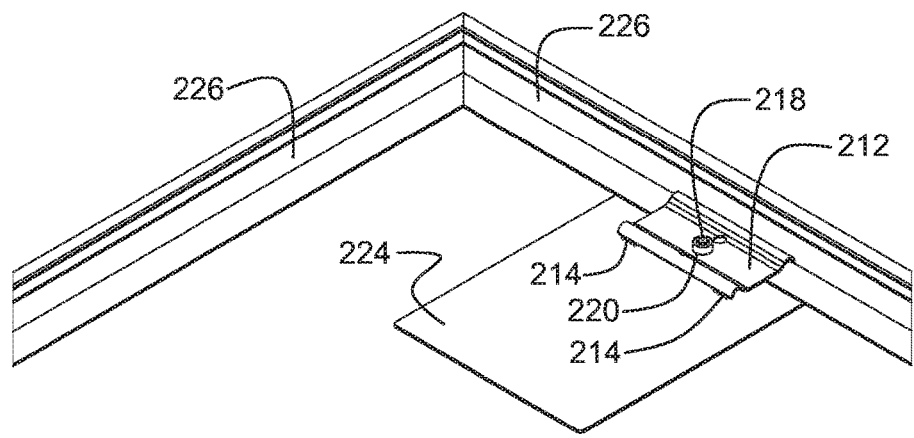
FIG. 51 is a perspective view of a micro-inverter mounting plate attached to the frame of a photovoltaic module by a power accessory bracket assembly, according to an embodiment of the invention.
Figure 52:
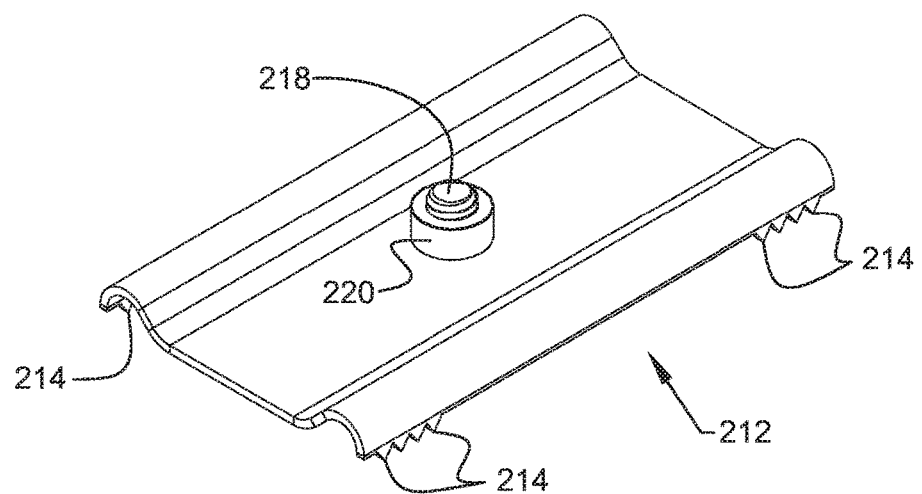
FIG. 52 is a perspective view of the power accessory bracket assembly of FIG. 51, wherein the power accessory bracket assembly is in an assembled state.
Figure 53:
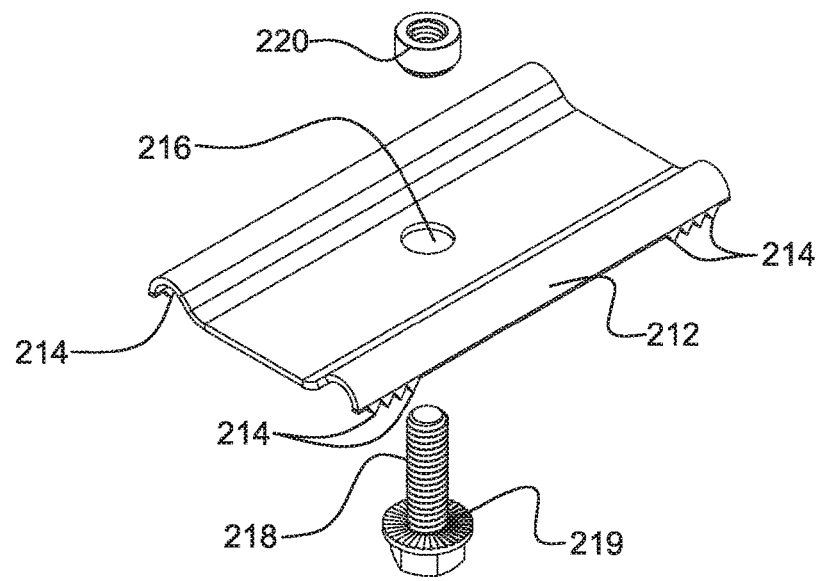
FIG. 53 is an exploded view of the power accessory bracket assembly of FIG. 52.

Like the first embodiment of the junction box bracket 198, the second embodiment of the junction box bracket 198' illustrated in FIGS. 49 and 50 also comprises a base portion 200' and a flange portion 202' that is oriented at a substantially ninety (90) degree angle relative to the base portion 200'. However, as shown in these two figures, the base portion 200' of the junction box bracket 198' may be predrilled with a plurality of apertures 204 for mounting the junction box thereto. Also, the flange portion 202' of the junction box bracket 198' may be predrilled with a plurality of apertures 206 disposed along the length thereof for securing the junction box bracket 198' to the base member 90'. In addition, as shown in FIG. 49, the junction box bracket 198' may be provided with prepackaged fasteners 208 for mounting the junction box to the junction box bracket 198' and/or for mounting the junction box bracket 198' to the base member 90'.

Figure 79:
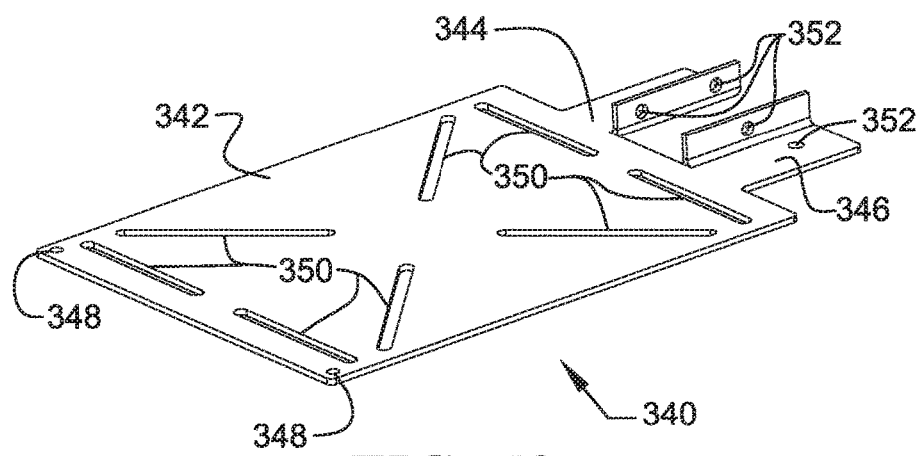
FIG. 79 is a perspective view of a junction box bracket, according to yet another embodiment of the invention.
Figure 80:
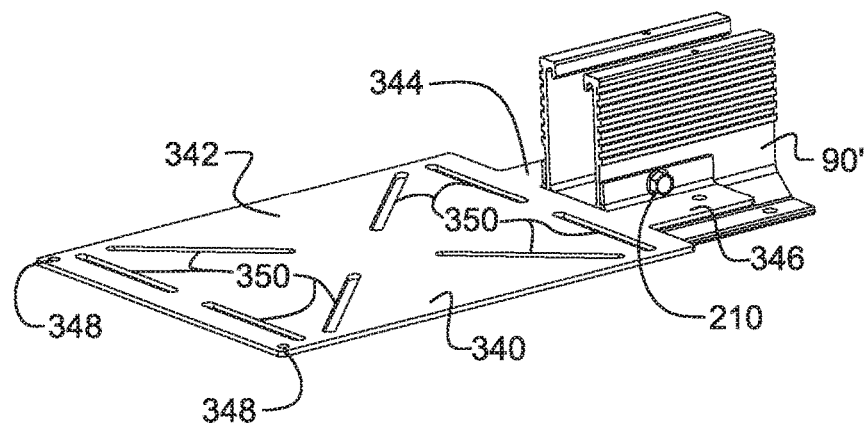
FIG. 80 is a perspective view of the junction box bracket of FIG. 79 attached to a base member.

A third embodiment of the junction box bracket is illustrated in FIGS. 79 and 80. Unlike the junction box brackets 198, 198' of FIGS. 48-50, the junction box bracket 340 in FIGS. 79 and 80 is in the form of a center-mounted junction box bracket. That is, the junction box bracket 340 is configured to be center-mounted on the base member 90'. In FIGS. 79 and 80, it can be seen that the junction box bracket 340 generally comprises a plate-like base portion 342, a first flange portion 344, and a second flange portion 346 spaced apart from the first flange portion 344. The first and second flange portions 344, 346 extend from one side of the plate-like base portion 342 of the junction box bracket 340, and together define a slot for receiving a cross-sectional portion of the base portion 90' therein. As shown in these two figures, the plate-like base portion 342 of the junction box bracket 340 comprises a plurality of apertures 348 and a plurality of elongate slots 350 disposed therethrough for attaching a wide variety of different junction boxes to the junction box bracket 340. Also, the first and second flange portions 344, 346 of the junction box bracket 340 may be predrilled with a plurality of apertures 352 disposed therethrough for accommodating fasteners that secure the junction box bracket 340 to the base member 90'. The aperture 352 mounted in the horizontal portion of the second flange portion 346 in FIGS. 79 and 80 may be used for mounting a grounding lug.

Figure 84:
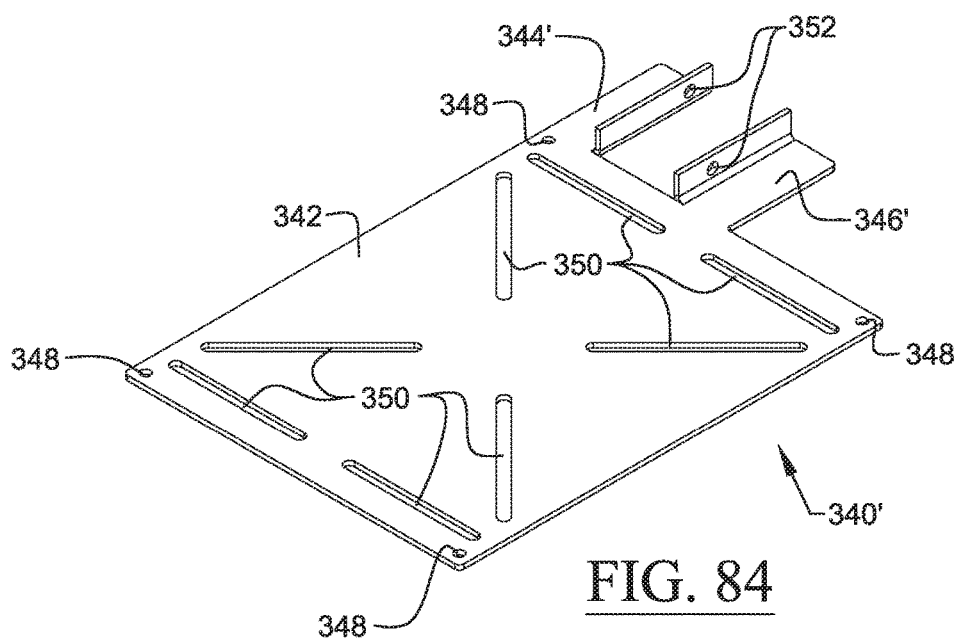
FIG. 84 is a perspective view of a junction box bracket, according to still another embodiment of the invention.

A fourth embodiment of the junction box bracket is illustrated in FIG. 84. Unlike the junction box bracket 340 of FIGS. 79 and 80, the junction box bracket 340' in FIG. 84 is in the form of an offset-mounted junction box bracket. That is, the first and second flange portions 344', 346' of the junction box bracket 340' are offset from a center position of the bracket base portion 342 in a widthwise direction of the bracket base portion 342 so as to facilitate a connection of one or more wires to the junction box (or other electrical accessory mounted on the bracket base portion 342) without the upstanding base member 90' of the base assembly 128' interfering with a routing of the one or more wires.

Figure 54:
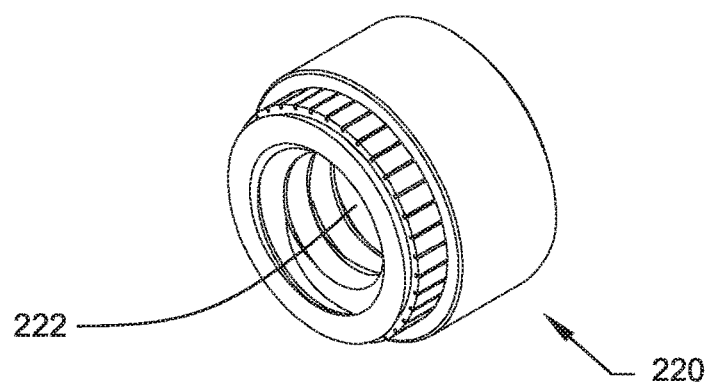
FIG. 54 is a perspective view of a captive nut of the power accessory bracket assembly of FIG. 52.
Figure 55:
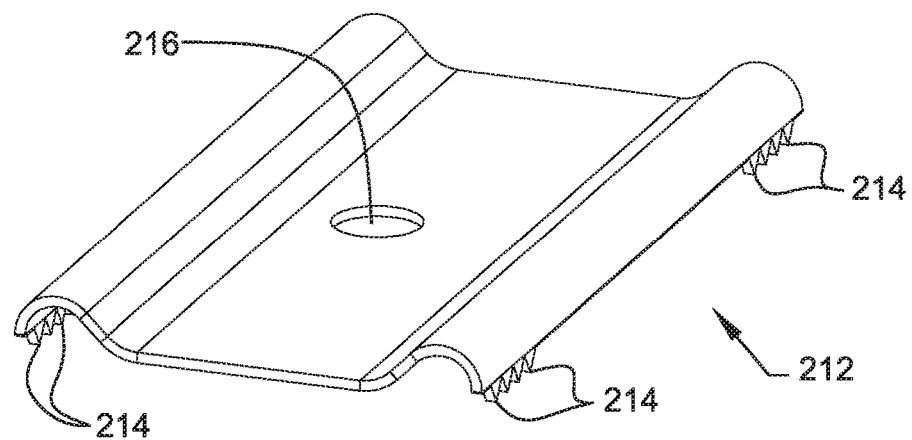
FIG. 55 is a perspective view of a power accessory bracket of the power accessory bracket assembly of FIG. 52.
Figure 56:
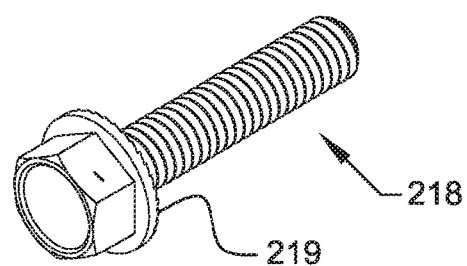
FIG. 56 is a perspective view of a threaded fastener member of the power accessory bracket assembly of FIG. 52.
Figure 57:
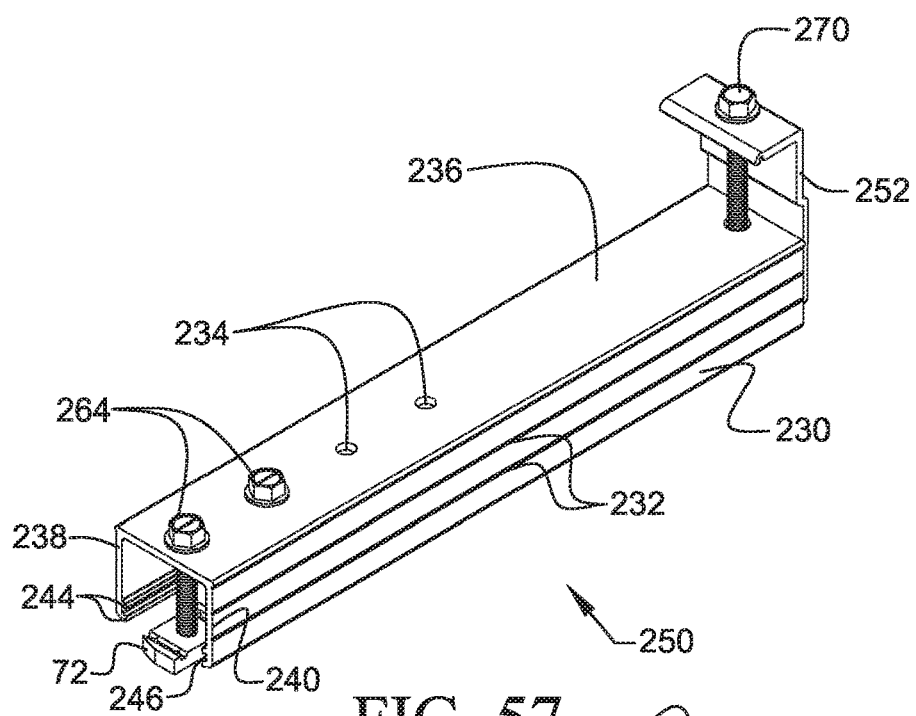
FIG. 57 is a perspective view of a north row extension assembly, according to an embodiment of the invention.

Next, with reference to FIGS. 51-56, the power accessory bracket 212 will be described. As shown in the perspective view of FIG. 51, the power accessory bracket 212 is used to mount a power accessory (such as a micro-inverter or optimizer) to the aluminum frame 226 of the photovoltaic (PV) module. The teeth 214 on the underside of the power accessory bracket 212 electrically connect the bracket to the aluminum frame 226 of the PV module (see FIGS. 51 and 52). With combined reference to FIGS. 51, 52, and 53, it can be seen that the micro-inverter mounting plate 224 is attached to the power accessory bracket 212 by means of a threaded fastener 218 (e.g., a bolt) and a captive nut 220 that threadingly engages with the fastener 218. As shown in FIG. 54, the captive nut 220 has a threaded aperture 222 that receives the shaft of the threaded fastener 218. During the assembly of the components, the captive nut 220 is pressed into the central aperture 216 of the power accessory bracket 212. In FIG. 56, it can be seen that threaded fastener 218, like the threaded fastener member 38 described above, is provided with a head portion having a serrated flange 219 for electrical grounding/bonding purposes.

Figure 58:
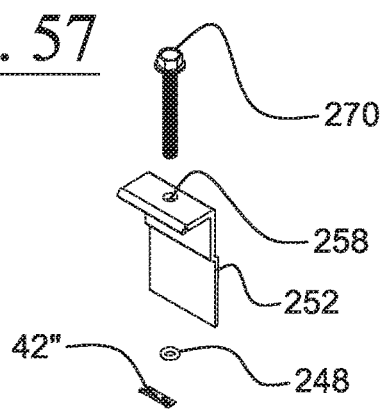
FIG. 58 is an exploded view of the north row extension assembly of FIG. 57.
Figure 58:
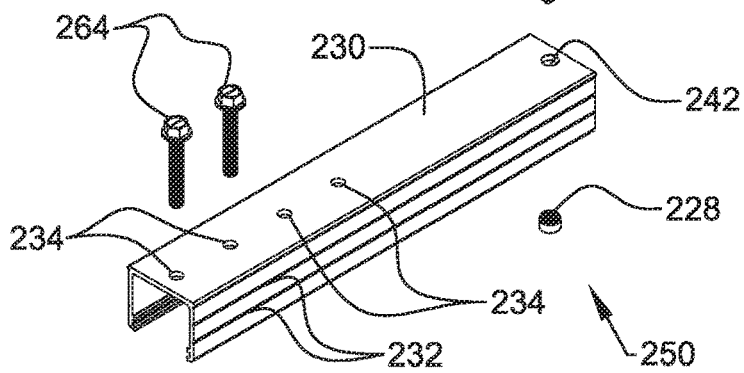
Figure 59:
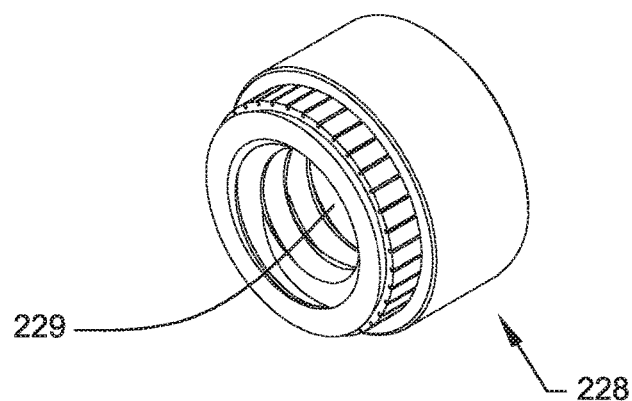
FIG. 59 is a perspective view of a captive nut of the north row extension assembly of FIG. 57.
Figure 62:
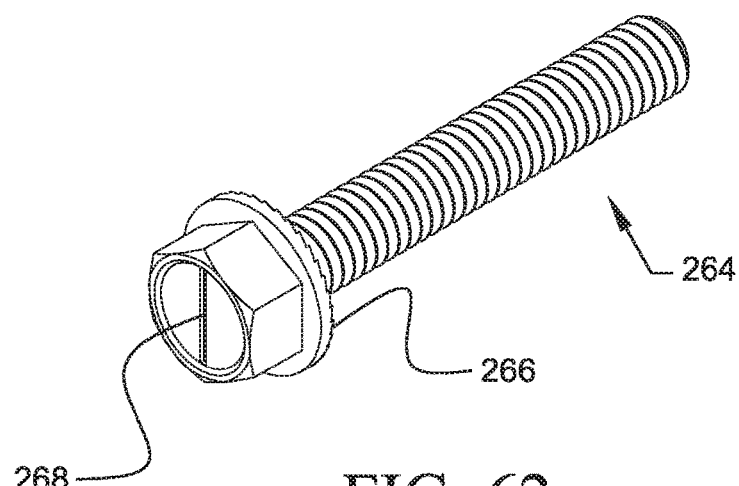
FIG. 62 is a perspective view of a strut fastener member of the north row extension assembly of FIG. 57.

Turning to FIGS. 57-63, the north row extension assembly 250 of the PV array mounting system will be explained. Initially, with reference to FIGS. 57 and 58, it can be seen that the illustrative embodiment of the north row extension assembly 250 generally includes a north row extension member 230 and an upper end clamp member 252. As best shown in the assembled view of FIG. 57, the upper end clamp member 252 and the north row extension member 230 are connected to one another by means of a threaded fastener member 270 and a captive nut 228. Similar to the threaded fastener member 38 described above, the threaded fastener member 270 is in the form of a bolt with a head portion having a serrated flange 272 (refer to FIG. 61). As shown in FIG. 59, the captive nut 228 has a threaded aperture 229 that receives the shaft of the threaded fastener 270. The north row extension assembly 250 attaches to a base member 90' of the PV array mounting system by means of a pair of threaded fastener members 264 that threadingly engage with respective strut nuts 72. A pair of threaded fastener members 264 and corresponding strut nuts 72 are used for securing the north row extension assembly 250 to the base member 90', rather than just a single threaded fastener member 264 and strut nut 72, in order to provide added stability. Like the end clamp threaded fastener 270, the threaded fastener member 264 of the illustrative embodiment is in the form of a bolt with a head portion having a serrated flange 266 (refer to FIG. 62). Also, as shown in FIG. 62, the top surface of the head portion of the threaded fastener member 264 is provided with a visual indicator line 268 formed therein for indicating the orientation of the strut nut 72 that is threadingly engaged with the threaded fastener member 264. The north row extension assembly 250 is used when a clamp located at or near the peak of the roof is desired and it would be difficult or not possible to install a flashing at that location because there are not enough shingle courses up-roof of the location to allow the flashing to be installed. As a result, the flashing member 118' is required to be placed under a shingle course that is two courses down from the peak of the roof. The north row extension assembly 250 operates as a cantilevered mounting arm for securing the north row edge of the PV module array.

Figure 63:
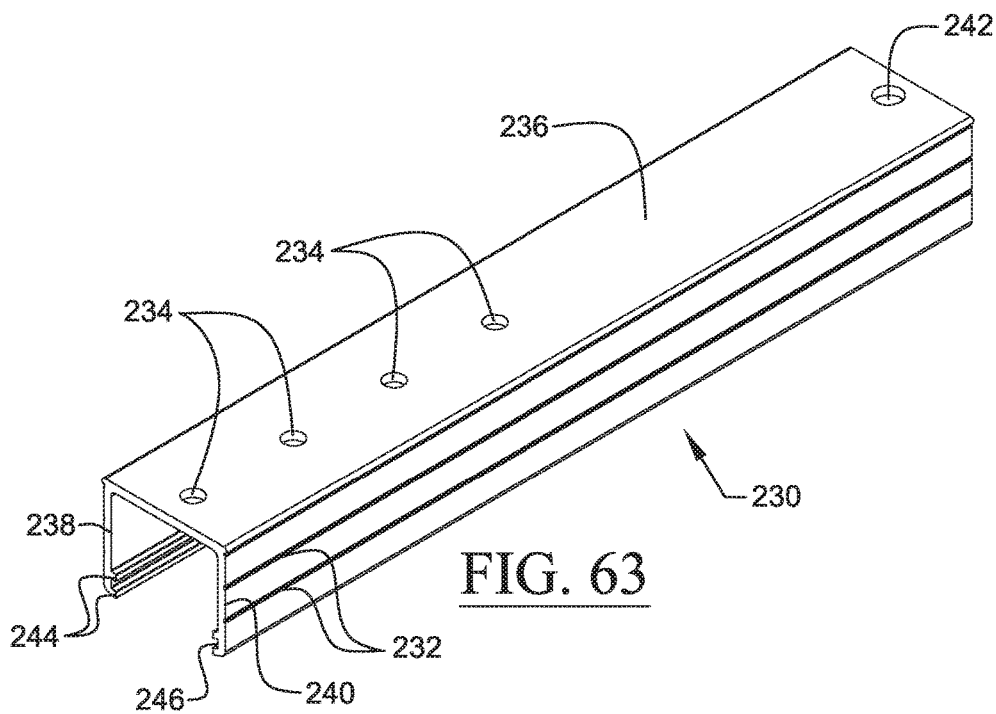
FIG. 63 is a perspective view of a north row extension member of the north row extension assembly of FIG. 57.

Now, with reference primarily to FIG. 63, the structure of the north row extension member 230 of the north row extension assembly 250 will be described. As shown in FIG. 63, like the glider member 60' described above, it can be seen that the north row extension member 230 comprises a generally inverted, U-shaped profile with a top wall portion 236 and first and second opposed wall portions 238, 240 extending downwardly from the top wall portion 236. The top wall portion 236 comprises a plurality of spaced-apart fastener apertures 234 disposed near a first longitudinal end thereof for receiving the strut nut fastener members 264 described above, and a single fastener aperture 242 disposed near the second, opposite longitudinal end thereof for receiving the end clamp fastener 270. The plurality of spaced-apart fastener strut apertures 234 advantageously permits the locations of the strut nut fastener members 264 to be adjusted. In FIG. 63, it can be seen that the inner surfaces of each of the first and second opposed wall portions 238, 240 comprises a pair of elongate protrusions or teeth 244 that are spaced apart from one another by a respective elongate groove 246. The pair of teeth 244 on each of the inner surfaces of the opposed wall portions 238, 240 are designed to engage with respective teeth 110 on opposed upstanding wall portions 104a', 104b' of the base member 90'. The north row extension member 230 may be slid into place on the top of the base member 90' by engaging its teeth 244 with the teeth 110 of the base member 90'. To permit horizontal adjustability, the north row extension member 230 is capable of being slid along the length of the base member 90'. And, to permit vertical adjustability, the north row extension member 230 is capable of being adjustably placed along a vertical height of the upstanding wall portions 104a', 104b' of the base member 90' by selectively engaging certain ones of the teeth 244 on the north row extension member 230 with certain ones of the grooves 112 on the base member 90', and the groove 246 on the north row extension member 230 with a certain one of the teeth 110 on the base member 90'.

As best shown in FIG. 63, the outer sides of the first and second opposed wall portions 238, 240 of the north row extension member 230 are provided with a plurality of generally parallel, visual indicator grooves 232 formed therein (e.g., three (3) visual indicator grooves 232). During the installation of the PV modules, the visual indicator grooves 232 operate as visual indicating bands for positioning the north row extension member 230 at its desired height (i.e., the visual indicator grooves 232 enable the desired height of the north row extension member 230 relative to the base member 90' to be more easily obtained by the installer during the PV module installation process).

Figure 60:
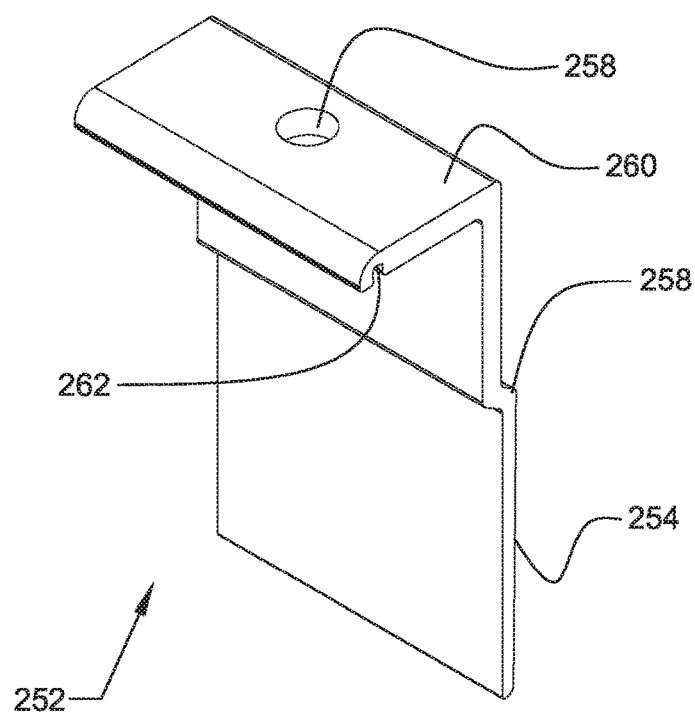
FIG. 60 is a perspective view of an upper end clamp member of the north row extension assembly of FIG. 57.
Figure 61:
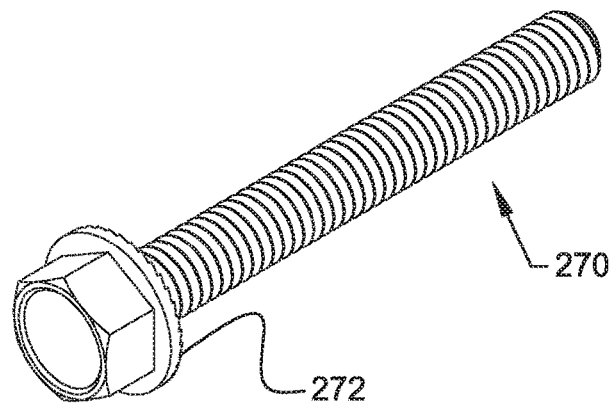
FIG. 61 is a perspective view of an end clamp fastener member of the north row extension assembly of FIG. 57.

Next, turning to FIG. 60, the structure of the upper end clamp member 252 will be explained. The upper end clamp member 252 secures the north edge of the PV module in the PV array. As shown in this figure, the upper end clamp member 252 generally includes a vertical body portion 254 that is attached to a horizontal flange portion 260 at approximately a 90 degree angle. In this figure, it can be seen that vertical body portion 254 of the upper end clamp member 252 has an offset 256 formed therein. Referring again to FIG. 60, it can be seen that the flange portion 260 of the upper end clamp member 252 further comprises a fastener aperture 258 for receiving the threaded fastener member 270. Also, as shown in FIG. 60, the flange portion 260 includes an elongate groove 262 disposed in the bottom surface thereof. The elongate groove 262 of the upper end clamp member 252 is configured to receive a projection portion 49' of a respective bonding clip 42" (see FIG. 58) that provides integrated grounding for the photovoltaic module installation. The projection portion 49' of the bonding clip 42" is received within the elongate groove 262 of upper end clamp member 252 in a press-fit or interference-fit type mounting arrangement.

Figure 82:
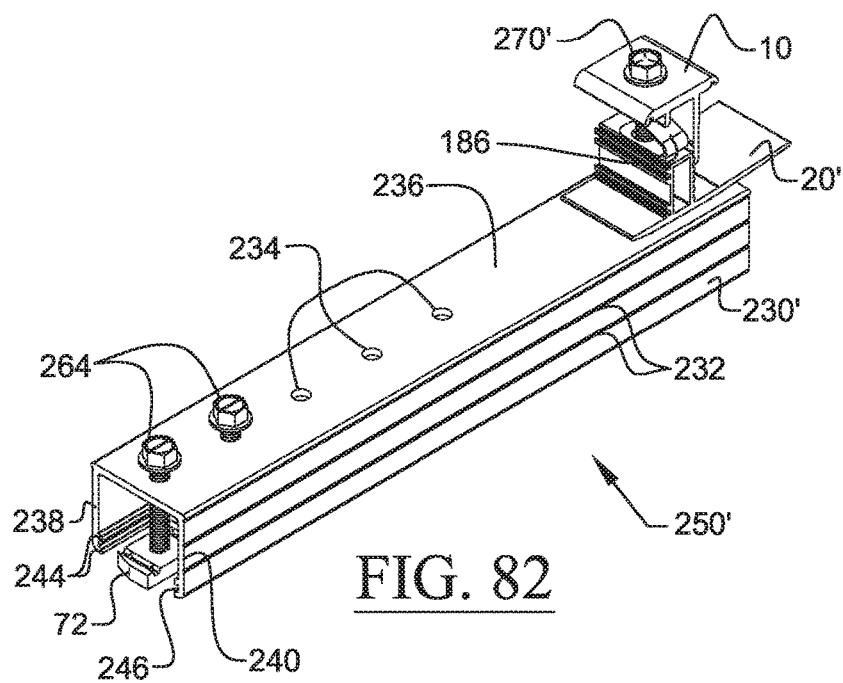
FIG. 82 is a perspective view of a north row extension assembly, according to an alternative embodiment of the invention.
Figure 83:
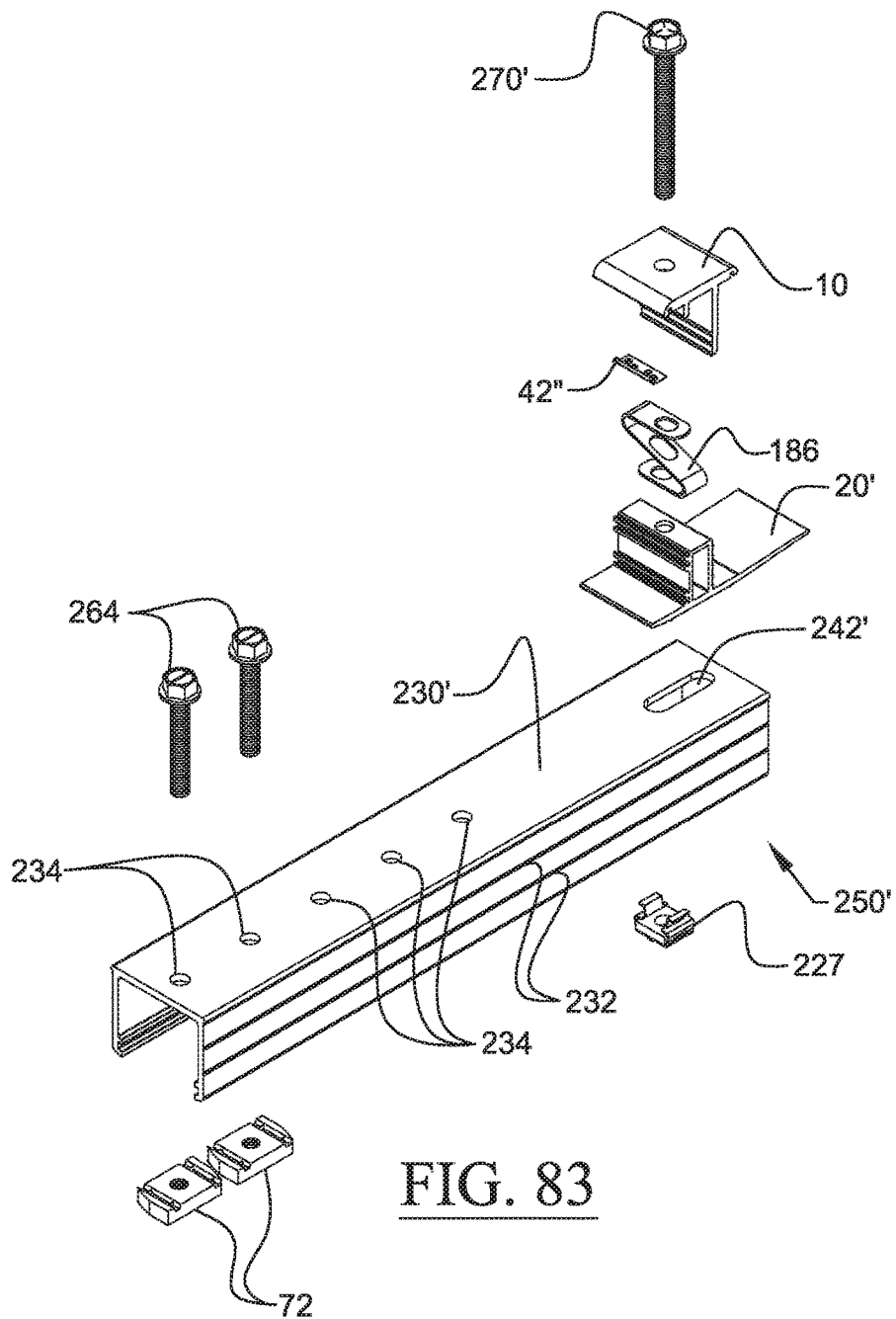
FIG. 83 is an exploded view of the north row extension assembly of FIG. 82.

Turning to FIGS. 82 and 83, an alternative embodiment of the north row extension assembly 250' of the PV array mounting system will be described. The north row extension assembly 250' of FIGS. 82 and 83 is similar in many respect to the north row extension assembly 250 explained above. However, unlike the north row extension assembly 250 of FIG. 57, the north row extension assembly 250' utilizes a clamp assembly comprising the upper clamp member 10 and the lower clamp member 20' described above, rather than the upper end clamp member 252. In a similar manner to that described above for the support surface attachment device 100', the clamp members 10, 20' are used to secure one or more photovoltaic modules to the north row extension assembly 250'. Turning again to FIGS. 82 and 83, it can be seen that the north row extension member 230' of the north row extension assembly 250' is slightly different that the north row extension member 230 described above. For example, the north row extension member 230' contains a greater number of spaced-apart fastener apertures 234 than the north row extension member 230, and the north row extension member 230' contains an elongated slot 242' for receiving the clamp fastener 270', rather than a circular aperture 242. Rather than being provided with the captive nut 228 at the distal end thereof, the clamp fastener 270' is provided with a modified strut nut 227 for securing the clamp assembly to the north row extension member 230'.

Referring to the exploded view of FIG. 58, the O-ring member 248 of the north row extension assembly 250 is used to maintain a predetermined spacing distance or gap between the flange portion 260 of the upper end clamp member 252 and the top wall portion 236 of the north row extension member 230. In other words, the O-ring member 248 is used to hold upper end clamp member 252 open so that a PV module may be more easily inserted between the flange portion 260 of the upper end clamp member 252 and the top wall portion 236 of the north row extension member 230 during the installation of the PV module array on the roof.

Figure 64:
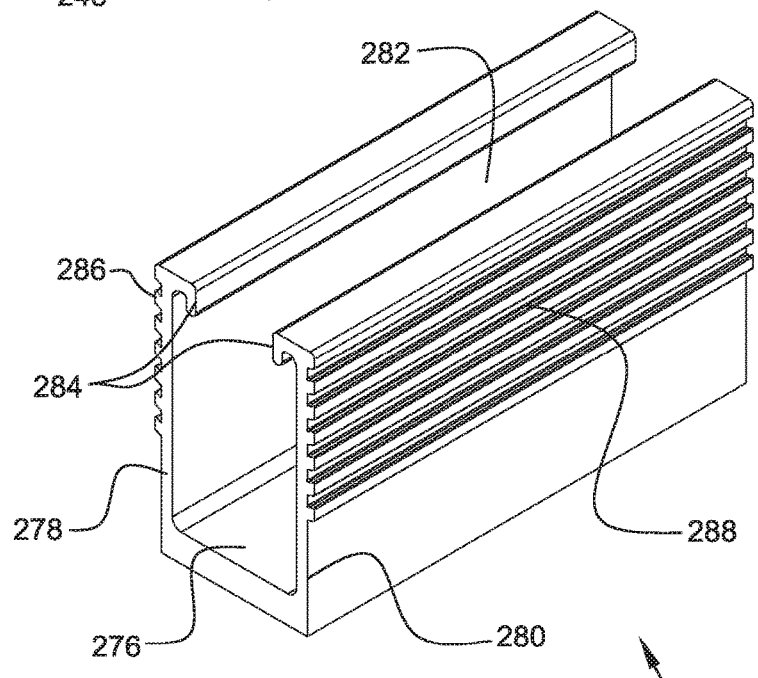
FIG. 64 is a perspective view of an upstanding tile base member, according to an embodiment of the invention.

An embodiment of an upstanding tile base member 274 is illustrated in FIG. 64. The upstanding tile base member 274 of FIG. 64 is configured to be attached to a PV tile mounting solution (such as a tile replacement bracket or a tile hook). The tile base member 274 is capable of being used in any location within the array. Referring to FIG. 64, it can be seen that the upstanding tile base member 274 generally comprises a base portion 276 and a pair of opposed first and second upstanding wall portions 278, 280 extending upwardly from the base portion 276 of the upstanding tile base member 274. In FIG. 64, it can be seen that the outer surfaces of each of the first and second opposed upstanding wall portions 278, 280 comprises a plurality of elongate protrusions or teeth 286 that are each spaced apart from one another by respective elongate grooves 288. The set of teeth 286 on each of the outer surfaces of the opposed wall portions are designed to engage with the respective teeth 68' on the opposed wall portions 66a', 66b' of the glider member 60'. Also, as shown in FIG. 64, the opposed wall portions 278, 280 of the upstanding tile base member 274 cooperate to define an upper elongate slot 282 that accommodates the shaft of the threaded fastener member 38 passing therethrough. Also, each of the opposed wall portions 278, 280 comprises a downturned lip portion 284 that is received within a respective one of the elongate grooves 76 disposed in the top surface of the strut nut 72.

Figure 87:
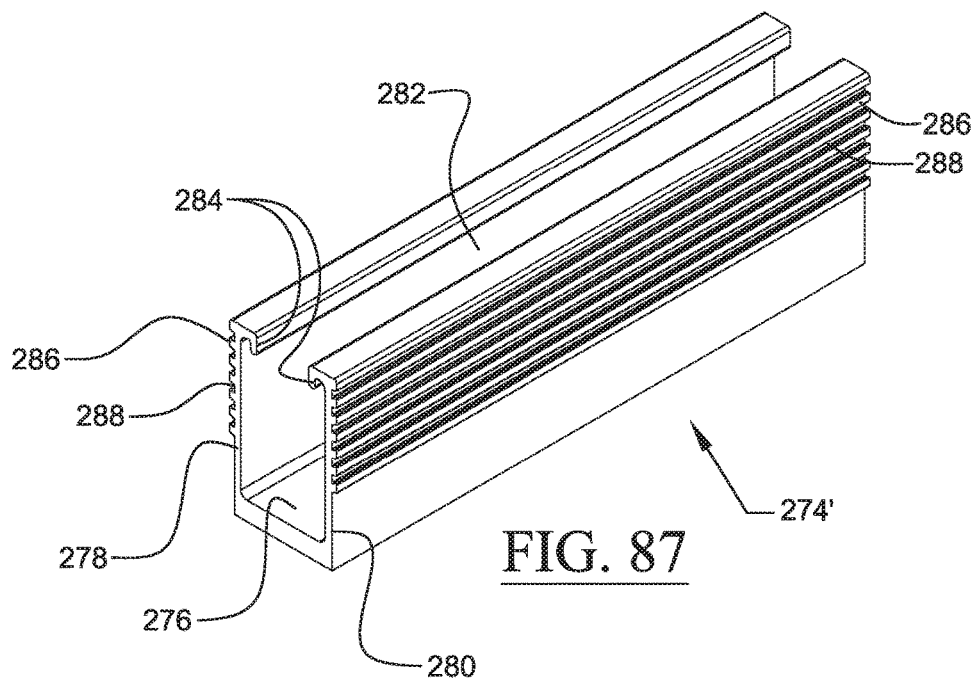
FIG. 87 is a perspective view of an upstanding tile base member, according to an alternative embodiment of the invention.

An alternative embodiment of the upstanding tile base member is shown in FIG. 87. The upstanding tile base member 274' of FIG. 87 is similar in most respects to the upstanding tile base member 274 described above. However, as shown in FIG. 87, the upstanding tile base member 274' has a longer profile length as compared to the base member 274 of FIG. 64.

Figure 65:
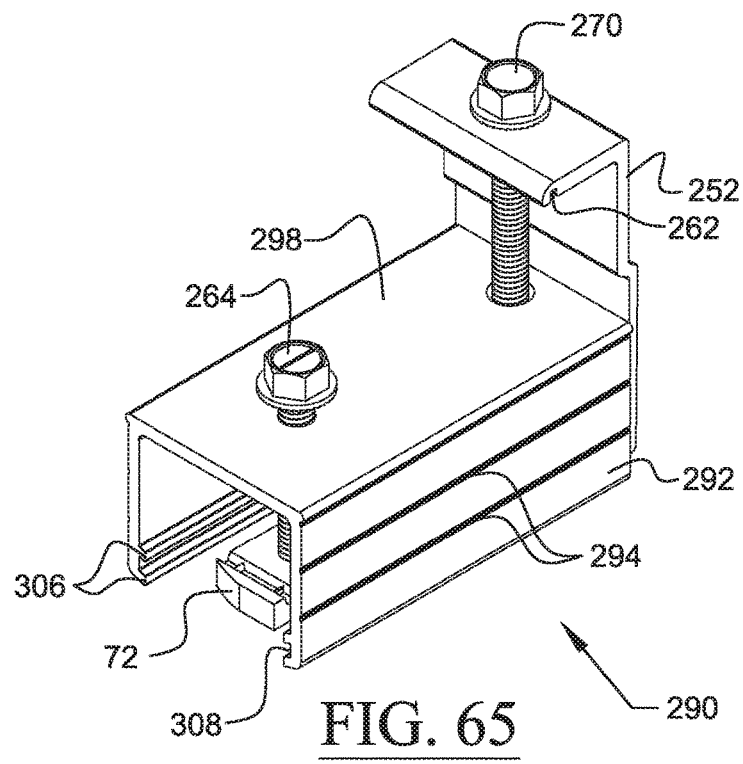
FIG. 65 is a perspective view of a south row mounting assembly, according to an embodiment of the invention.
Figure 66:
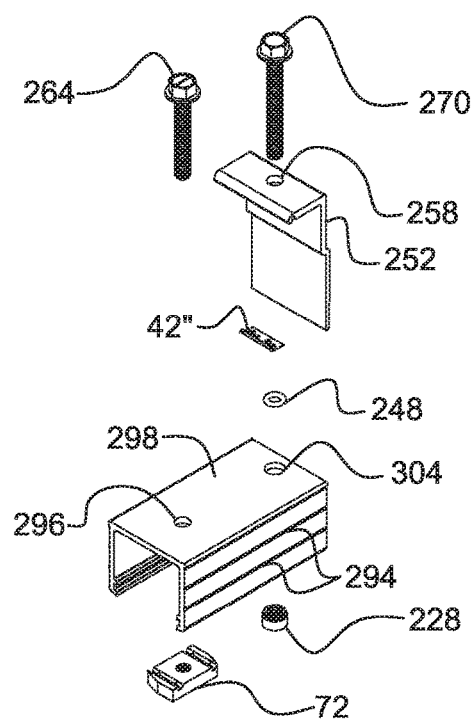
FIG. 66 is an exploded view of the south row mounting assembly of FIG. 65.
Figure 67:
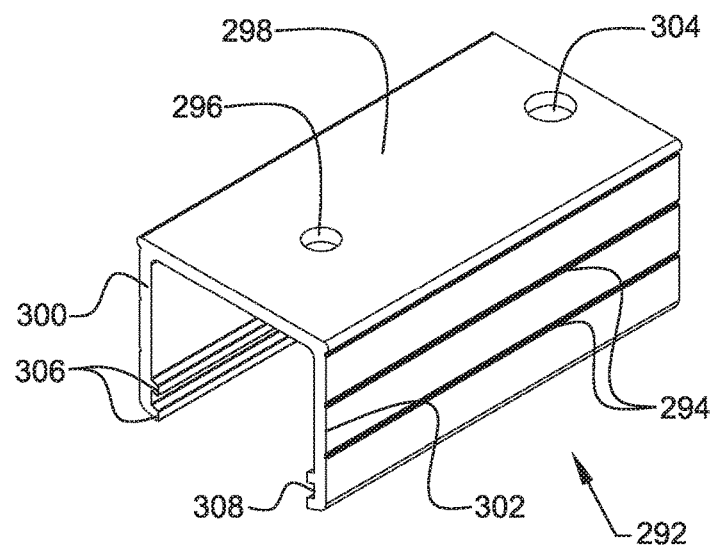
FIG. 67 is a perspective view of an elongated glider member of the south row mounting assembly of FIG. 65.
Figure 68:
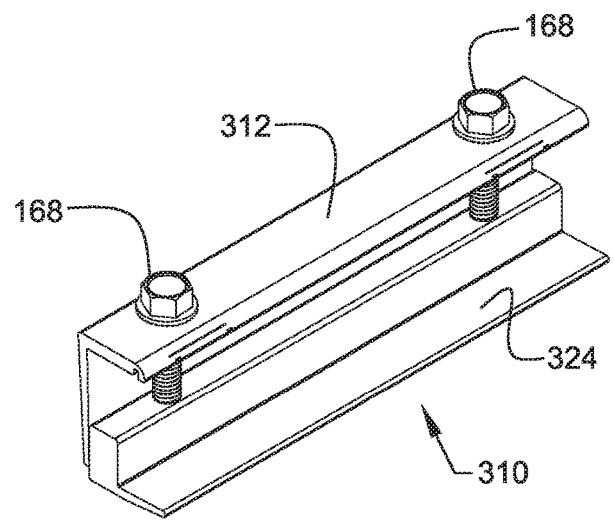
FIG. 68 is a perspective view of a south row coupling assembly of a photovoltaic mounting system, according to an embodiment of the invention, wherein the coupling assembly is illustrated in an assembled state.

Turning to FIGS. 65-67, the south row mounting assembly 290 of the PV array mounting system will be explained. Initially, with reference to FIGS. 65 and 66, it can be seen that the illustrative embodiment of the south row mounting assembly 290 generally includes an elongated glider member 292 and an upper end clamp member 252. As best shown in the assembled view of FIG. 65 and the exploded view of FIG. 66, the upper end clamp member 252 and the elongated glider member 292 are connected to one another by means of a threaded fastener member 270 and a captive nut 228. The south row mounting assembly 290 attaches to a base member 90' of the PV array mounting system by means of a threaded fastener member 264 that threadingly engages with a strut nut 72. The south row mounting assembly 290 may be used on the south edge of the PV module array in lieu of the double clamp assembly 126' and the skirt member 174', 174". From an aesthetic standpoint, the south row mounting assembly 290 may be used as an alternative to the skirt member 174', 174".

Now, with reference primarily to FIG. 67, the structure of the elongated glider member 292 of the south row mounting assembly 290 will be described. As shown in FIG. 67, like the glider member 60' described above, it can be seen that the elongated glider member 292 comprises a generally inverted, U-shaped profile with a top wall portion 298 and first and second opposed wall portions 300, 302 extending downwardly from the top wall portion 298. The top wall portion 236 comprises a first fastener aperture 296 disposed near a first longitudinal end thereof for receiving the strut nut fastener member 264 described above, and a second fastener aperture 304 disposed near the second, opposite longitudinal end thereof for receiving the end clamp fastener 270. In FIG. 67, it can be seen that the inner surfaces of each of the first and second opposed wall portions 300, 302 comprises a pair of elongate protrusions or teeth 306 that are spaced apart from one another by a respective elongate groove 308. The pair of teeth 306 on each of the inner surfaces of the opposed wall portions 300, 302 are designed to engage with respective teeth 110 on opposed upstanding wall portions 104a', 104b' of the base member 90'. The elongated glider member 292 may be slid into place on the top of the base member 90' by engaging its teeth 306 with the teeth 110 of the base member 90'. To permit horizontal adjustability, the elongated glider member 292 is capable of being slid along the length of the base member 90'. And, to permit vertical adjustability, the elongated glider member 292 is capable of being adjustably placed along a vertical height of the upstanding wall portions 104a', 104b' of the base member 90' by selectively engaging certain ones of the teeth 306 on the elongated glider member 292 with certain ones of the grooves 112 on the base member 90', and the groove 308 on the elongated glider member 292 with a certain one of the teeth 110 on the base member 90'.

As best shown in FIG. 67, the outer sides of the first and second opposed wall portions 300, 302 of the elongated glider member 292 are provided with a plurality of generally parallel, visual indicator grooves 294 formed therein (e.g., three (3) visual indicator grooves 294). During the installation of the PV modules, the visual indicator grooves 294 operate as visual indicating bands for positioning the south row mounting assembly 290 at its desired height (i.e., the visual indicator grooves 294 enable the desired height of the south row mounting assembly 290 relative to the base member 90' to be more easily obtained by the installer during the PV module installation process). Because the upper end clamp member 252 of the south row mounting assembly 290 is generally the same as that described above for the north row extension assembly 250, in the interest of brevity, it will not be described again in conjunction with the south row mounting assembly 290.

Referring to the exploded view of FIG. 66, the O-ring member 248 of the south row mounting assembly 290 performs the same functionality as described above for the north row extension assembly 250. That is, the O-ring member 248 is used to hold upper end clamp member 252 open so that a PV module may be more easily inserted between the flange portion 260 of the upper end clamp member 252 and the top wall portion 298 of the south row mounting assembly 290 during the installation of the PV module array on the roof.

Figure 70:
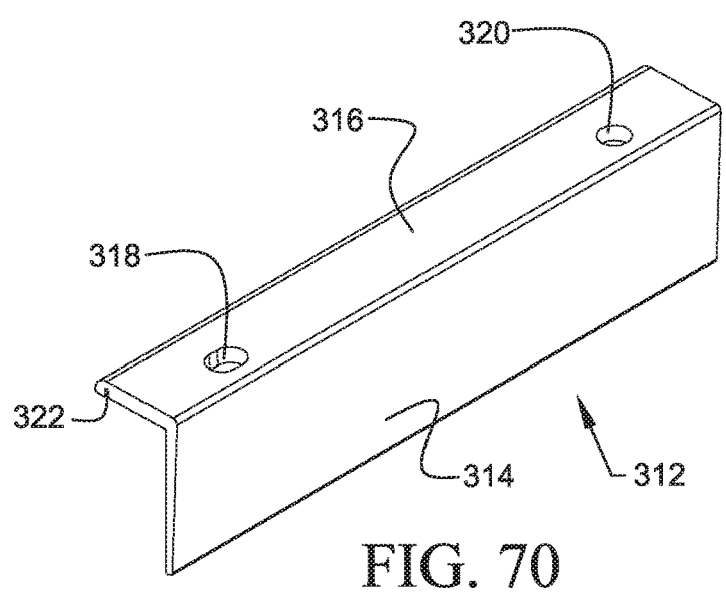
FIG. 70 is a perspective view of an upper coupling member of the south row coupling assembly of FIG. 68.
Figure 71:
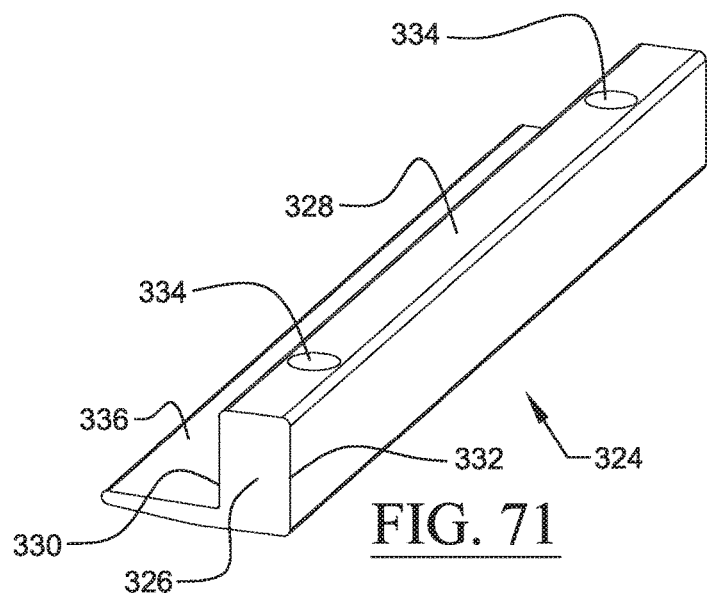
FIG. 71 is a perspective view of an lower coupling member of the south row coupling assembly of FIG. 68.

Next, referring to FIGS. 68-71, the south row, single-sided coupling assembly 310 of the PV array mounting system will be explained. Similar to the coupling assemblies 130, 130' described above, south row coupling assembly 310 generally includes an upper coupling member 312 secured to a lower coupling member 324. As best shown in the assembled view of FIG. 68, the upper coupling member 312 and the lower coupling member 324 are connected to one another by means of one or more threaded fastener members 168 (e.g., two (2) threaded fastener members 168) and one or more respective captive nuts 170 (e.g., two (2) captive nuts 170, one for each threaded fastener member 168). In the illustrated embodiment, each threaded fastener member 168 is in the form of a bolt with a head portion having a serrated flange (e.g., refer to FIG. 68). The south row coupling assembly 310 may be used on the south edge of the PV module array when the south row mounting assembly 290 is used in lieu of providing the skirt member 174', 174" on the south row. As shown in FIGS. 70 and 71, unlike the coupling assembly 130' described above, the upper and lower coupling members 312, 324 of the skirtless coupling assembly 310 do not comprise any mating teeth or protrusions disposed thereon.

Turning to FIG. 70, the structure of the upper coupling member 312 of the south row coupling assembly 310 will be described. As shown in this figure, the upper coupling member 312 generally includes a vertical body portion 314 that is attached to a horizontal flange portion 316 at approximately a 90 degree angle. Referring again to FIG. 70, it can be seen that the flange portion 316 of the upper coupling member 312 further comprises a plurality of fastener apertures 318, 320 for receiving respective threaded fastener members 168. In the illustrative embodiment of FIG. 70, it can be seen that the first fastener aperture 318 has a generally oval shape, while the second fastener aperture 320 has a generally circular shape. Also, as shown in FIG. 70, the flange portion 316 includes an elongate groove 322 disposed in the bottom surface thereof. The elongate groove 316 is configured to receive one or more projection portions 49, 49' of the bonding clip 42', 42" that provides integrated grounding for the photovoltaic module installation (see e.g., FIG. 69). The projection portion 49, 49' of the bonding clip 42', 42" is received within the elongate groove 316 in a press-fit or interference-fit type mounting arrangement.

Next, turning to FIG. 72, the structure of the lower coupling member 324 of the south row coupling assembly 310 will be explained. With reference to this figure, it can be seen that the lower coupling member 324 generally includes an upstanding portion 326 with a ledge portion 336 extending outwardly from one side of the upstanding portion 326. In FIG. 71, it can be seen that the upstanding portion 326 of the lower coupling member 324 comprises spaced-apart threaded fastener apertures 334 disposed therethrough. Each of these apertures 334 receives a respective shaft of a respective threaded fastener member 168. The upstanding portion 326 of the lower coupling member 324 further comprises a top wall portion 328 and first and second opposed wall portions 330, 332 extending downwardly from the top wall portion 328. The ledge portion 336 of the lower coupling member 324 is configured to accommodate a photovoltaic module frame member resting thereon (i.e., a frame member of a south row PV module).

Figure 69:
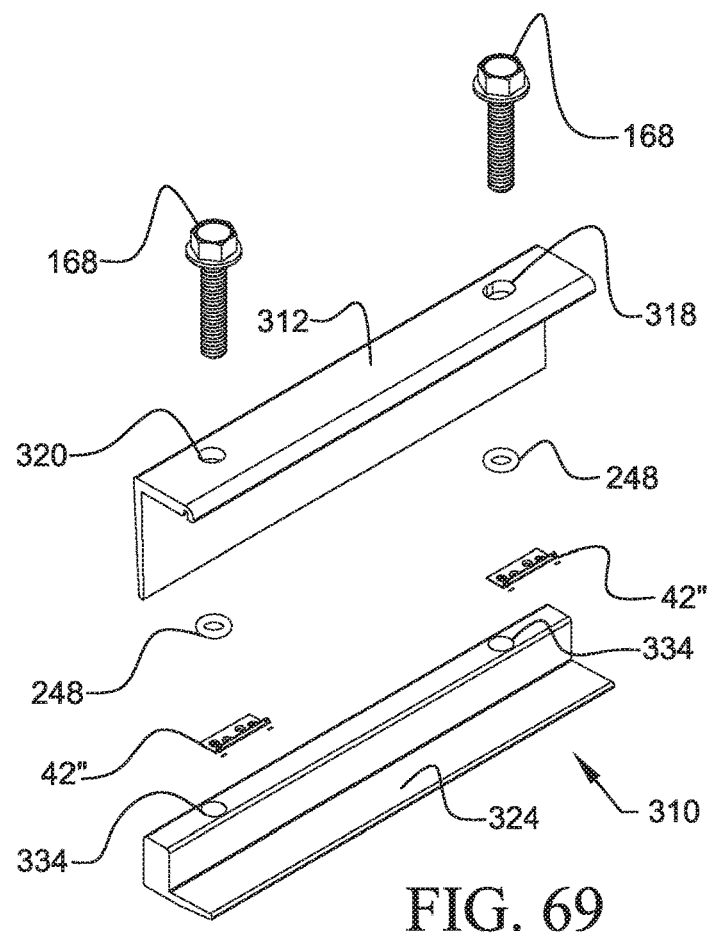
FIG. 69 is an exploded view of the south row coupling assembly of FIG. 68.

Referring to the exploded view of FIG. 69, the O-ring member 248 of the south row coupling assembly 310 performs generally the same functionality as described above for the north row extension assembly 250 and the south row mounting assembly 290. That is, the O-ring member 248 is used to hold upper coupling member 312 open so that a PV module may be more easily inserted between the flange portion 316 of the upper coupling member 312 and the ledge portion 336 of the lower coupling member 324 during the installation of the PV module array on the roof.

Figure 86:
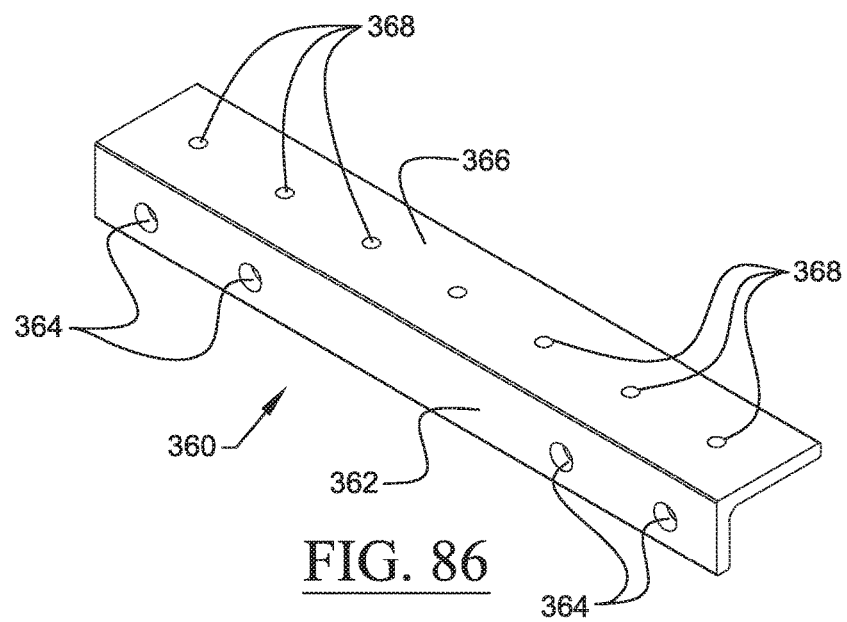
FIG. 86 is a perspective view of a conduit mounting member, according to an embodiment of the invention.

Now, turning to FIG. 86, an illustrative embodiment of a conduit mounting member 360 will be described. The conduit mounting member 360 is configured to couple electrical conduit of a photovoltaic system to an upstanding base member 90' of a base assembly 128'. The conduit mounting member 360 is configured to mount a conduit strap or other conduit holding device such that conduit of a photovoltaic system can be mounted to the conduit mounting member 360. As shown in FIG. 86, the conduit mounting member 360 includes a generally vertical securement portion 362 comprising a plurality of spaced-apart mounting apertures 364 for attaching the conduit mounting member 360 to the upstanding base member 90' (e.g., by using one or more tek screws). The conduit mounting member 360 further comprises a generally horizontal conduit mounting portion 366 connected to the generally vertical securement portion 362. The conduit mounting portion 366 comprises a plurality of spaced-apart securement apertures 368 for attaching the electrical conduit to the conduit mounting member 360 (e.g., by using a conduit strap). As shown in the illustrative embodiment of FIG. 86, the conduit mounting member 360 resembles the shape of angle iron flange, wherein the generally vertical securement portion 362 is disposed generally transversely relative to the horizontal conduit mounting portion 366.

Figure 88:
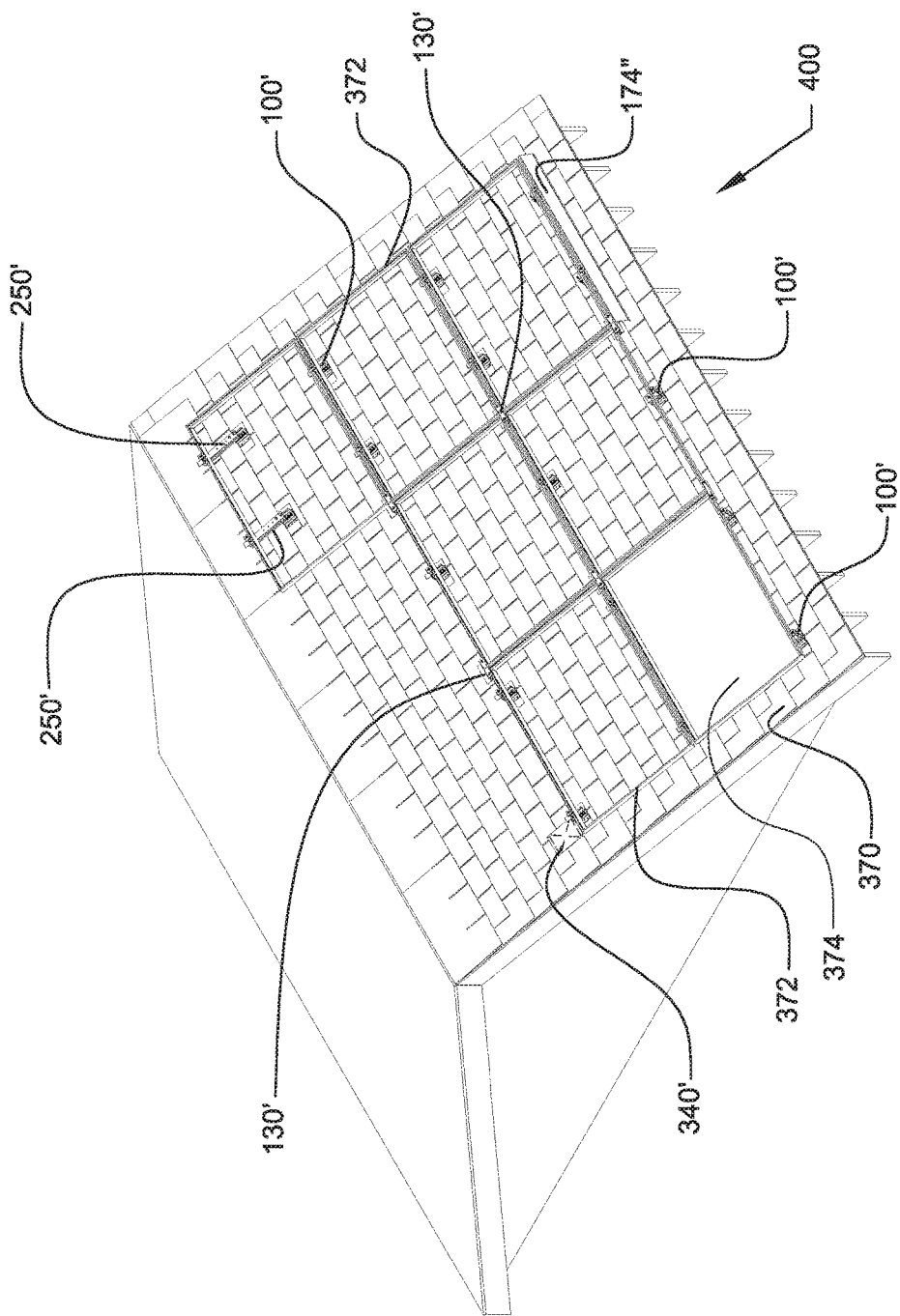
FIG. 88 is a perspective view of the illustrative mounting system described herein being used to secure an array of photovoltaic modules to a sloped roof.

Turning to FIG. 88, an illustrative photovoltaic system 400 utilizing the constituent mounting system components described herein is shown. FIG. 88 illustrates a roof-mounted photovoltaic (PV) system or array according to an embodiment of the present invention. The illustrated photovoltaic system or array includes an array of solar panels or PV modules 374 mounted to a pitched or sloped support surface in the form of a building rooftop 370 by a mounting system. For clarity of illustration of the mounting components, the photovoltaic module frames 372 are primarily shown in FIG. 88 rather than the full modules 374, with one exemplary full PV module 374 illustrated in the south row. In FIG. 88, there are three (3) rows of PV modules 374 illustrated for exemplary purposes, each of the first two rows having three (3) PV modules 374 disposed therein, and the third row (i.e., the north row) having only one PV modules 374 disposed therein. The illustrated mounting system includes a plurality of support surface attachment devices 100' that secure the photovoltaic module frames 372 to the building rooftop 370. The PV array illustrated in FIG. 88 has each of the rectangular-shaped PV modules 374 oriented in a landscape orientation, that is, with the longest axis of the PV modules extending in a lateral or side-to-side direction which is typically the east-west direction. It is noted, however, that the PV modules can alternatively be oriented by the support surface attachment devices 100' in a portrait orientation, that is, with the longest axis of the PV modules extending in a forward-rearward direction which is typically the south-north direction. With reference again to FIG. 88, it can be seen that the illustrated mounting system also includes a plurality of coupling devices 130' that rigidly fasten a plurality of PV modules 374 to one another. As shown in FIG. 88, the coupling devices 130' connect the corners of adjacent PV modules 374 together. Also, an exemplary section of a skirt member 174" is depicted on the south edge of the PV array in FIG. 88. On the north edge of the PV array in FIG. 88, north row extension assemblies 250' are shown supporting the north side of a photovoltaic module frame 372 in a cantilevered manner. As explained above, the north row extension assemblies 250' advantageously allows an additional north row of PV modules to be installed in the array at or near the ridge/peak of the 370 where support surface attachment devices 100' are unable to be accommodated on the north sides of the PV modules (e.g., because shingle courses are unable to be loosened in roof ridge area). Referring again to FIG. 88, it can be seen that a junction box bracket 340' is mounted to the upstanding base member 90' of the support surface attachment devices 100' of the leftmost PV module in the second row of the PV module array to support a junction box or other electrical accessory of the photovoltaic system.

Any of the features or attributes of the above described embodiments and variations can be used in combination with any of the other features and attributes of the above described embodiments and variations as desired.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A support surface attachment device, said support surface attachment device configured to attach one or more photovoltaic modules to a support surface, said support surface attachment device comprising:
    a base assembly configured to be attached to a support surface;
    a clamp assembly configured to engage one or more photovoltaic modules, said clamp assembly including a lower clamp member and an upper clamp member, said upper clamp member connected to said lower clamp member by a fastener member, said lower clamp member including one or more first teeth disposed thereon, and said upper clamp member including one or more second teeth disposed thereon, said one or more first teeth on said lower clamp member configured to engage said one or more second teeth on said upper clamp member when said fastener member is being tightened so as to maintain a minimum gap between said upper clamp member and said lower clamp member for receiving one or more photovoltaic module frames of said one or more photovoltaic modules when said one or more photovoltaic modules are pivotably installed into a first side of said clamp assembly; and
    a glider member coupling said upper and lower clamp members of said clamp assembly to said base assembly;
    wherein said clamp assembly is capable of being selectively positioned along a length of said base assembly prior to being fixed in place relative to said base assembly so as to permit adjustability when said one or more photovoltaic modules are being attached to said support surface, said glider member configured to slide relative to said base assembly so as to allow said clamp assembly to be selectively positioned along said length of said base assembly prior to being fixed in place relative to said base assembly; and wherein said upper and lower clamp members of said clamp assembly are configured to rotate together relative to said glider member, and wherein an upstanding base member of said base assembly is configured to rotate relative to said support surface, whereby the rotation of said upper and lower clamp members relative to said glider member and the rotation of said upstanding base member of said base assembly relative to a flashing member of said support surface attachment device enables a lateral position of said clamp assembly to be adjusted by an installer.

2. The support surface attachment device according to claim 1, wherein said upper clamp member of said clamp assembly comprises one or more grooves for receiving a portion of a bonding clip for grounding said one or more photovoltaic modules.

3. The support surface attachment device according to claim 1, further comprising a spring member disposed between said upper clamp member and said lower clamp member of said clamp assembly, said spring member configured to hold said clamp assembly open for facilitating the installation of said one or more photovoltaic modules into said clamp assembly, and said spring member further configured to enable said clamp assembly to be secured on said base assembly while maintaining said minimum gap between said upper clamp member and said lower clamp member.

4. The support surface attachment device according to claim 1, further comprising a strut nut threadingly coupled to said fastener member, said strut nut configured to fix said clamp assembly in place relative to said base assembly when said fastener member is tightened.

5. The support surface attachment device according to claim 4, wherein said fastener member comprises a visual indicator line formed on a head portion of said fastener member for indicating an orientation of said strut nut.

6. The support surface attachment device according to claim 1, wherein said glider member comprises one or more protrusions or grooves formed in an outer side of said glider member, said one or more protrusions or grooves configured to serve as a visual indicator indicating a height of said clamp assembly relative to said base assembly and/or serve as a means for holding a chalk line during an installation of said one or more photovoltaic modules.

7. The support surface attachment device according to claim 1, wherein said lower clamp member of said clamp assembly comprises one or more ridges disposed on a bottom surface of said lower clamp member, said one or more ridges configured to increase a frictional engagement between said lower clamp member and said glider member so as to resist said upper and lower clamp members of said clamp assembly from rotating relative to said glider member when said fastener member is tightened by an installer.

8. The support surface attachment device according to claim 1, wherein said upstanding base member of said base assembly comprises one or more mating grooves and one or more mating protrusions for engaging with one or more mating protrusions and one or more mating grooves of said glider member, wherein a selected engagement between said one or more mating grooves and protrusions of said upstanding base member and said one or more mating grooves and protrusions of said glider member enables said clamp assembly to be selectively positioned at a predetermined height relative to said base assembly prior to being fixed in place relative to said base assembly so as to permit vertical adjustability when said one or more photovoltaic modules are being attached to said support surface.

9. The support surface attachment device according to claim 1, wherein said upper clamp member of said clamp assembly comprises a first downwardly protruding member and a second downwardly protruding member spaced apart from said first downwardly protruding member by a gap, said second downwardly protruding member being shorter in length than said first downwardly protruding member, and said second downwardly protruding member configured to provide an abutment surface for a skirt member.

10. The support surface attachment device according to claim 1, wherein said lower clamp member of said clamp assembly comprises one or more mating grooves and one or more mating protrusions for engaging with one or more mating protrusions and one or more mating grooves of a skirt member.

11. The support surface attachment device according to claim 10, wherein said one or more mating protrusions on said lower clamp member are upwardly inclined so as to enable said skirt member to be inserted into said clamp assembly from above during installation, and so as to prevent said skirt member from becoming disengaged from said clamp assembly after said installation of said skirt member.

12. The support surface attachment device according to claim 1, wherein said upper clamp member of said clamp assembly comprises a pair of downwardly extending lip portions on opposite sides of a top portion of said upper clamp member, a first one of said pair of downwardly extending lip portions being longer than a second one of said pair of downwardly extending lip portions so as to facilitate said one or more photovoltaic modules being pivotably installed into said first side of said clamp assembly.

13. The support surface attachment device according to claim 1, wherein said lower clamp member of said clamp assembly comprises an upwardly tapered ledge extending outwardly from said first side of said clamp assembly, said upwardly tapered ledge configured to support said one or more photovoltaic module frames of said one or more photovoltaic modules, and said upwardly tapered ledge being configured to function as a spring for applying a compressive force against said one or more photovoltaic module frames of said one or more photovoltaic modules so as to securely retain said one or more photovoltaic modules in said clamp assembly after said one or more photovoltaic modules are pivotably installed.

14. The support surface attachment device according to claim 1, wherein said upstanding base member of said base assembly includes a pair of vertically spaced-apart bottom wall portions, a first of said pair of vertically spaced-apart bottom wall portions comprising a first aperture and a second of said pair of vertically spaced-apart bottom wall portions comprising a second aperture, said first and second apertures of said upstanding base member configured to receive a raised portion of said flashing member therein so as to permit a fastener aperture disposed in said flashing member to be elevated above said support surface, thereby enabling said support surface attachment device to be more leakage resistant.

15. The support surface attachment device according to claim 14, wherein said upstanding base member of said base assembly further comprises one or more base flange portions, said one or more base flange portions having one or more mounting apertures disposed therethrough, said one or more mounting apertures configured to receive one or more respective fasteners for securing said upstanding base member to said support surface.

16. The support surface attachment device according to claim 14, wherein a bottom surface of said upstanding base member comprises one or more ridges disposed thereon, said one or more ridges configured to increase a frictional engagement between said upstanding base member and said flashing member so as prevent said upstanding base member from rotating relative to said flashing member when a base fastener member is tightened by an installer.

17. The support surface attachment device according to claim 16, wherein said one or more ridges disposed on said bottom surface of said upstanding base member are additionally configured to capture and hold sealing tape when said upstanding base member is mounted directly against said support surface.

18. The support surface attachment device according to claim 14, wherein a top surface of said upstanding base member comprises one or more visual installation guide marks configured to facilitate an installation of one or more rows of said one or more photovoltaic modules.

19. The support surface attachment device according to claim 1, wherein said flashing member has a fastener aperture configured to receive a base fastener member for attaching said upstanding base member of said base assembly and said flashing member to said support surface, said fastener aperture being disposed through a raised portion of said flashing member so that water is prevented from passing through said fastener aperture.

20. The support surface attachment device according to claim 19, further comprising a sealing washer configured to be disposed between a head of said base fastener member and a top rim of said raised portion of said flashing member, said sealing washer including an upper portion formed from a first material and a lower portion formed from a second material, said first material forming said upper portion of said sealing washer restricting a deformation of said second material forming said lower portion of said sealing washer so as to prevent said sealing washer from entering said fastener aperture in said flashing member.

21. The support surface attachment device according to claim 20, wherein said lower portion of said sealing washer further comprises a tapered bottom surface so as to tightly engage said top rim of said raised portion of said flashing member and to prevent said second material forming said lower portion of said sealing washer from entering said fastener aperture in said flashing member.

22. The support surface attachment device according to claim 19, wherein said raised portion of said flashing member comprises a circumferential ledge portion, wherein, when said upstanding base member of said base assembly is assembled with said flashing member, a top surface of said circumferential ledge portion of said raised portion of said flashing member is configured to regulate a height of an upper section of said raised portion of said flashing member that is disposed above said circumferential ledge portion so that a top rim of said upper section of said raised portion does not protrude substantially above a top surface of an elevated shelf of said upstanding base member.

23. The support surface attachment device according to claim 1, further comprising a cantilevered mounting arm coupling said clamp assembly to said base assembly, said cantilevered mounting arm configured to support said clamp assembly in a cantilevered manner from said base assembly so that said clamp assembly is capable of being horizontally offset from said base assembly, thereby allowing one or more edges of said one or more photovoltaic modules to be disposed above a region of said support surface that is unable to accommodate said base assembly.

24. The support surface attachment device according to claim 23, wherein said region of said support surface that is unable to accommodate said base assembly comprises an area at or near a roof ridge, and wherein said cantilevered mounting arm enables one or more additional photovoltaic modules to be installed proximate to said roof ridge.

25. The support surface attachment device according to claim 1, further comprising an electrical accessory bracket configured to mount an electrical accessory of a photovoltaic system to said upstanding base member of said base assembly, said electrical accessory bracket comprising at least one flange portion configured to attach said electrical accessory bracket to said upstanding base member, said electrical accessory bracket further comprising a bracket base portion comprising one or more mounting apertures for attaching said electrical accessory to said electrical accessory bracket.

26. The support surface attachment device according to claim 25, wherein said at least one flange portion of said electrical accessory bracket is offset from a center position of said bracket base portion in a widthwise direction of said bracket base portion so as to facilitate a connection of one or more wires to said electrical accessory without said upstanding base member of said base assembly interfering with a routing of said one or more wires.

27. The support surface attachment device according to claim 25, wherein said bracket base portion of said electrical accessory bracket comprises a plurality of slots formed therein for accommodating various electrical accessories, and wherein said at least one flange portion of said electrical accessory bracket comprises at least one aperture formed therein for accommodating a grounding lug.

28. The support surface attachment device according to claim 1, further comprising a conduit mounting member configured to mount electrical conduit of a photovoltaic system to said upstanding base member of said base assembly, said conduit mounting member including a securement portion comprising one or more mounting apertures for attaching said conduit mounting member to said upstanding base member, said conduit mounting member further comprising a conduit mounting portion connected to said securement portion, said conduit mounting portion comprising one or more securement apertures for attaching said electrical conduit to said conduit mounting member.

29. A support surface attachment device, said support surface attachment device configured to attach one or more photovoltaic modules to a support surface, said support surface attachment device comprising:
  a base assembly configured to be attached to a support surface, said base assembly includes an upstanding base member;
  a clamp assembly configured to engage one or more photovoltaic modules, said clamp assembly including a lower clamp member and an upper clamp member, said upper clamp member connected to said lower clamp member by a fastener member, said lower clamp member including one or more first protrusions disposed thereon, and said upper clamp member including one or more second protrusions disposed thereon, said one or more first protrusions on said lower clamp member configured to engage said one or more second protrusions on said upper clamp member when said fastener member is being tightened so as to maintain a minimum gap between said upper clamp member and said lower clamp member for receiving one or more photovoltaic module frames of said one or more photovoltaic modules when said one or more photovoltaic modules are pivotably installed into a first side of said clamp assembly; and a glider member coupling said upper and lower clamp members of said clamp assembly to said base assembly;

wherein said clamp assembly is capable of being selectively positioned along a length of said base assembly prior to being fixed in place relative to said base assembly so as to permit adjustability when said one or more photovoltaic modules are being attached to said support surface, said glider member configured to slide relative to said base assembly so as to allow said clamp assembly to be selectively positioned along said length of said base assembly prior to being fixed in place relative to said base assembly; and wherein said upstanding base member comprises one or more mating grooves and one or more mating protrusions for engaging with one or more mating protrusions and one or more mating grooves of said glider member.

30. A support surface attachment device, said support surface attachment device configured to attach one or more photovoltaic modules to a support surface, said support surface attachment device comprising:

a base assembly configured to be attached to a support surface; and a clamp assembly configured to engage one or more photovoltaic modules, said clamp assembly including a lower clamp member and an upper clamp member, said upper clamp member connected to said lower clamp member by a fastener member, said lower clamp member including one or more first protrusions disposed thereon, and said upper clamp member including one or more second protrusions disposed thereon, said one or more first protrusions on said lower clamp member configured to engage said one or more second protrusions on said upper clamp member when said fastener member is being tightened so as to maintain a minimum gap between said upper clamp member and said lower clamp member for receiving one or more photovoltaic module frames of said one or more photovoltaic modules when said one or more photovoltaic modules are pivotably installed into a first side of said clamp assembly, said upper clamp member of said clamp assembly further including a first downwardly protruding portion and a second downwardly protruding portion spaced apart from said first downwardly protruding portion by a gap, said second downwardly protruding portion being shorter in length than said first downwardly protruding portion, and said second downwardly protruding portion configured to provide an abutment surface for a skirt member; and wherein said clamp assembly is capable of being selectively positioned along a length of said base assembly prior to being fixed in place relative to said base assembly so as to permit adjustability when said one or more photovoltaic modules are being attached to said support surface.

31. A support surface attachment device, said support surface attachment device configured to attach one or more photovoltaic modules to a support surface, said support surface attachment device comprising:

a base assembly configured to be attached to a support surface;

a clamp assembly configured to engage one or more photovoltaic modules, said clamp assembly including a lower clamp member and an upper clamp member, said upper clamp member connected to said lower clamp member by a fastener member, said lower clamp member including one or more first protrusions disposed thereon, and said upper clamp member including one or more second protrusions disposed thereon, said one or more first protrusions on said lower clamp member configured to engage said one or more second protrusions on said upper clamp member when said fastener member is being tightened so as to maintain a minimum gap between said upper clamp member and said lower clamp member for receiving one or more photovoltaic module frames of said one or more photovoltaic modules when said one or more photovoltaic modules are pivotably installed into a first side of said clamp assembly; and a glider member coupling said upper and lower clamp members of said clamp assembly to said base assembly;

wherein said clamp assembly is capable of being selectively positioned along a length of said base assembly prior to being fixed in place relative to said base assembly so as to permit adjustability when said one or more photovoltaic modules are being attached to said support surface, said glider member configured to slide relative to said base assembly so as to allow said clamp assembly to be selectively positioned along said length of said base assembly prior to being fixed in place relative to said base assembly; and wherein said upper and lower clamp members of said clamp assembly are configured to rotate together relative to said glider member, and wherein an upstanding base member of said base assembly is configured to rotate relative to said support surface, whereby the rotation of said upper and lower clamp members relative to said glider member and the rotation of said upstanding base member of said base assembly relative to a flashing member of said support surface attachment device enables a position of said clamp assembly to be adjusted by an installer.

* * * * *